(12) United States Patent
Ishibashi et al.

(10) Patent No.: US 7,509,092 B2
(45) Date of Patent: Mar. 24, 2009

(54) INFORMATION PROCESSING SYSTEM AND INFORMATION PROCESSING METHOD

(75) Inventors: Yoshihito Ishibashi, Tokyo (JP); Fumio Kubono, Tokyo (JP); Susumi Kusakabe, Tokyo (JP)

(73) Assignee: Sony Corporation, Tokyo (JP)

( * ) Notice: Subject to any disclaimer, the term of this patent is extended or adjusted under 35 U.S.C. 154(b) by 466 days.

(21) Appl. No.: 11/435,166

(22) Filed: May 17, 2006

(65) Prior Publication Data

US 2006/0281406 A1 Dec. 14, 2006

(30) Foreign Application Priority Data

May 17, 2005 (JP) ............................. 2005-144205
Aug. 23, 2005 (JP) ............................. 2005-241534

(51) Int. Cl.
*H04Q 7/20* (2006.01)

(52) U.S. Cl. .................. 455/41.1; 455/456.1; 455/41.2; 455/41.3; 340/572.2; 340/5.52; 340/573.4

(58) Field of Classification Search .............. 455/456.1, 455/41.2, 41.3; 340/5.52, 573.4, 572.4, 551
See application file for complete search history.

(56) References Cited

U.S. PATENT DOCUMENTS

| | | | | |
|---|---|---|---|---|
| 5,023,597 A | * | 6/1991 | Salisbury | ................. 340/573.4 |
| 5,164,707 A | * | 11/1992 | Rasmussen et al. | ......... 340/551 |
| 5,914,701 A | | 6/1999 | Gersheneld et al. | |
| 6,223,018 B1 | | 4/2001 | Fukumoto et al. | |
| 6,611,195 B1 | * | 8/2003 | Manneschi et al. | ......... 340/5.52 |
| 2006/0077616 A1 | | 4/2006 | Takiguchi | |
| 2007/0222599 A1 | * | 9/2007 | Coveley et al. | .......... 340/572.4 |

FOREIGN PATENT DOCUMENTS

| | | | |
|---|---|---|---|
| JP | 10-229357 | | 8/1998 |
| JP | 410232283 A | * | 9/1998 |
| JP | 11-509380 | | 8/1999 |
| JP | 2001-134890 | | 5/2001 |
| JP | 2001-144662 | | 5/2001 |
| JP | 2002-009710 | | 1/2002 |
| JP | 2003-163644 | | 6/2003 |
| JP | 2004-214737 | | 7/2004 |
| JP | 2004-282733 | | 10/2004 |

* cited by examiner

*Primary Examiner*—David Q Nguyen
(74) *Attorney, Agent, or Firm*—Finnegan, Henderson, Farabow, Garrett & Dunner, L.L.P.

(57) ABSTRACT

An information processing system includes: a first information processing apparatus disposed in correspondence with an entrance of a space including a plurality of areas; a plurality of second information processing apparatuses respectively disposed in correspondence with the plurality of areas; and a third information processing apparatus which manages points, the point being earned by a person who entered the space or the area.

8 Claims, 38 Drawing Sheets

| FREQUENCY f [Hz] | RECEPTION LOAD Rr [Ω] | CAPACITANCE [F] | EXECUTION VOLTAGE Vrrms [V] |
|---|---|---|---|
| 1.0E+06 | 1.0E+04 | 1.0E-13 | 0.013 |
| 1.0E+06 | 1.0E+04 | 1.0E-12 | 0.125 |
| 1.0E+06 | 1.0E+04 | 1.0E-11 | 1.064 |
| 1.0E+06 | 1.0E+05 | 1.0E-13 | 0.125 |
| 1.0E+06 | 1.0E+05 | 1.0E-12 | 1.064 |
| 1.0E+06 | 1.0E+05 | 1.0E-11 | 1.975 |
| 1.0E+06 | 1.0E+06 | 1.0E-13 | 1.064 |
| 1.0E+06 | 1.0E+06 | 1.0E-12 | 1.975 |
| 1.0E+06 | 1.0E+06 | 1.0E-11 | 2.000 |
| 1.0E+07 | 1.0E+04 | 1.0E-13 | 0.125 |
| 1.0E+07 | 1.0E+04 | 1.0E-12 | 1.064 |
| 1.0E+07 | 1.0E+04 | 1.0E-11 | 1.975 |
| 1.0E+07 | 1.0E+05 | 1.0E-13 | 1.064 |
| 1.0E+07 | 1.0E+05 | 1.0E-12 | 1.975 |
| 1.0E+07 | 1.0E+05 | 1.0E-11 | 2.000 |
| 1.0E+07 | 1.0E+06 | 1.0E-13 | 1.975 |
| 1.0E+07 | 1.0E+06 | 1.0E-12 | 2.000 |
| 1.0E+07 | 1.0E+06 | 1.0E-11 | 2.000 |
| 1.0E+08 | 1.0E+04 | 1.0E-13 | 1.064 |
| 1.0E+08 | 1.0E+04 | 1.0E-12 | 1.975 |
| 1.0E+08 | 1.0E+04 | 1.0E-11 | 2.000 |
| 1.0E+08 | 1.0E+05 | 1.0E-13 | 1.975 |
| 1.0E+08 | 1.0E+05 | 1.0E-12 | 2.000 |
| 1.0E+08 | 1.0E+05 | 1.0E-11 | 2.000 |
| 1.0E+08 | 1.0E+06 | 1.0E-13 | 2.000 |
| 1.0E+08 | 1.0E+06 | 1.0E-12 | 2.000 |
| 1.0E+08 | 1.0E+06 | 1.0E-11 | 2.000 |

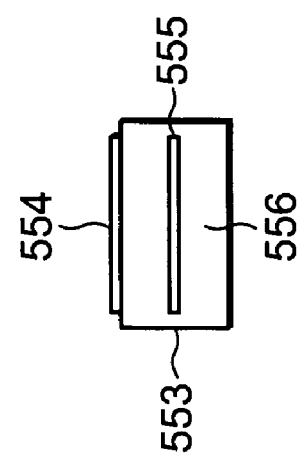
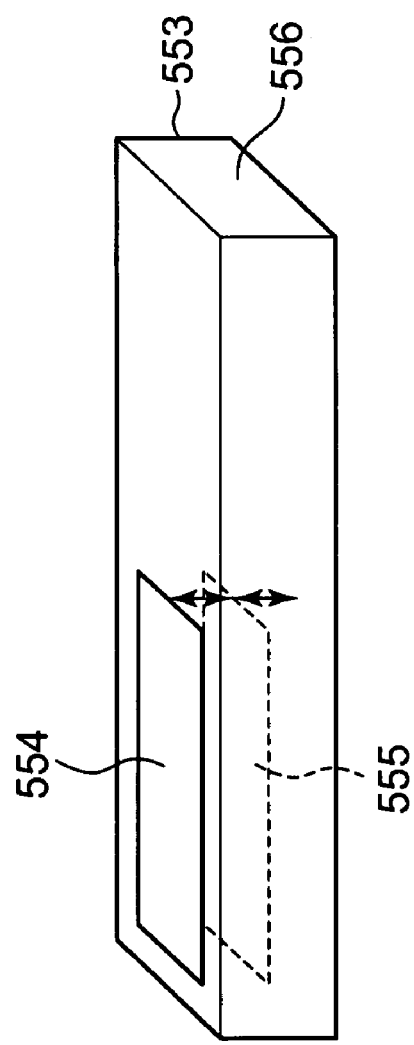

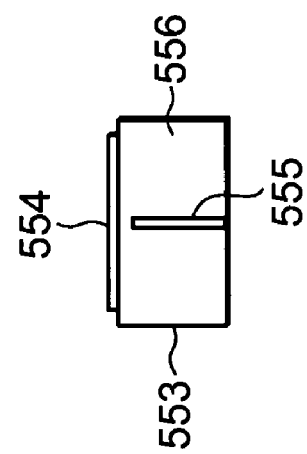
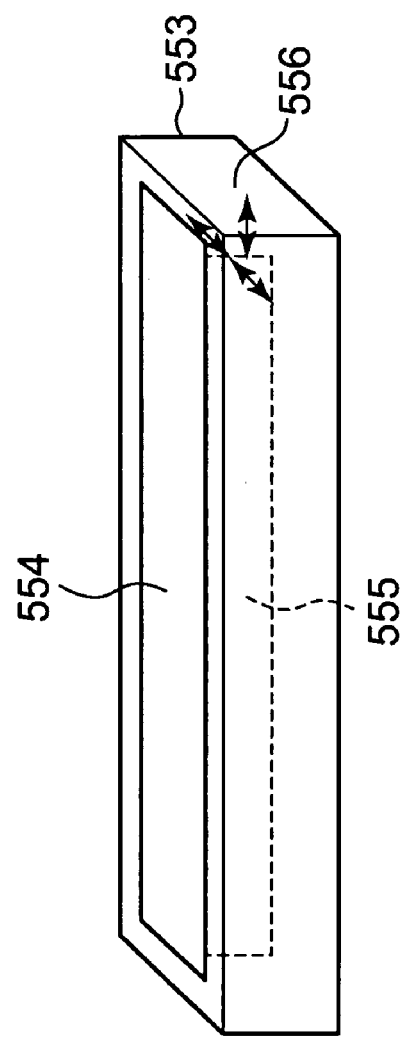

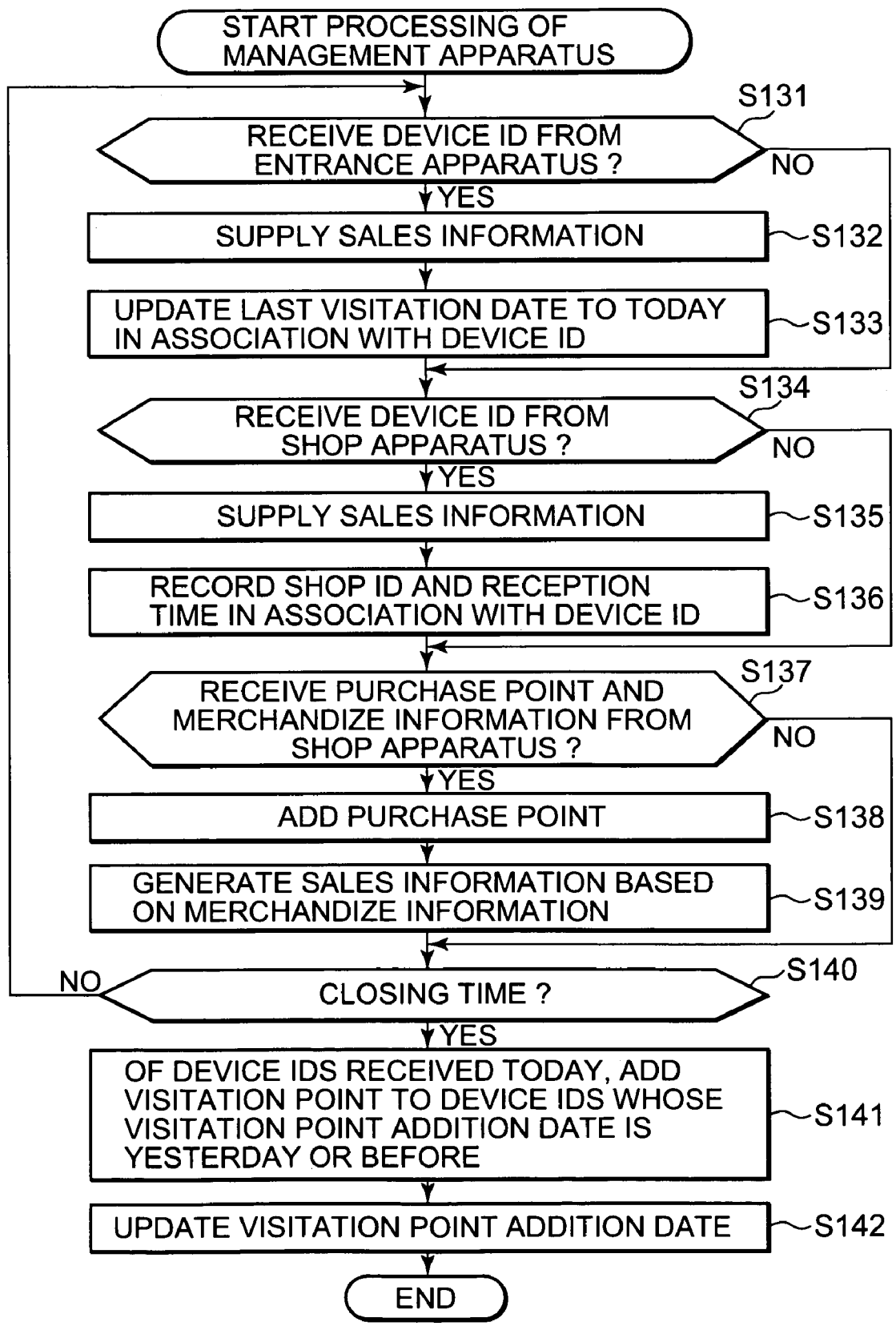

INFORMATION PROCESSING SYSTEM AND INFORMATION PROCESSING METHOD

BACKGROUND OF THE INVENTION

1. Field of the Invention

The present invention relates to an information processing system and an information processing method, and more particularly to an information processing system and an information processing method which are suitable for use in adding points to a customer who visits or purchases in a department store or the like and for use in providing sales information such as a merchandise advertisement.

2. Description of Related Art

In a communication system formed by a transmitter, communication has heretofore been established by providing a physical reference point separate from a physical communication signal transmission path for transmitting communication signals, so that the communication signal transmission path and a reference point for determining the difference in level between communication signals can be shared by a transmitter and a receiver (refer to, for example, Japanese Patent Application Publication Numbers H10-229357 (Patent Literature 1) and H11-509380 (Patent Literature 2)).

For example, in each of Patent Literature 1 and Patent Literature 2, a description is given as to communication techniques using a human body as a communication medium. In either of the methods, not only is a first communication path provided as a human body, but also the direct capacitive coupling between electrodes on the ground or in space is provided as a second communication path so that the entire communication path made of the first communication path and the second communication path forms a closed circuit.

In the communication system, two communication paths, i.e., the communication signal transmission path and the reference point path (the first communication path and the second communication path), need to be provided as a closed circuit between the transmitter and the receiver. However, since both communication paths are mutually different paths, these two communication paths must be stably compatible, so that there is a risk of restricting use environments for communications.

For example, the strength of capacitive coupling between the transmitter and the receiver on the reference point path depends on the distance between the devices, and the stability of the communication path varies with the distance. Namely, in this case, there is a risk that the stability of communication depends on the distance between the transmitter and the receiver. In addition, there is a risk that the stability of communication varies according to the presence or absence of a shield or the like between the transmitter and the receiver.

Accordingly, in the communication methods of forming two communication paths, i.e., the communication path transmission path and the reference point path, as a closed circuit, since use environments greatly influence the stability of communication, stable communication is difficult to perform.

SUMMARY OF THE INVENTION

As mentioned above, although communication techniques which use a human body as a communication medium have not yet been established, investigations of use methods have been conducted on applications of the communication techniques to various fields.

The present invention has been made in view of the above-mentioned situation. It is desirable to make it possible to apply communication techniques using a human body as a communication medium, which will be put to practice in the future, to a department store, a shopping mall and the like having a plurality of salesrooms or shops in such a way that the communication techniques may be applied to addition of points to a customer who enters a shop and purchases a merchandise, and/or to provision of sales information.

An information processing system according to a first embodiment of the present invention includes a first information processing apparatus disposed in correspondence with an entrance of a space including a plurality of areas, a plurality of second information processing apparatuses respectively disposed in correspondence with the plurality of areas, and a third information processing apparatus which manages points, the point being earned by a person who entered the space or the area. The first information processing apparatus includes first acquisition means for communicating with a communication terminal worn on a person who visited the space and operative to perform communication by using as a communication medium a dielectric including a human body, and acquiring identification information recorded on the communication terminal, first notification means for notifying the third information processing apparatus of the identification information, and addition means for reading the last point addition date recorded on the communication terminal and, if the last point addition date is not today, adding to the communication terminal visitation points earned in correspondence with the fact that the person visited the space. The plurality of second information processing apparatuses each includes detection means for detecting a person who visited the area, and second acquisition means for acquiring identification information recorded on the communication terminal worn on the person detected by the detection means. The third information processing apparatus includes first receiver means for receiving the identification information notified from the first information processing apparatus, storing means for storing at least earned points, the last visitation date, and a date on which the visitation points were earned, in association with the identification information on the communication terminal, and modifying the stored last visitation date in correspondence with the identification information inputted from the first receiver means, and update means for, if the last visitation date stored in the storing means and the date on which the visitation points were earned differ from each other, adding visitation points to the earned points stored in the storing means, and updating the date on which the visitation points were earned into the last visitation date.

The first information processing apparatus may further include first supply means for supplying information on the space to the communication terminal, and each of the second information processing apparatuses may further include second supply means for supplying information on the area to the communication terminal.

Each of the second information processing apparatuses may further include second notification means for notifying the third information processing apparatus of the identification information together with area information for specifying the area, and the third information processing apparatus may further include second receiver means for receiving the identification information and area information notified from each of the second information processing apparatuses. The storing means is adapted to store the area information received by each of the second information processing apparatuses and a reception date of the area information.

According to the first embodiment of the present invention, there is also provided an information processing method for an information processing system which includes a first information processing apparatus disposed in correspondence with an entrance of a space made of a plurality of areas, a plurality of second information processing apparatuses respectively disposed in correspondence with the plurality of areas, and a third information processing apparatus which manages points, the point being earned by a person who entered the space or the area. The information processing method includes: a first acquisition step of communicating with a communication terminal worn on a person who visited the space and operative to perform communication by using as a communication medium a dielectric including a human body, and acquiring identification information recorded on the communication terminal; a first notification step of notifying the third information processing apparatus of the identification information, and an addition step of reading the last point addition date recorded on the communication terminal and, if the last point addition date is not today, adding to the communication terminal visitation points earned in correspondence with the fact that the person visited the space; and the first acquisition step, the first notification step and the addition step are executed by the first information processing apparatus. The information processing method also includes a detection step of detecting a person who visited the area, and a second acquisition step of acquiring identification information recorded on the communication terminal worn on the person detected by processing of the detection step, and the detection step and the second acquisition step are executed by each of the plurality of second information processing apparatuses. The information processing method also includes a first reception step of receiving the identification information notified from the first information processing apparatus, a storing step of storing at least earned points, the last visitation date, and a date on which the visitation points were earned, in association with the identification information on the communication terminal, and modifying the stored last visitation date in correspondence with the identification information inputted from the first receiver means, and an update step of, if the last visitation date stored by processing of the storing step and the date on which the visitation points were earned differ from each other, adding visitation points to the earned points stored in the storing means, and updating the date on which the visitation points were earned into the last visitation date, and the first reception step, the storing step and the update step are executed by the third information processing apparatus.

According to the first embodiment of the present invention, the first information processing apparatus communicates with a communication terminal worn on a person who visited a space and operative to perform communication by using as a communication medium a dielectric including a human body, acquires identification information recorded on the communication terminal, notifies the identification information to the third information processing apparatus, reads the last point addition date recorded on the communication terminal, and if the last point addition date is not today, adds to the communication terminal visitation points earned in correspondence with the fact that the person visited the space. In addition, the second information processing apparatus detects a person who visited the area, and acquired the identification information recorded on the communication terminal worn on the detected person. Furthermore, the third information processing apparatus receives the identification information notified from the first information processing apparatus, stores at least earned points, the last visitation date, and a date on which the visitation points were earned, in association with the identification information of the communication terminal. Furthermore, if the stored last visitation date and the date on which the visitation points were earned differ from each other, the third information processing apparatus adds the visitation points to the earned points, and update the date on which the visitation points were earned, into the last visitation date.

An information processing system according to a second embodiment of the present invention includes a first information processing apparatus disposed in correspondence with an entrance of a space made of a plurality of areas, a plurality of second information processing apparatuses respectively disposed in correspondence with the plurality of areas, and a third information processing apparatus which manages points, the point being earned by a person who entered the space or the area. The first information processing apparatus includes first acquisition means for communicating with a communication terminal worn on a person who visited the space and operative to perform communication by using as a communication medium a dielectric including a human body, and acquiring identification information recorded on the communication terminal, first notification means for notifying the third information processing apparatus of the identification information acquired by the first acquisition means, and first supply means for supplying to the communication terminal notification information corresponding to the acquired identification information from among notification information distributed from the third information processing apparatus. Each of the plurality of second information processing apparatuses includes detection means for detecting a person who visited the area, second acquisition means for acquiring the identification information recorded on the communication terminal worn on the person detected by the detection means, second notification means for notifying the third information processing apparatus of the identification information acquired by the second acquisition means and behavior information indicative of the behavior in the area of the person who visited the area, and second supply means for supplying to the communication terminal notification information corresponding to the acquired identification information, from among notification information distributed from the third information processing apparatus. The third information processing apparatus includes storing means for storing the behavior information notified from the second information processing apparatus, in association with the identification information, generation means for generating the notification information for individuals on the basis of the behavior information stored in the storing means, and distribution means for distributing to all or part of the first and second information processing apparatuses, notification information corresponding to the identification information notified from either one of the first and second information processing apparatuses, from among the notification information generated by the generation means.

The behavior information is information indicative of a merchandise purchased in the area by the person who visited the area, and the notification information is an advertisement of merchandises sold in the space or the area.

According to the second embodiment of the present invention, there is also provided an information processing method for an information processing system which includes a first information processing apparatus disposed in correspondence with an entrance of a space made of a plurality of areas, a plurality of second information processing apparatuses respectively disposed in correspondence with the plurality of areas, and a third information processing apparatus which manages points, the point being earned by a person who entered the space or the area. The information processing method includes a first acquisition step of communicating with a communication terminal worn on a person who visited the space and operative to perform communication by using as a communication medium a dielectric including a human body, and acquiring identification information recorded on the communication terminal, a first notification step of notifying the third information processing apparatus of the identification information acquired by processing of the first acquisition step, and a first supply step of supplying to the communication terminal notification information corresponding to the acquired identification information from among notification information distributed from the third information processing apparatus, and the first acquisition step, the first notification step and the first supply step are executed by the first information processing apparatus. The information processing method also includes a detection step of detecting a person who visited the area, a second acquisition step of acquiring the identification information recorded on the communication terminal worn on the person detected by processing of the detection step, a second notification step of notifying the third information processing apparatus of the identification information acquired by processing of the second acquisition step and behavior information indicative of the behavior in the area of the person who visited the area, and a second supply step of supplying to the communication terminal notification information corresponding to the acquired identification information from among notification information distributed from the third information processing apparatus, and the detection step, the second acquisition step, the second notification step and the second supply step are executed by each of the plurality of second information processing apparatuses. The information processing method also includes a storing step of storing the behavior information notified from the second information processing apparatus, in association with the identification information, a generation step of generating the notification information for individuals on the basis of the behavior information stored in the storing means, and a distribution step of distributing to all or part of the first and second information processing apparatuses, notification information corresponding to the identification information notified from either one of the first and second information processing apparatuses, from among the notification information generated by processing of the generation step, and the storing step, the generation step and the distribution step are executed by the third information processing apparatus.

According to the second embodiment of the present invention, the first information unit communicates with a communication terminal worn on a person who visited the space and operative to perform communication by using as a communication medium a dielectric including a human body, acquires identification information recorded on the communication terminal, notifies the third information processing apparatus of the acquired identification information, and supplies to the communication terminal notification information corresponding to the acquired identification information from among notification information distributed from the third information processing apparatus. In addition, the second information processing apparatus detects a person who visited the area, acquires the identification information recorded on the communication terminal worn on the detected person, notifies the third information processing apparatus of the acquired identification information and behavior information indicative of the behavior in the area of the person who visited the area, and supplies to the communication terminal notification information corresponding to the acquired identification information from among notification information distributed from the third information processing apparatus. In addition, the third information processing apparatus stores the behavior information notified from the second information processing apparatus, in association with the identification information, generates the notification information for individuals on the basis of the stored behavior information, and distributes to all or part of the first and second information processing apparatuses, notification information corresponding to the identification information notified from either one of the first and second information processing apparatuses, from among the generated notification information.

According to the first embodiment of the present invention, it is possible to add points to entering customers by applying communication techniques using a human body as a communication medium to a department store, a shopping mall and the like having a plurality of salesrooms or shops.

According to the second embodiment of the present invention, it is possible to add sales information to visiting customers by applying communication techniques using a human body as a communication medium to a department store, a shopping mall and the like having a plurality of salesrooms or shops.

BRIEF DESCRIPTION OF THE DRAWINGS

The present invention will become more readily appreciated and understood from the following detailed description of embodiments and examples of the present invention when taken in conjunction with the accompanying drawings, in which:

FIG. 3 is a table showing an example of the calculation result of effective values of the voltage produced across a reception load resistor in the model shown in FIG. 2;

FIG. 16A is a schematic view showing another example of locations at which individual electrodes are disposed;

FIG. 16B is a schematic view showing another example of locations at which individual electrodes are disposed;

FIG. 18A is a schematic view showing another example of locations at which individual electrodes are disposed;

FIG. 18B is a schematic view showing another example of locations at which individual electrodes are disposed;

FIG. 47 is a flowchart for explaining the operation of the management apparatus.

DETAILED DESCRIPTION OF EMBODIMENTS

Figure 1:
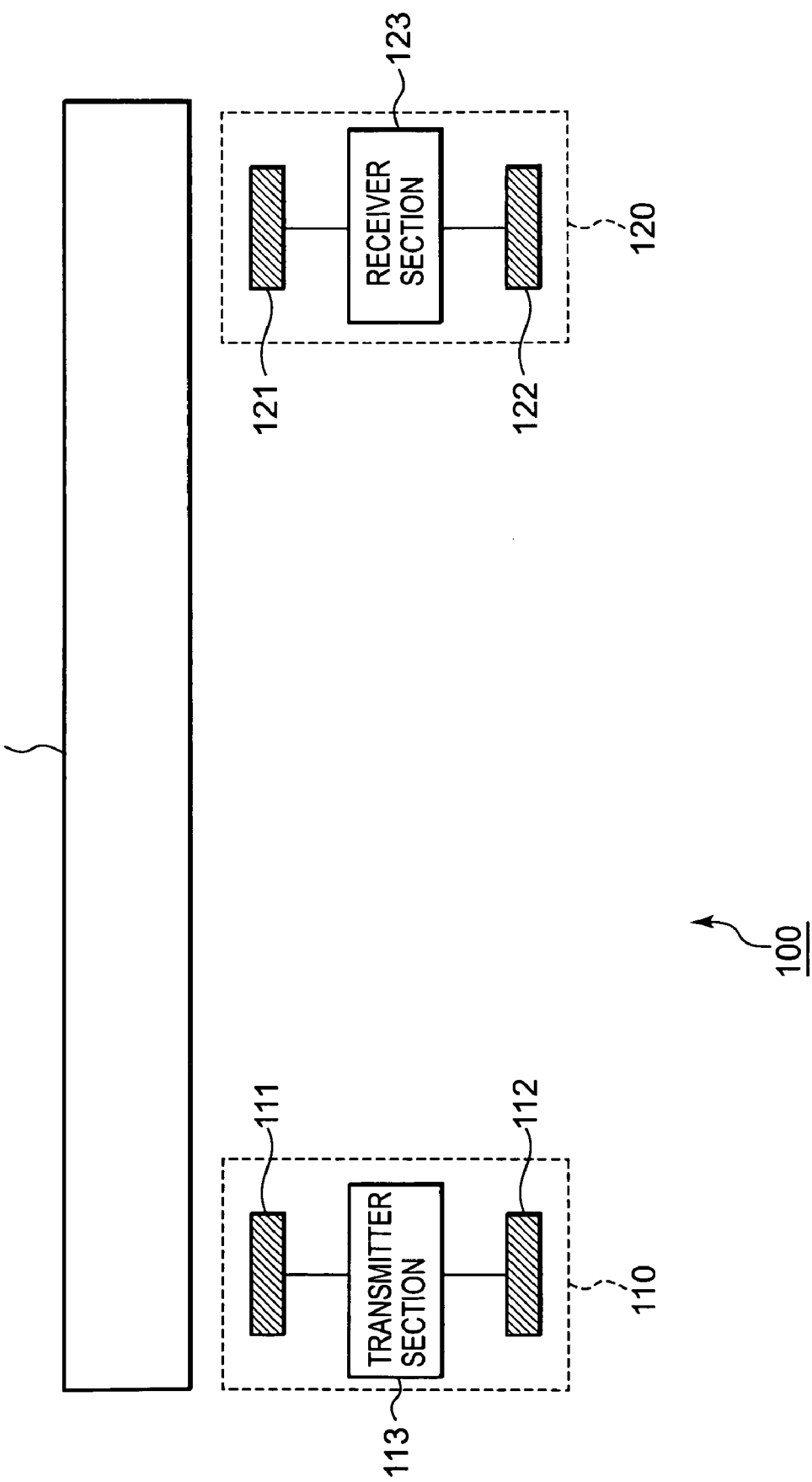
FIG. 1 is a block diagram showing a construction example of one embodiment of a communication system which underlies the present invention.

Embodiments of the present invention will be described below. First of all, the correspondence between the constituent elements described in the appended claims and specific examples of the embodiments of the present invention will be described below by way of example. The following description is intended to confirm that specific examples which support the invention described in the appended claims are described in the description of the embodiments. Accordingly, even if there is a specific example which is mentioned in the description of the embodiments but is not described as corresponding to a constituent element of the claimed invention, this does not indicate that the specific example does not correspond to the constituent element. Conversely, even if a specific example is described as corresponding to a constituent element of the claimed invention, this does not indicate that the specific example does not correspond to any constituent element other than the constituent element.

An information processing system according to a first embodiment of the present invention includes a first information processing apparatus (for example, an entrance apparatus 1001 in FIG. 34) disposed in correspondence with an entrance of a space made of a plurality of areas, a plurality of second information processing apparatuses (for example, shop apparatuses 1002 in FIG. 34) respectively disposed in correspondence with the plurality of areas, and a third information processing apparatus (for example, a management apparatus 1003 in FIG. 34) which manages points, the point being earned by a person who entered the space or the area. The first information processing apparatus includes first acquisition means (for example, a device ID acquisition section 1022 in FIG. 37) for communicating with a communication terminal (for example, a user device 1100 in FIG. 35) worn on a person who visited the space and operative to perform communication by using as a communication medium a dielectric including a human body, and acquiring identification information recorded on the communication terminal, first notification means (for example, a device ID notification section 1023 in FIG. 37) for notifying the third information processing apparatus of the identification information, and addition means (for example, a visitation point addition section 1024 in FIG. 37) for reading the last point addition date recorded on the communication terminal and, if the last point addition date is not today, adding to the communication terminal visitation points earned in correspondence with the fact that the person visited the space. The plurality of second information processing apparatuses each includes detection means (for example, a person detection section 1051 in FIG. 39) for detecting the person who visited the area, and second acquisition means (for example, a device ID acquisition section 1053 in FIG. 39) for acquiring identification information recorded on the communication terminal worn on the person detected by the detection means. The third information processing apparatus includes first receiver means (for example, a visitation information acquisition section 1061 in FIG. 40) for receiving the identification information notified from the first information processing apparatus, storing means (for example, a customer information store section 1063 in FIG. 40) for storing at least earned points, the last visitation date, and a date on which the visitation points were earned, in association with the identification information on the communication terminal, and modifying the stored last visitation date in correspondence with the identification information inputted from the first receiver means, and update means (for example, a point addition judgment section 1065 in FIG. 40) for, if the last visitation date stored in the storing means and the date on which the visitation points were earned differ from each other, adding visitation points to the earned points stored in the storing means, and updating the date on which the visitation points were earned into the last visitation date.

The first information processing apparatus may further includes first supply means (for example, a sales information output section 1025 in FIG. 37) for supplying information on the space to the communication terminal, and each of the second information processing apparatuses further includes second supply means (for example, a sales information output section 1055 in FIG. 39) for supplying information on the area to the communication terminal.

Figure 39:
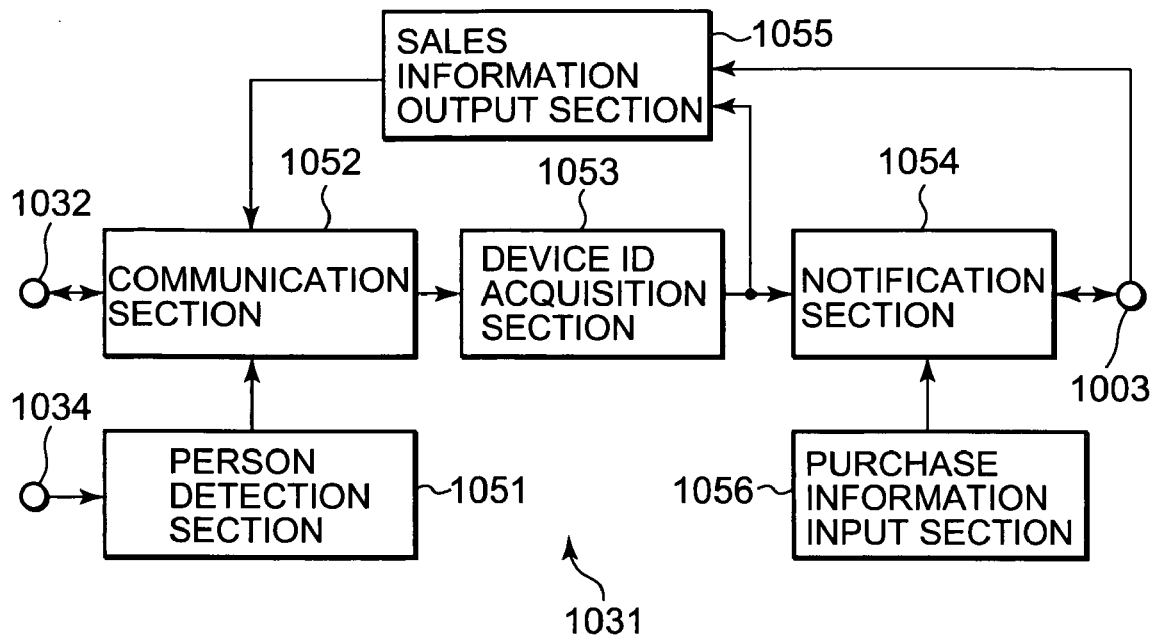
FIG. 39 is a block diagram showing a construction example of the signal processing section shown in FIG. 38.
Figure 40:
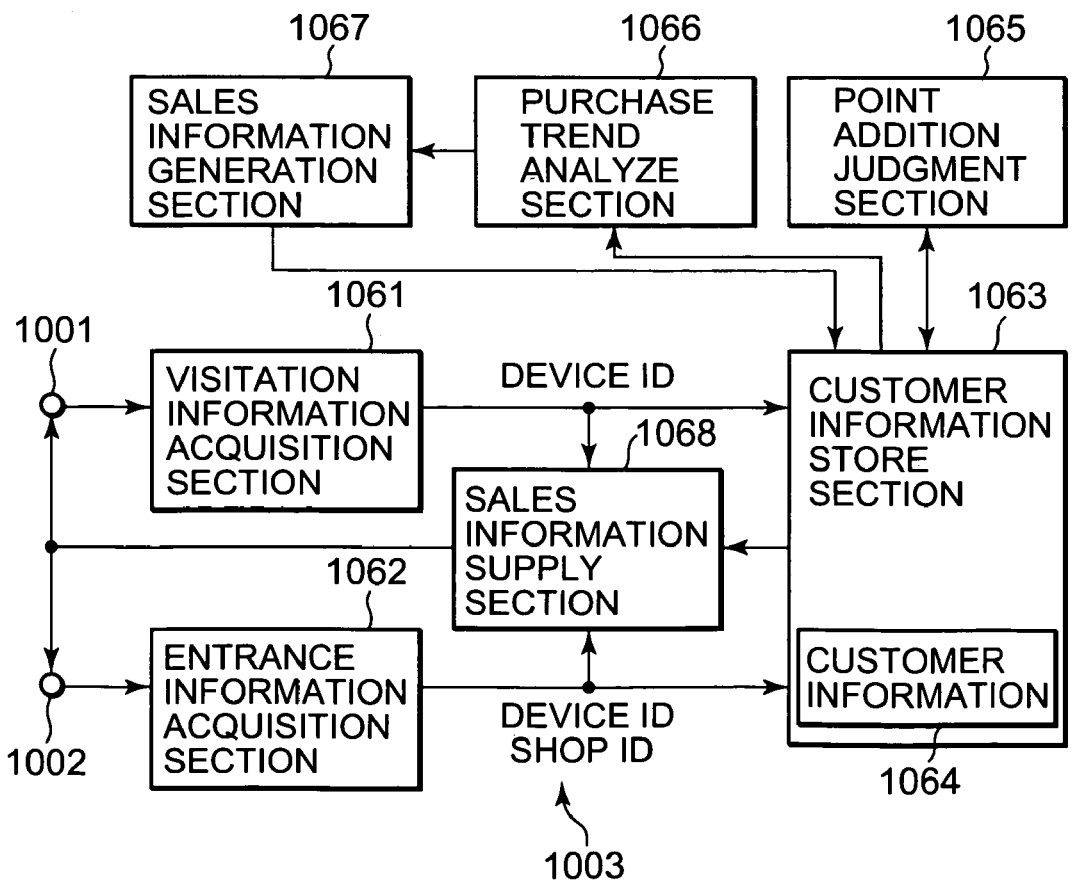
FIG. 40 is a block diagram showing a construction example of the management apparatus shown in FIG. 34.

Each of the second information processing apparatuses may further include second notification means (for example, a notification section 1054 in FIG. 39) for notifying the third information processing apparatus of the identification information together with area information for specifying the area, and the third information processing apparatus further includes second receiver means (for example, a entrance information acquisition section 1062 in FIG. 40) for receiving the identification information and area information notified from each of the second information processing apparatuses. The storing means is adapted to store the area information received by each of the second information processing apparatuses and a reception date of the area information.

According to the first embodiment of the present invention, there is also provided an information processing method for an information processing system which includes a first information processing apparatus (for example, the entrance apparatus 1001 in FIG. 34) disposed in correspondence with an entrance of a space made of a plurality of areas, a plurality of second information processing apparatuses (for example, the shop apparatuses 1002 in FIG. 34) respectively disposed in correspondence with the plurality of areas, and a third information processing apparatus (for example, the management apparatus 1003 in FIG. 34) which manages points, the point being earned by a person who entered the space or the area. The information processing method includes a first acquisition step (for example, step S112 in FIG. 45) of communicating with a communication terminal worn on a person who visited the space and operative to perform communication by using as a communication medium a dielectric including a human body, and acquiring identification information recorded on the communication terminal, a first notification step (for example, step S113 in FIG. 45) of notifying the third information processing apparatus of the identification information, and an addition step (for example, step S116 in FIG. 45) of reading the last point addition date recorded on the communication terminal and, if the last point addition date is not today, adding to the communication terminal visitation points earned in correspondence with the fact that the person visited the space, and the first acquisition step, the first notification step and the addition step are executed by the first information processing apparatus. The information processing method also includes a detection step (for example, step S121 in FIG. 46) of detecting the person who visited the area, and a second acquisition step (for example, step S123 in FIG. 46) of acquiring identification information recorded on the communication terminal worn on the person detected by processing of the detection step, and the detection step and the second acquisition step are executed by each of the plurality of second information processing apparatuses. The information processing method also includes a first reception step (for example, step S131 in FIG. 47) of receiving the identification information notified from the first information processing apparatus, a storing step (for example, step S133 in FIG. 47) of storing at least earned points, the last visitation date, and a date on which the visitation points were earned, in association with the identification information on the communication terminal, and modifying the stored last visitation date in correspondence with the identification information inputted from the first receiver means, and an update step (for example, step S142 in FIG. 47) of, if the last visitation date stored by processing of the storing step and the date on which the visitation points were earned differ from each other, adding visitation points to the earned points stored in the storing means, and updating the date on which the visitation points were earned into the last visitation date, and the first reception step, the storing step and the update step are executed by the third information processing apparatus.

An information processing system according to a second embodiment of the present invention includes a first information processing apparatus (for example, the entrance apparatus 1001 in FIG. 34) disposed in correspondence with an entrance of a space made of a plurality of areas, a plurality of second information processing apparatuses (for example, the shop apparatuses 1002 in FIG. 34) respectively disposed in correspondence with the plurality of areas, and a third information processing apparatus (for example, the management apparatus 1003 in FIG. 34) which manages points, the point being earned by a person who entered the space or the area. The first information processing apparatus includes first acquisition means (for example, the device ID acquisition section 1022 in FIG. 37) for communicating with a communication terminal (for example, the user device 1100 in FIG. 35) worn on a person who visited the space and operative to perform communication by using as a communication medium a dielectric including a human body, and acquiring identification information recorded on the communication terminal, first notification means (for example, the device ID notification section 1023 in FIG. 37) for notifying the third information processing apparatus of the identification information acquired by the first acquisition means, and first supply means (for example, the sales information output section 1025 in FIG. 37) for supplying to the communication terminal notification information corresponding to the acquired identification information from among notification information distributed from the third information processing apparatus. Each of the plurality of second information processing apparatuses includes detection means (for example, the person detection section 1051 in FIG. 39) for detecting the person who visited the area, second acquisition means for acquiring the identification information recorded on the communication terminal worn on the person detected by the detection means, second notification means (for example, the notification section 1054 in FIG. 39) for notifying the third information processing apparatus of the identification information acquired by the second acquisition means and behavior information indicative of the behavior in the area of the person who visited the area, and second supply means (for example, the sales information output section 1055 in FIG. 39) for supplying to the communication terminal notification information corresponding to the acquired identification information, from among notification information distributed from the third information processing apparatus. The third information processing apparatus includes storing means (for example, the customer information store section 1063 in FIG. 40) for storing the behavior information notified from the second information processing apparatus, in association with the identification information, generation means (for example, a sales information generation section 1067 in FIG. 40) for generating the notification information for individuals on the basis of the behavior information stored in the storing means, and distribution means (for example, a sales information supply section 1068 in FIG. 40) for distributing to all or part of the first and second information processing apparatuses, notification information corresponding to the identification information notified from either one of the first and second information processing apparatuses, from among the notification information generated by the generation means.

According to the second embodiment of the present invention, there is also provided an information processing method for an information processing system which includes a first information processing apparatus (for example, the entrance apparatus 1001 in FIG. 34) disposed in correspondence with an entrance of a space made of a plurality of areas, a plurality of second information processing apparatuses (for example, the shop apparatuses 1002 in FIG. 34) respectively disposed in correspondence with the plurality of areas, and a third information processing apparatus (for example, the management apparatus 1003 in FIG. 34) which manages points, the point being earned by a person who entered the space or the area. The information processing method includes a first acquisition step (for example, step S145 in FIG. 45) of communicating with a communication terminal worn on a person who visited the space and operative to perform communication by using as a communication medium a dielectric including a human body, and acquiring identification information recorded on the communication terminal, a first notification step (for example, step S145 in FIG. 45) of notifying the third information processing apparatus of the identification information acquired by processing of the first acquisition step, and a first supply step (for example, step S117 in FIG. 45) of supplying to the communication terminal notification information corresponding to the acquired identification information from among notification information distributed from the third information processing apparatus. The first acquisition step, the first notification step and the first supply step are executed by the first information processing apparatus. The information processing method also includes a detection step (for example, step S121 in FIG. 46) of detecting the person who visited the area, a second acquisition step (for example, step S123 in FIG. 46) of acquiring the identification information recorded on the communication terminal worn on the person detected by processing of the detection step, a second notification step (for example, step S125 in FIG. 46) of notifying the third information processing apparatus of the identification information acquired by processing of the second acquisition step and behavior information indicative of the behavior in the area of the person who visited the area, and a second supply step (for example, step S126 in FIG. 46) of supplying to the communication terminal notification information corresponding to the acquired identification information from among notification information distributed from the third information processing apparatus. The detection step, the second acquisition step, the second notification step and the second supply step are executed by each of the plurality of second information processing apparatuses. The information processing method also includes a storing step (for example, step S138 in FIG. 47) of storing the behavior information notified from the second information processing apparatus, in association with the identification information, a generation step (for example, step S139 in FIG. 47) of generating the notification information for individuals on the basis of the behavior information stored in the storing step, and a distribution step (for example, steps S132 and S135 in FIG. 47) of distributing to all or part of the first and second information processing apparatuses, notification information corresponding to the identification information notified from either one of the first and second information processing apparatuses, from among the notification information generated by processing of the generation step. The storing step, the generation step and the distribution step are executed by the third information processing apparatus.

Embodiments of the present invention will be described below in detail with reference to the accompanying drawings.

FIG. 1 is a block diagram showing a construction example of a communication system which underlies the present invention.

Referring to FIG. 1, a communication system 100 is a system which includes a transmitter 110, a receiver 120, and a communication medium 130, and causes the transmitter 110 and the receiver 120 to transmit and receive signals therebetween via the communication medium 130. Namely, in the communication system 100, a signal transmitted from the transmitter 110 is transmitted via the communication medium 130 and is received by the receiver 120.

The transmitter 110 has a transmission signal electrode 111, a transmission reference electrode 112, and a transmitter section 113. The transmission signal electrode 111 is an electrode for transmitting a signal to be transmitted via the communication medium 130, and is provided to have a stronger capacitive coupling to the communication medium 130 than to the transmission reference electrode 112 which is an electrode for obtaining a reference point for making a decision as to the difference in level between signals. The transmitter section 113 is provided between the transmission signal electrode 111 and the transmission reference electrode 112, and applies an electrical signal (potential difference) to be transmitted to the receiver 120, between the transmission signal electrode 111 and the transmission reference electrode 112.

The receiver 120 has a reception signal electrode 121, a reception reference electrode 122, and a receiver section 123. The reception signal electrode 121 is an electrode for receiving a signal transmitted via the communication medium 130, and is provided to have a stronger capacitive coupling to the communication medium 130 than to the reception reference electrode 122 which is an electrode for obtaining a reference point for making a decision as to the difference in level between signals. The receiver section 123 is provided between the reception signal electrode 121 and the reception reference electrode 122, and converts an electrical signal (potential difference) produced between the reception signal electrode 121 and the reception reference electrode 122 into a desired electrical signal to restore the electrical signal generated by the transmitter section 113 of the transmitter 110.

The communication medium 130 is made of a substance having a physical characteristic capable of transmitting electrical signals, for example, an electrically conductive material or a dielectric material. The communication medium 130 is made of, for example, an electrically conductive material (such as copper, iron or aluminum). Otherwise, the communication medium 130 is made of pure water, rubber, glass or an electrolytic solution such as a saline solution, or a dielectric material such as a human body which is a complex of these materials. The communication medium 130 may have any shape, for example, a linear shape, a planar shape, a spherical shape, a prismatic shape, a cylindrical shape or another arbitrary shape.

First of all, the relationship between each of the electrodes and spaces neighboring the communication medium or the devices in the communication system 100 will be described below. In the following description, for convenience of explanation, it is assumed that the communication medium 130 is a perfect conductor. In addition, it is assumed that spaces exist between the transmission signal electrode 111 and the communication medium 130 and between the reception signal electrode 121 and the communication medium 130, respectively, so that there is no electrical coupling between the transmission signal electrode 111 and the communication medium 130 nor between the reception signal electrode 121 and the communication medium 130. Namely, a capacitance is formed between the communication medium 130 and each of the transmission signal electrode 111 and the reception signal electrode 121.

The transmission reference electrode 112 is provided to face a space neighboring the transmitter 110, while the reception reference electrode 122 is provided to face a space neighboring the receiver 120. In general, if a conductor exists in a space, a capacitance is formed in a space neighboring the surface of the conductor. For example, if the shape of the conductor is a sphere of radius r [m], a capacitance C is found from the following formula (1):

[Formula 1]

$$C = 4 \times \pi \times \epsilon \times r \quad (1)$$

In formula (1), $\pi$ denotes the circular constant of the conductor and $\epsilon$ denotes the dielectric constant of the space surrounding the conductor. The dielectric constant $\epsilon$ is found from the following formula (2):

[Formula 2]

$$\epsilon = \epsilon_r \times \epsilon_0 \quad (2)$$

In formula (2), $\epsilon 0$ denotes a vacuum dielectric constant which is $8.854 \times 10^{-12}$ [F/m], and $\epsilon r$ denotes a specific dielectric constant which represents the ratio of the dielectric constant $\epsilon$ to the vacuum dielectric constant $\epsilon 0$.

As shown by the above-mentioned formula (1), the larger the radius r, the larger the capacitance C. In addition, the magnitude of the capacitance C of a conductor having a complex shape other than a sphere may not be easily expressed in a simple form such as the above-mentioned formula (1), but it is apparent that the magnitude of the capacitance C varies according to the magnitude of the surface area of the conductor.

As mentioned above, the transmission reference electrode 112 forms the capacitance with respect to the space neighboring the transmitter 110, while the reception reference electrode 122 forms the capacitance with respect to the space neighboring the receiver 120. Namely, as viewed from an imaginary infinity point outside each of the transmitter 110 and the receiver 120, the potential at the corresponding one of the transmission reference electrode 112 and the reception reference electrode 122 is fixed and does not easily vary.

The principle of communication in the communication system 100 will be described below. In the following description, for convenience of explanation, the term "capacitor" will be expressed simply as "capacitance" according to context, but these terms have the same meaning.

In the following description, it is assumed that the transmitter 110 and the receiver 120 shown in FIG. 1 are arranged to maintain a sufficient distance therebetween so that their mutual influence can be neglected. In the transmitter 110, it is assumed that the transmission signal electrode 111 is capacitively coupled to only the communication medium 130 and the transmission reference electrode 112 is spaced a sufficient distance apart from the transmission signal electrode 111 so that their mutual influence can be neglected (the electrodes 112 and 111 are not capacitively coupled).

Similarly, in the receiver 120, it is assumed that the reception signal electrode 121 is capacitively coupled to only the communication medium 130 and the reception reference electrode 122 is spaced a sufficient distance apart from the reception signal electrode 121 so that their mutual influence can be neglected (the electrodes 122 and 121 are not capacitively coupled). Furthermore, since the transmission signal electrode 111, the reception signal electrode 121 and the communication medium 130 are actually arranged in a space, each of them has a capacitance relative to the space, but the capacitance is assumed to be herein negligible for convenience of explanation.

Figure 2:
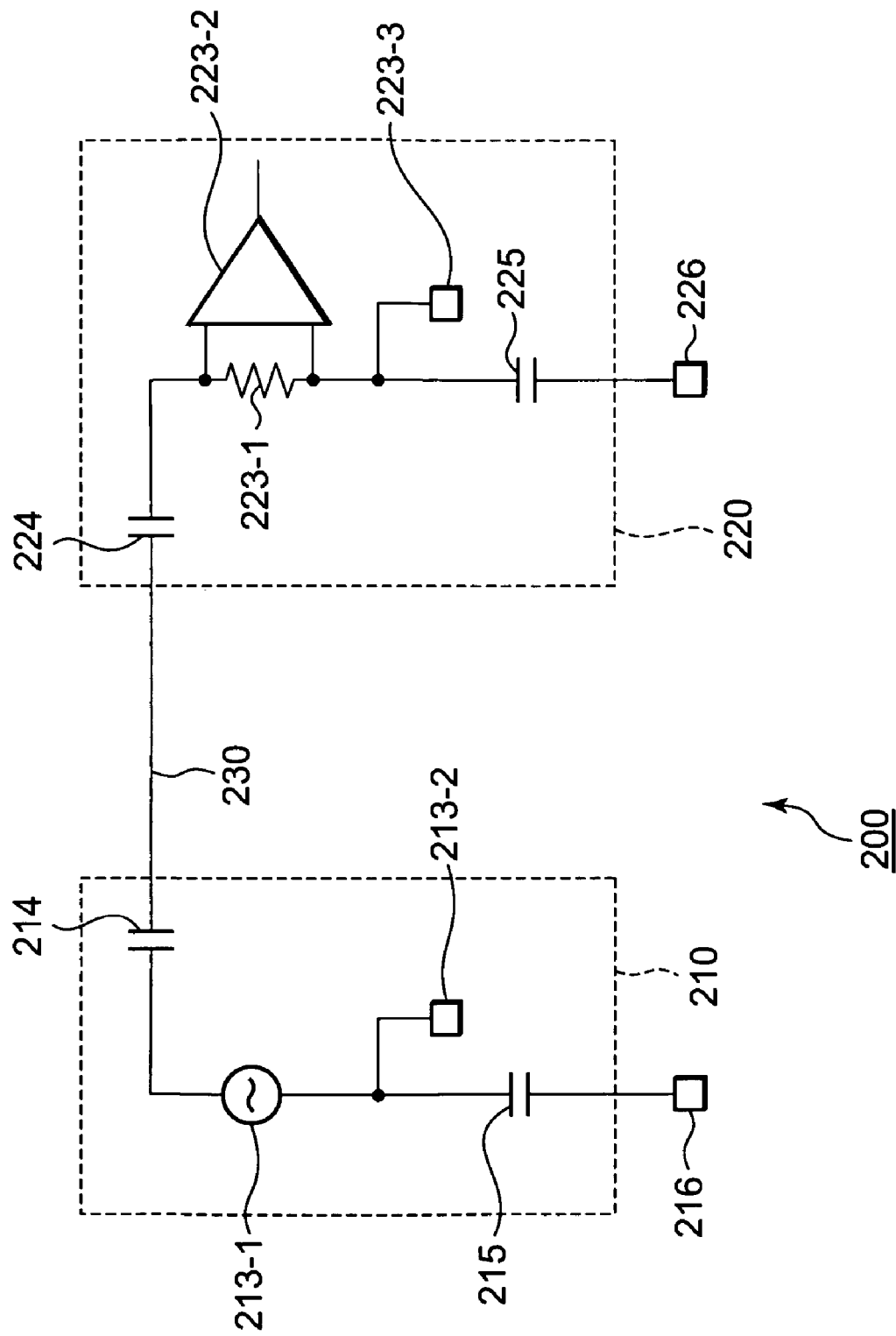
FIG. 2 is a diagram showing an example of an equivalent circuit of the communication system shown in FIG. 1.

FIG. 2 is a diagram showing an equivalent circuit of the communication system 100 shown in FIG. 1. A communication system 200 is the equivalent circuit of the communication system 100 and is substantially equivalent to the communication system 100.

Namely, the communication system 200 has a transmitter 210, a receiver 220, and a connection line 230, and the transmitter 210 corresponds to the transmitter 110 of the communication system 100 shown in FIG. 1, the receiver 220 corresponds to the receiver 120 of the communication system 100 shown in FIG. 1, and the connection line 230 corresponds to the communication medium 130 of the communication system 100 shown in FIG. 1.

In the transmitter 210 shown in FIG. 2, a signal source 213-1 and a ground point 213-2 correspond to the transmitter section 113 shown in FIG. 1. The signal source 213-1 generates a sine wave of particular frequency ωxt [rad] as a transmit signal. If t [s] denotes time and ω [rad/s] denotes angular frequency, formula (3) can be expressed as follows:

[Formula 3]

$$\omega = 2 \times \pi \times f \quad (3)$$

In formula (3), $\pi$ denotes a circular constant and f [Hz] denotes the frequency of the signal generated by the signal source 213-1. The ground point 213-2 is a point connected to the ground of the circuit inside the transmitter 210. Namely, one of the terminals of the signal source 213-1 is connected to a predetermined reference potential of the circuit inside the transmitter 210.

Cte 214 is a capacitor, and denotes the capacitance between the transmission signal electrode 111 and the communication medium 130 shown in FIG. 1. Namely, Cte 214 is provided between the terminal of the signal source 213-1 opposite to the ground point 213-2 and the connection line 230. Ctg 215 is a capacitor, and denotes the capacitance of the transmission signal electrode 112 shown in FIG. 1 with respect to the space. Namely, Ctg 215 is provided between the terminal of the signal source 213-1 on the side of the ground point 213-2 and a ground point 216 indicative of the infinity point (imaginary point) based on the transmitter 110 in the space.

In the receiver 220 shown in FIG. 2, Rr 223-1, a detector 223-2, and a ground point 223-3 correspond to the receiver section 123 shown in FIG. 1. Rr 223-1 is a load resistor (receive load) for extracting a received signal, and the detector 223-2 made of an amplifier detects and amplifies the potential difference between the opposite terminals of this Rr 223-1. The ground point 223-3 is a point connected to the ground of the circuit inside the receiver 220. Namely, one of the terminals of Rr 223-1 (one of the input terminals of the detector 223-2) is set to a predetermined reference potential of the circuit inside the receiver 220.

The detector 223-2 may also be adapted to be further provided with other functions, for example, the function of demodulating a detected modulated signal or decoding encoded information contained in the detected signal.

Cre 224 is a capacitor, and denotes the capacitance between the reception signal electrode 121 and the communication medium 130 shown in FIG. 1. Namely, Cre 224 is provided between the terminal of Rr 223-1 opposite to the ground point 223-3 and the connection line 230. Crg 225 is a capacitor, and denotes the capacitance of the reception reference electrode 122 shown in FIG. 1 with respect to the space. Namely, Crg 225 is provided between the terminal of Rr 223-1 on the side of the ground point 223-3 and a ground point 226 indicative of the infinity point (imaginary point) based on the receiver 120 in the space.

The connection line 230 denotes the communication medium 130 which is a perfect conductor. In the receiver 220 shown in FIG. 2, Ctg 215 and Crg 225 are shown to be electrically connected to each other via the ground point 216 and the ground point 226 on the equivalent circuit, but in practice, Ctg 215 and Crg 225 need not be electrically connected to each other and each of Ctg 215 and Crg 225 may form a capacitance with respect to the space neighboring the corresponding one of the transmitter 210 and the receiver 220. Namely, the ground point 216 and the ground point 226 need not be electrically connected and may also be independent of each other.

It should be noted that, if a conductor exists in a space, a capacitance proportional to the surface area of the conductor is necessarily formed. Namely, for example, the transmitter 210 and the receiver 220 may be spaced as far apart as desired from each other. For example, if the communication medium 130 shown in FIG. 1 is a perfect conductor, the conductivity of the connection line 230 can be regarded as infinite, so that the length of the connection line 230 does not influence communication. In addition, if the communication medium 130 is a conductor of sufficient conductivity, the distance between the transmitter 210 and the receiver 220 does not influence the stability of communication in practical terms.

In the communication system 200, a circuit is formed by the signal source 213-1, Rr 223-1, Cte 214, Ctg 215, Cre 224 and Crg 225. The combined capacitance Cx of the four series-connected capacitors (Cte 214, Ctg 215, Cre 224 and Crg 225) can be expressed by the following formula (4):

[Formula 4]

$$C_x = \frac{1}{\frac{1}{Cte} + \frac{1}{Ctg} + \frac{1}{Cre} + \frac{1}{Crg}} [F] \qquad (4)$$

The sine wave vf(t) generated by the signal source 213-1 can be expressed by the following formula (5):

[Formula 5]

$$V_t(t) = V_m \times \sin(\omega t + \theta)[V] \qquad (5)$$

In formula (5), Vm [V] denotes the maximum amplitude voltage of the signal source voltage and θ [rad] denotes the initial phase angle of the same. Namely, the effective value Vtrms [V] of the voltage generated by the signal source 213-1 can be found from the following formula (6):

[Formula 6]

$$V_{trms} = \frac{V_m}{\sqrt{2}}[V] \qquad (6)$$

The complex impedance Z of the entire circuit can be found from the following formula (7):

[Formula 7]

$$Z = \sqrt{Rr^2 + \frac{1}{(\omega C_x)^2}} \qquad (7)$$
$$= \sqrt{Rr^2 + \frac{1}{(2\pi f C_x)^2}} [\Omega]$$

Namely, the effective value Vrrms of the voltage provided across both ends of Rr 223-1 can be found from the following formula (8):

[Formula 8]

$$V_{rrms} = \frac{Rr}{Z} \times V_{trms} \qquad (8)$$
$$= \frac{Rr}{\sqrt{Rr^2 + \frac{1}{(2\pi f C_x)^2}}} \times V_{trms}[V]$$

Accordingly, as shown in formula (8), the larger the resistance value of Rr 223-1, the larger the capacitance Cx, and the higher the frequency f [Hz] of the signal source 213-1, the smaller the term of 1/((2×π×f×Cx)2), so that a larger signal can be generated across Rr 223-1.

When it is assumed, for example, that: the effective value Vtrms of the voltage generated by the signal source 213-1 of the transmitter 210 is fixed to 2 [V]; the frequency f of the signal generated by the signal source 213-1 is set to 1 [MHz], 10 [MHz] or 100 [MHz]; the resistance value of Rr 223-1 is set to 10K [Ω], 100K [Ω] or 1M [Ω]; and the capacitance Cx of the entire circuit is set to 0.1 [pF], 1 [pF] or 10 [pF], the calculated result of the effective value Vrrms of the voltage generated across Rr 223-1 is as listed in Table 250 shown in FIG. 3.

As shown in Table 250, the calculated result of the effective value Vrrms takes on a larger value when the frequency f is 10 [MHz] than when the frequency f is 1 [MHz], when the resistance value of the receive load Rr 223-1 is 1M [Ω] than when the resistance value is 10K [Ω], or when the capacitance Cx is 10 [pF] than when the capacitance Cx is 0.1 [pF], as long as the other conditions are the same. Namely, as the value of the frequency f, the resistance value of Rr 223-1 or the capacitance Cx is made larger, a larger effective value Vrrms can be obtained.

It can also be seen from Table 250 that an electrical signal is generated across Rr 223-1 even in the case of a capacitance of a picofarad or less. Namely, even if the signal level of a signal to be transmitted is small, it is possible to effect communication as by amplifying a signal detected by the detector 223-2 of the receiver 220.

Figure 4:
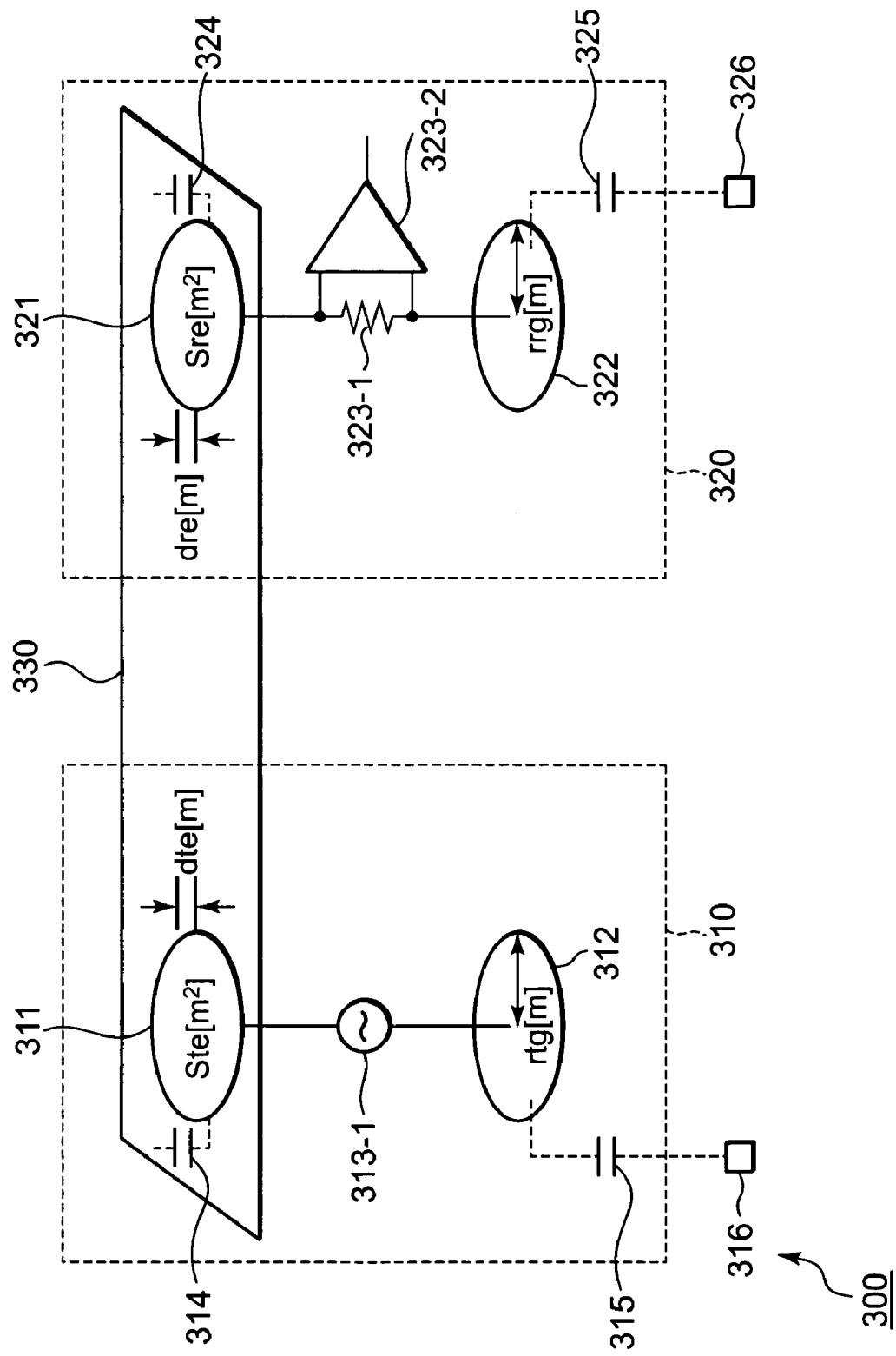
FIG. 4 is a diagram showing an example of a model of a physical construction of the communication system shown in FIG. 1.

A calculation example of each parameter of the communication system 200 which has been mentioned above as an equivalent circuit will be specifically described below with reference to FIG. 4. FIG. 4 is a diagram aiding in explaining calculation examples inclusive of the influence of the physical construction of the communication system 100.

A communication system 300 shown in FIG. 4 is a system corresponding to the communication system 100 shown in FIG. 1, and information about the physical construction of the communication system 100 is added to the communication system 200 shown in FIG. 2. Namely, the communication system 300 has a transmitter 310, a receiver 320, and a communication medium 330. As compared with the communication system 100 shown in FIG. 1, the transmitter 310 corresponds to the transmitter 110, the receiver 320 corresponds to the receiver 120, and the communication medium 330 corresponds to the communication medium 130.

The transmitter 310 has a transmission signal electrode 311 corresponding to the transmission signal electrode 111, a transmission reference electrode 312 corresponding to the transmission reference electrode 112, and a signal source 313-1 corresponding to the transmitter section 113. Namely, the transmission signal electrode 311 is connected to one of both terminals of the signal source 313-1, and the transmission reference electrode 312 is connected to the other. The transmission signal electrode 311 is provided in close proximity to the communication medium 330. The transmission reference electrode 312 is provided to be spaced from the communication medium 330 to such an extent that the transmission reference electrode 312 is not influenced by the communication medium 330, and is constructed to have a capacitance with respect to a space outside the transmitter 310. Although the signal source 213-1 and the ground point 213-2 have been described as corresponding to the transmitter section 113 with reference to FIG. 2, such ground point is omitted in FIG. 4 for convenience of explanation.

Similarly to the transmitter 310, the receiver 320 has a reception signal electrode 321 corresponding to the reception signal electrode 121, a reception reference electrode 322 corresponding to the reception reference electrode 122, and Rr 323-1 and a detector 323-2 corresponding to the receiver section 123. Namely, the reception signal electrode 321 is connected to one of both terminals of Rr 323-1, and the reception reference electrode 322 is connected to the other. The reception signal electrode 321 is provided in close proximity to the communication medium 330. The reception reference electrode 322 is provided to be spaced from the communication medium 330 to such an extent that the transmission reference electrode 312 is not influenced by the communication medium 330, and is constructed to have a capacitance with respect to a space outside the receiver 320. Although Rr 223-1, the detector 223-2 and the ground point 223-3 have been described as corresponding to the receiver section 123 with reference to FIG. 2, such ground point is omitted in FIG. 4 for convenience of explanation.

In addition, it is assumed that the communication medium 330 is a perfect conductor as in the cases shown in FIGS. 1 and 2. It is also assumed that the transmitter 310 and the receiver 320 are arranged to maintain a sufficient distance therebetween so that their mutual influence can be neglected. It is further assumed that the transmission signal electrode 311 is capacitively coupled to only the communication medium 330 and the transmission reference electrode 312 is spaced a sufficient distance apart from the transmission signal electrode 311 so that their mutual influence can be neglected. Similarly, it is assumed that the reception signal electrode 321 is capacitively coupled to only the communication medium 330 and the reception reference electrode 322 is spaced a sufficient distance apart from the reception signal electrode 321 so that their mutual influence can be neglected. Strictly, each of the transmission signal electrode 311, the reception signal electrode 321 and the communication medium 330 has a capacitance relative to the space, but the capacitance is assumed to be herein negligible for convenience of explanation.

As shown in FIG. 4, in the communication system 300, the transmitter 310 is arranged at one end of the communication medium 330, and the receiver 320 is arranged at the other end.

It is assumed that a space of distance dte [m] is formed between the transmission signal electrode 311 and the communication medium 330. If the transmission signal electrode 311 is assumed to be a conductive disk having a surface area Ste [m2] on one side, a capacitance Cte 314 formed between the transmission signal electrode 311 and the communication medium 330 can be found from the following formula (9):

[Formula 9]

$$Cte = \varepsilon \times \frac{Ste}{dte}[F] \qquad (9)$$

Formula (9) is a generally known mathematical formula for the capacitance of a parallel plate. Formula (9) is a mathematical formula to be applied to the case where parallel plates have the same area, but since formula (9) does not provide a seriously impaired result even when applied to the case where parallel plates have different areas, formula (9) is used herein. In formula (9), $\varepsilon$ denotes a dielectric constant, and if the communication system 300 is assumed to be placed in the air, the specific dielectric constant $\varepsilon r$ can be regarded as approximately 1, so that the dielectric constant $\varepsilon 0$ can be regarded as equivalent to the vacuum dielectric constant $\varepsilon 0$. If it is assumed that the surface area Ste of the transmission signal electrode 311 is $2 \times 10^{-3}$ [m2] (approximately 5 [cm] in diameter) and the distance dte is $5 \times 10^{-3}$ [m] (5 [mm]), the capacitance Cte 314 can be found from the following formula (10):

[Formula 10]

$$Cte = (8.854 \times 10^{-12}) \times \frac{2 \times 10^{-3}}{5 \times 10^{-3}} \qquad (10)$$
$$\approx 3.5 \ [pF]$$

It should be noted that, in terms of physical phenomena, the above-mentioned formula (9) is strictly applicable to the case where the relationship of Ste>>dte is satisfied, but it is assumed herein that the capacitance Cte 314 can be approximated by formula (9).

A capacitance Cte 315 formed by the transmission reference electrode 312 and a space will be described below. In general, if a disk of radius r [m] is placed in a space, a capacitance C [F] which is formed between the disk and the space can be found from the following formula (11):

[Formula 11]

$$C = 8 \times \varepsilon \times r [F] \qquad (11)$$

If the transmission reference electrode 312 is a conductive disk of radius rtg=$2.5 \times 10^{-2}$ [m] (radius of 2.5 [cm]), the capacitance Cte 315 formed by the transmission reference electrode 312 and the space can be found by using the above-mentioned formula (11), as shown in the following formula (12). It is assumed here that the communication system 300 is placed in the air, the dielectric constant of the space can be approximated by the vacuum dielectric constant $\epsilon 0$.

[Formula 12]

$$Ctg = 8 \times 8.854 \times 10^{-12} \times 2.5 \times 10^{-2} \quad (12)$$
$$\approx 1.8 \ [pF]$$

If the reception signal electrode 321 is the same in size as the transmission signal electrode 311 and the space between the reception signal electrode 321 and the communication medium 330 is the same as the space between the transmission signal electrode 311 and the communication medium 330, a capacitance Cre 324 which is formed by the reception signal electrode 321 and the communication medium 330 is 3.5 [pF] as in the case of the transmission side. If the reception reference electrode 322 is the same in size as the transmission reference electrode 312, a capacitance Crg 325 which is formed by the reception reference electrode 322 and a space is 1.8 [pF] as in the case of the transmission side. Accordingly, the combined capacitance Cx of the four electrostatic capacities Cte 314, Ctg 315, Cre 324 and Crg 325 can be expressed by using the above-mentioned formula (4), as shown in the following formula (13):

[Formula 13]

$$C_x = \cfrac{1}{\cfrac{1}{Cte} + \cfrac{1}{Ctg} + \cfrac{1}{Cre} + \cfrac{1}{Crg}} \quad (13)$$

$$= \cfrac{1}{\cfrac{1}{3.5 \times 10^{-12}} + \cfrac{1}{1.8 \times 10^{-12}} + \cfrac{1}{3.5 \times 10^{-12}} + \cfrac{1}{1.8 \times 10^{-12}}}$$

$$\approx 0.6 \ [pF]$$

More strictly,

Cx=0.525[pF]

is obtained.

If it is assumed that: the frequency f of the signal source 313-1 is 1 [MHz]; the effective value vtrms of the voltage generated by the signal source 313-1 is 2 [V]; and the resistance value of Rr 323-1 is set to 100K [Ω], the voltage Vrrms generated across Rr 323-1 can be found from the following formula (14):

[Formula 14]

$$V_{rrms} = \cfrac{Rr}{\sqrt{Rr^2 + \cfrac{1}{(2\pi f C_x)^2}}} \times V_{trms} \quad (14)$$

$$= \cfrac{1 \times 10^5}{\sqrt{(1 \times 10^5)^2 + \cfrac{1}{(2 \times \pi \times (1 \times 10^6) \times (0.6 \times 10^{-12}))^2}}} \times 2$$

$$\approx 0.71 \ [V]$$

As is apparent from the above-mentioned result, it is possible to transmit signals from a transmitter to a receiver as a basic principle by using electrostatic capacities formed by spaces.

The above-mentioned electrostatic capacities of the transmission reference electrode and the reception reference electrode with respect to the respective spaces can be formed only if a space exits at the location of each of the electrodes. Accordingly, only if the transmission signal electrode and the reception signal electrode are coupled via the communication medium, the transmitter and the receiver can achieve stability of communication irrespective of their mutual distance.

Figure 5:
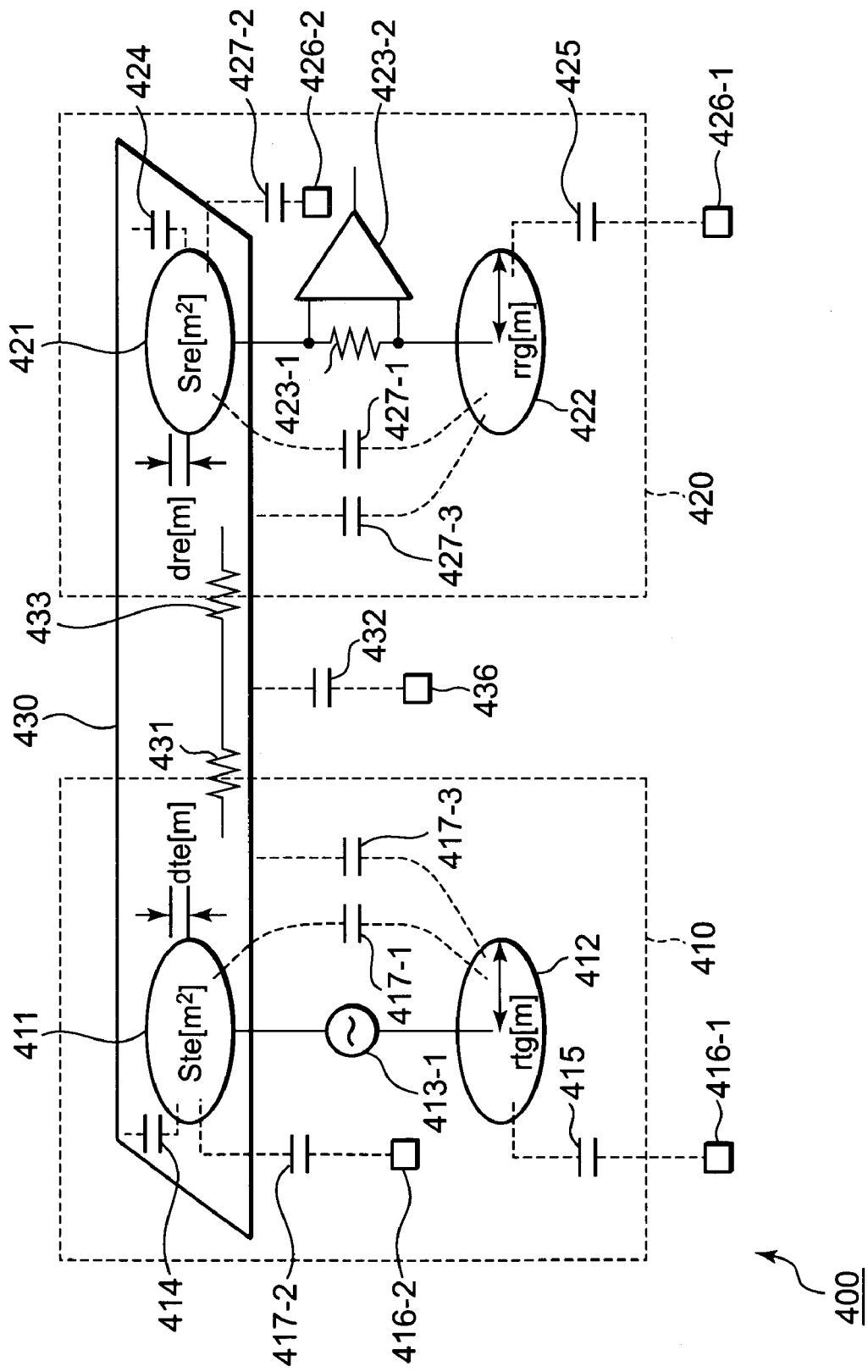
FIG. 5 is a diagram showing an example of a calculation model of each parameter generated in the model shown in FIG. 4.

The case where the present inventive communication system is actually physically constructed will be described below. FIG. 5 is a diagrams showing an example of a calculation model for parameters generated in a case where any of the above-mentioned communication systems is actually physically constructed.

Namely, a communication system 400 has a transmitter 410, a receiver 420, and a communication medium 430, and is a system which corresponds to the above-mentioned communication system 100 (the communication system 200 or the communication system 300) and is basically the same in construction as any of the communication systems 100 to 300 except that parameters to be evaluated differ.

As compared with the communication system 300, the transmitter 410 corresponds to the transmitter 310, a transmission signal electrode 411 of the transmitter 410 corresponds to the transmission signal electrode 311, a transmission reference electrode 412 corresponds to the transmission reference electrode 312, and a signal source 413-1 corresponds to the signal source 313-1. The receiver 420 corresponding to the receiver 320, a reception signal electrode 421 of the receiver 420 corresponds to the reception signal electrode 321, a reception reference electrode 422 corresponds to the reception reference electrode 322, Rr 423-1 corresponds to Rr 323-1, and a detector 423-2 corresponds to the detector 323-2. In addition, the communication medium 430 corresponds to the communication medium 330.

Referring to the parameters, a capacitance Cte 414 between the transmission signal electrode 411 and the communication medium 430 corresponds to Cte 314 of the communication system 300, a capacitance Ctg 415 of the transmission reference electrode 412 with respect to a space corresponds to Ctg 315 of the communication system 300, and a ground point 416-1 indicative of an imaginary infinity point in a space outside the transmitter 410 corresponds to the ground point 316 of the communication system 300. The transmission signal electrode 411 is a disk-shaped electrode of area Ste [m2] and is provided at a location away from the communication medium 430 by a small distance dte [m]. The transmission reference electrode 412 is also a disk-shaped electrode and has a radius rtg [m].

In the receiver 420, a capacitance Cre 424 between the reception signal electrode 421 and the communication medium 430 corresponds to Cre 324 of the communication system 300, a capacitance Crg 425 of the reception reference electrode 422 with respect to a space corresponds to Crg 325 of the communication system 300, and a ground point 426-1 indicative of an imaginary infinity point in a space outside the receiver 420 corresponds to the ground point 326 of the communication system 300. The reception signal electrode 421 is a disk-shaped electrode of area Sre [m2] and is provided at a location away from the communication medium 430 by a small distance dre [m]. The reception reference electrode 422 is also a disk-shaped electrode and has a radius rrg [m].

The communication system 400 shown in FIG. 5 is a model in which the following new parameters are added to the above-mentioned parameters.

For example, regarding the transmitter 410, the following parameters are added as new parameters: a capacitance Ctb 417-1 formed between the transmission signal electrode 411 and the transmission reference electrode 412, a capacitance Cth 417-2 formed between the transmission signal electrode 411 and a space, and a capacitance Cti 417-3 formed between the transmission reference electrode 412 and the communication medium 430.

Regarding the receiver 420, the following parameters are added as new parameters: a capacitance Crb 427-1 formed between the reception signal electrode 421 and the reception reference electrode 422, a capacitance Crh 427-2 formed between the reception signal electrode reception signal electrode 421 and a space, and a capacitance Cri 427-3 formed between the reception reference electrode 422 and the communication medium 430.

Furthermore, regarding the communication medium 430, a capacitance Cm 432 formed between the communication medium 430 and a space is added as a new parameter. In addition, since the communication medium 430 actually has an electrical resistance based on its size, its material and the like, resistance values Rm 431 and Rm 433 are added as new parameters corresponding to the resistance component.

Although illustration is omitted in the communication system 400 shown in FIG. 5, if the communication medium 430 has not only conductivity but also dielectricity, a capacitance according to the dielectric constant is also formed. In addition, if the communication medium 430 does not have conductivity and a capacitance is formed by only dielectricity, the capacitance, which is determined by the dielectric constant, the distance, the size and the arrangement of the dielectric material of the communication medium 430, is formed between the transmission signal electrode 411 and the reception signal electrode 421.

In addition, in the communication system 400 shown in FIG. 5, it is assumed that the distance between the transmitter 410 and the receiver 420 is apart to such an extent that a factor such as their mutual capacitive coupling can be neglected (the influence of the capacitive coupling between the transmitter 410 and the receiver 420 can be neglected). If the distance is short, there may be a need for taking account of a capacitance between the electrodes in the transmitter 410 and a capacitance between the electrodes in the receiver 420 in accordance with the above-mentioned approach, depending on the positional relationship between the electrodes in the transmitter 410 and that between the electrodes in the receiver 420.

Figure 6:
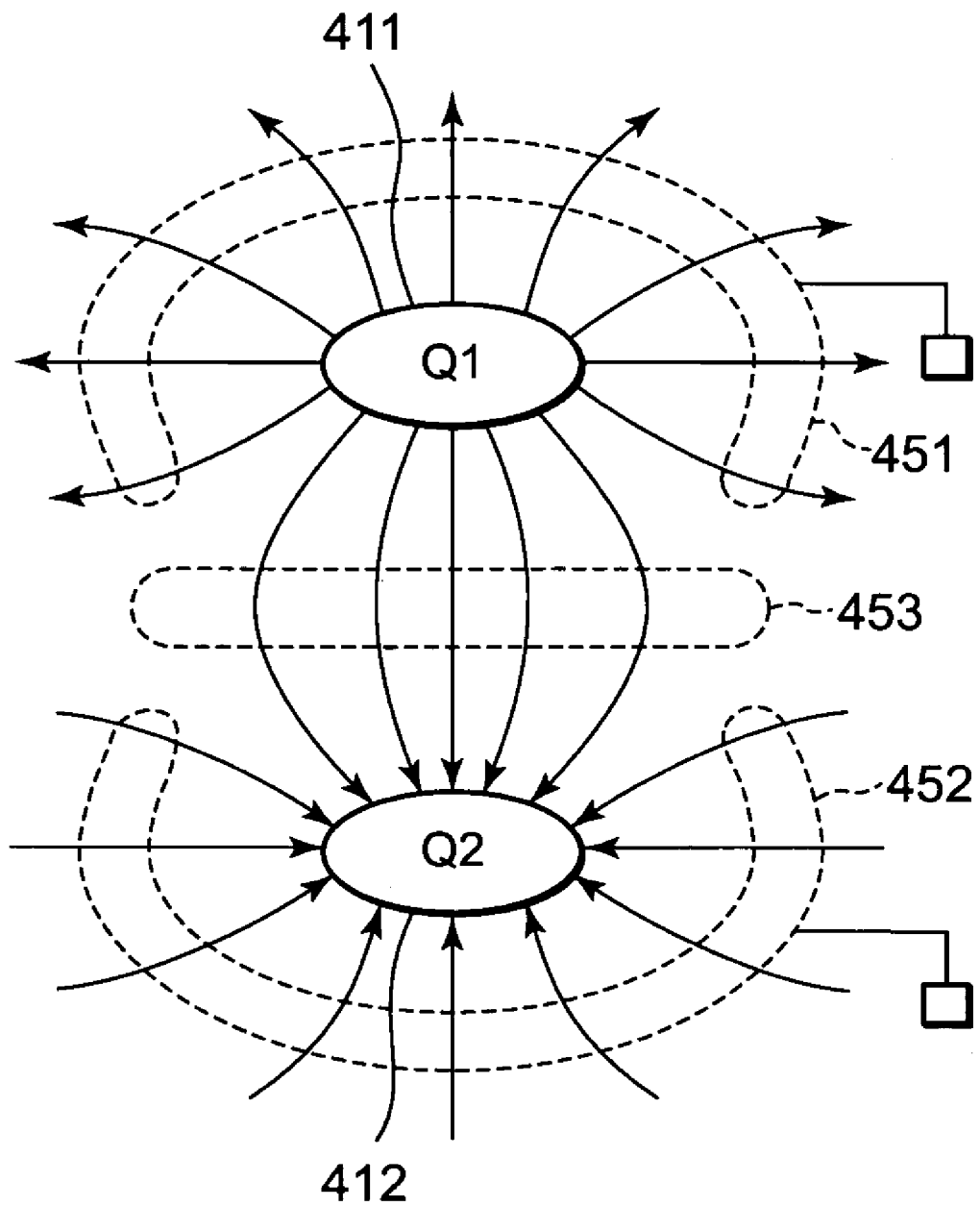
FIG. 6 is a schematic view showing an example of distribution of electric lines of force with respect to electrodes.

The operation of the communication system 400 shown in FIG. 5 will be described below by using electric lines of force. FIG. 6 is a schematic view in which the relationship between the electrodes in the transmitter 410 of the communication system 400 is represented by electric lines of force, and FIG. 7 is a schematic view in which the relationship between the electrodes in the transmitter 410 of the communication system 400 and the communication medium 430 is represented by electric lines of force.

FIG. 6 is a schematic view showing an example of distribution of electric lines of force in a case where the communication medium 430 does not exist. It is assumed that the transmission signal electrode 411 has positive charge (positively charged) and the transmission reference electrode 412 has negative charge (negatively charged). The arrows shown in FIG. 6 denote the electric lines of force, and the directions of the respective arrows are from positive charge to negative charge. The electric lines of force do not suddenly disappear halfway and have the property of arriving at either an object having charge of a different sign or the imaginary infinity point.

In FIG. 6, from among the electric lines of force emitted from the transmission signal electrode 411, electric lines of force 451 denote electric lines of force arriving at the infinity point, while from among the electric lines of force turning toward the transmission reference electrode 412, electric lines of force 452 denote electric lines of force arriving from the imaginary infinity point. Electric lines of force 453 denote electric lines of force produced between the transmission signal electrode 411 and the transmission reference electrode 412. As shown in FIG. 6, electric lines of force move from the positively charged electrode 411 of the transmitter 410, while electric lines of force move toward the negatively charged transmission reference electrode 412 of the transmitter 410. The distribution of the electric lines of force is influenced by the size of each of the electrodes and the positional relationship therebetween.

Figure 7:
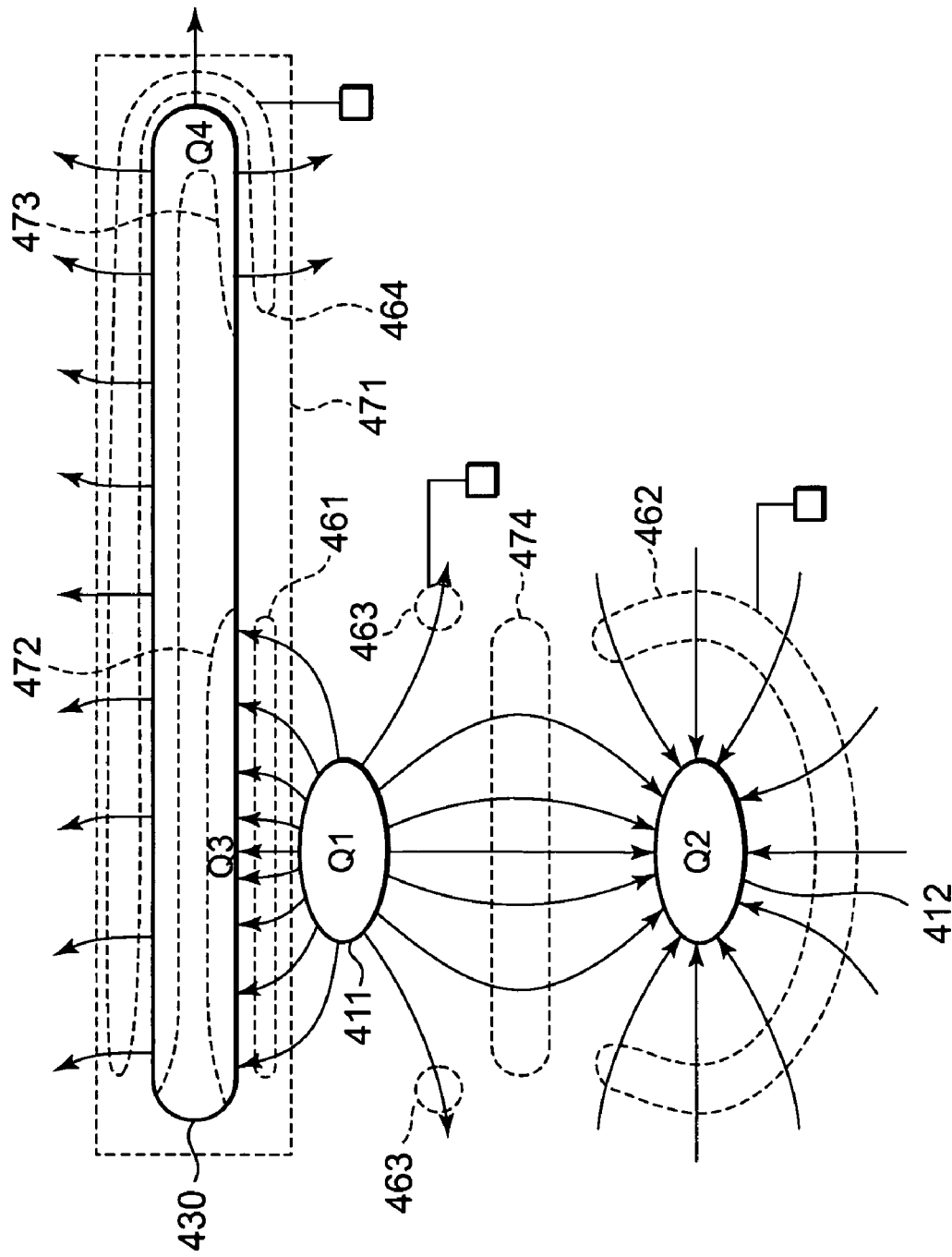
FIG. 7 is a schematic view showing another example of distribution of electric lines of force with respect to the electrodes.

FIG. 7 is a schematic view showing an example of electric lines of force in a case where the communication medium 430 is brought closer to the transmitter 410. As the communication medium 430 is brought closer to the transmission signal electrode 411, the coupling therebetween becomes stronger and most of the electric lines of force 451 arriving at the infinity point in FIG. 6 become electric lines of force 461 arriving at the communication medium 430, so that the number of electric lines of force 463 moving toward the infinity point (the electric lines of force 451 shown in FIG. 6) is decreased. Accordingly, the capacitance relative to the infinity point as viewed from the transmission signal electrode 411 (Cth 417-2 in FIG. 5) decreases, and the capacitance between the transmission signal electrode 411 and the communication medium 430 (Cth 417-2 in FIG. 5) increases. A capacitance (Cti 417-3 in FIG. 5) between the transmission reference electrode 412 and the communication medium 430 actually exists as well, but in FIG. 7, it is assumed that the capacitance is negligible.

According to Gauss's law, the number N of electric lines of force moving through an arbitrary closed surface S is equal to the charge enclosed in the closed surface S which is divided by the dielectric constant $\epsilon$, and is not influenced by charge outside the closed surface S. When it is assumed that n-number of charges exist in the closed surface S, the following formula is obtained:

[Formula 15]

$$N = \frac{1}{\varepsilon} \times \sum_{i=1}^{n} q_i \text{ pieces} \tag{15}$$

In formula (15), i denotes an integer, and a variable $q_i$ denotes the amount of charge accumulated in each of the electrodes. Formula (15) represents that electric lines of force emerging from the closed surface S of the transmission signal electrode 411 are determined by only electric lines of force emanated from the charges existing in the closed surface S, and all electric lines of force entering from the outside of the transmission reference electrode 412 leave from other locations.

According to this law, in FIG. 7, if it is assumed that the communication medium 430 is not grounded, a generation source of charge does not exist in a closed surface 471 near the communication medium 430, charge Q3 is induced by electrostatic induction in an area 472 of the communication medium 430 near the electric lines of force 461. Since the communication medium 430 is not grounded and the total amount of charge of the communication medium 430 does not change, charge Q4 which is equivalent in amount to but different in sign from the charge Q3 is induced in an area 743 outside the area 472 in which the charge Q3 is induced, so that electric lines of force 464 produced by the charge Q4 move out of the closed surface 471. The larger the size of the communication medium 430 becomes, the more the charge Q4 diffuses and the lower the charge density becomes, so that the number of electric lines of force per section area decreases.

If the communication medium 430 is a perfect conductor, the communication medium 430 has the property of becoming approximately equal in charge density irrespective of its sites, because the communication medium 430 has the characteristic that its potential becomes the same irrespective of the sites as the result of the property of the perfect conductor. If the communication medium 430 is a conductor having a resistance component, the number of electric lines of force decreases according to the distance between the communication medium 430 and the transmission signal electrode 411 in accordance with the resistance component. If the communication medium 430 is a dielectric having no conductivity, electric lines of force are diffused and propagated by its polarization action. If n-number of conductors exist in a space, the charge Qi of each of the conductors can be found from the following formula:

[Formula 16]

$$Q_i = \sum_{j=1}^{n} C_{ij} \times V_j \tag{16}$$

In formula (16), i and j denote integers, and Cij denotes a capacitance coefficient formed by the conductor i and the conductor j and may be considered to have the same property as capacitance. The capacitance coefficient is determined by only the shapes of the respective conductors and the positional relationship therebetween. The capacitance coefficient Cii becomes a capacitance that the conductor i itself forms with respect to a space. In addition, Cij=Cii. Formula (16) represents that a system formed by a plurality of conductors operates on the basis of the superposition theorem and that the charge of each of the conductors is determined by the sum of the products of the capacitance between the conductors and the potentials of the respective conductors.

It is assumed here that the mutually associated parameters shown in FIG. 7 and formula (16) are determined as follows. For example, Q1 denotes charge induced in the transmission signal electrode 411, Q2 denotes charge induced in the transmission reference electrode 412, Q3 denotes charge in the communication medium 430 by the transmission signal electrode 411, and Q4 denotes charge equivalent in amount to and different in sign to the charge Q3 in the communication medium 430.

V1 denotes the potential of the transmission signal electrode 411 with respect to the infinity point, V2 denotes the potential of the transmission reference electrode 412 with respect to the infinity point, V3 denotes the potential of the communication medium 430 with respect to the infinity point, C12 denotes the capacitance coefficient between the transmission signal electrode 411 and the transmission reference electrode 412, C13 denotes the capacitance coefficient between the transmission signal electrode 411 and the communication medium 430, C15 denotes the capacitance coefficient between the transmission signal electrode 411 and the space, C25 denotes the capacitance coefficient between the transmission reference electrode 412 and the space, and C35 denotes the capacitance coefficient between the communication medium 430 and the space.

At this time, the charge Q3 can be found from the following formula:

[Formula 17]

$$Q_3 = C13 \times V1 \tag{17}$$

Strictly, formula (17) is the following formula (17'), but since the second and third terms on the right-hand side of formula (17'), i.e., C23×V2+C53×V5, are small, formula (17) is used:

$$Q3 = C13 \times V1 + C23 \times V2 + C53 \times V5 \tag{17'}$$

If far more electric fields are to be injected into the communication medium 430, the charge Q3 may be increased. For this purpose, the capacitance coefficient C13 between the transmission signal electrode 411 and the communication medium 430 may be increased and a sufficient voltage V1 may be applied. The capacitance coefficient C13 is determined by only the shapes of the shapes of the transmission signal electrode 411 and the communication medium 430 and the positional relationship therebetween, and the closer the distance therebetween and the larger the areas of facing surfaces, the higher the capacitance therebetween. As to the potential V1, a sufficient voltage need be produced as viewed from the infinity point. In the transmitter 410, a potential difference is applied between the transmission signal electrode 411 and the transmission reference electrode 412 by the signal source 413-1, and the behavior of the transmission reference electrode 412 is important so that the potential can be produced as a sufficient potential as viewed from the infinity point as well.

If the transmission reference electrode 412 is small in size and the transmission signal electrode 411 has a sufficiently large size, the capacitance coefficients C12 and C25 become small, whereas the capacitance coefficients C13, C15 and C45 become electrically less variable because each of them has a large capacitance. Accordingly, most of the potential differences generated by the signal source appear as the potential V2 of the transmission reference electrode 412, so that the potential V1 of the transmission signal electrode 411 becomes small.

Figure 8:
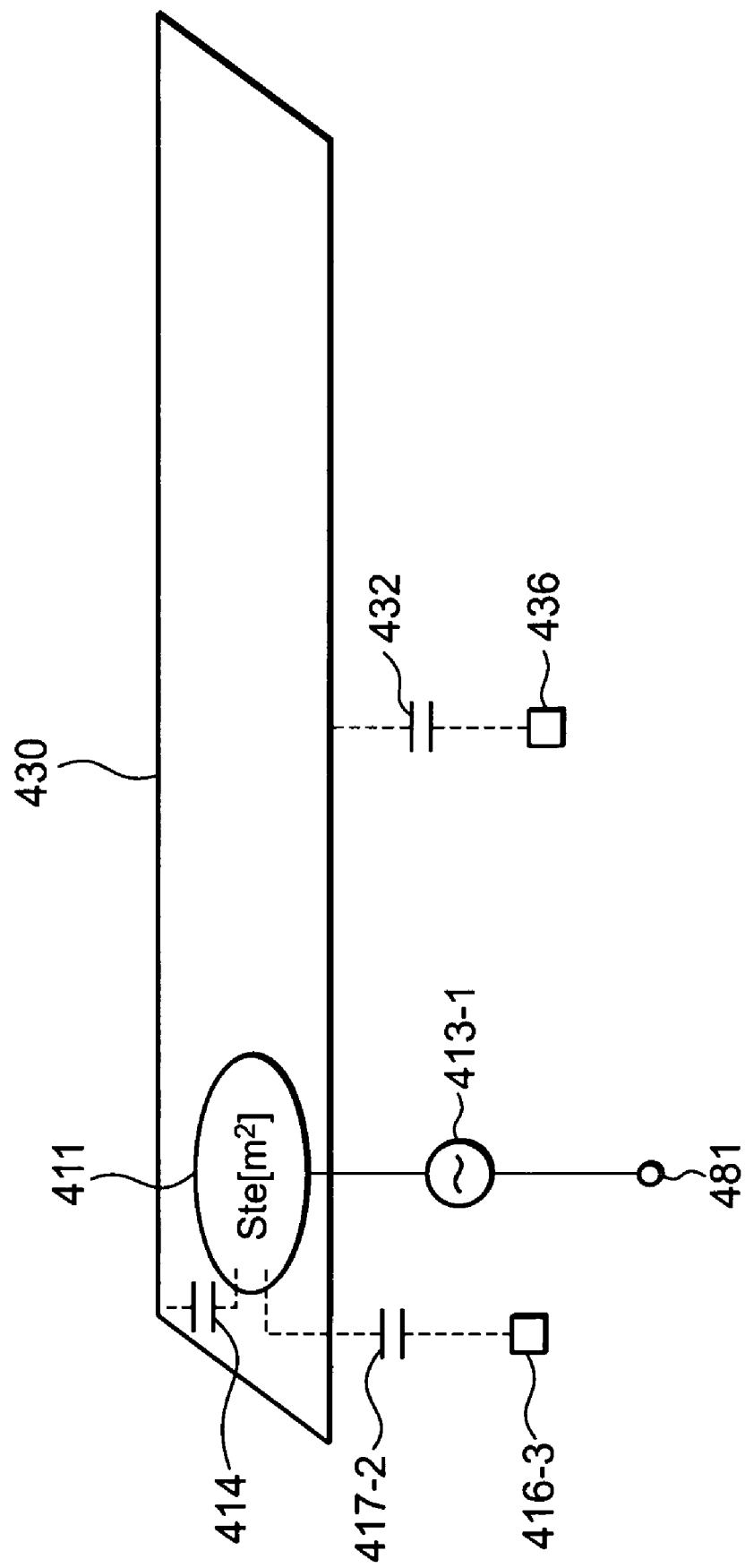
FIG. 8 is a diagram aiding in explaining another example of the model of electrodes in a transmitter.

FIG. 8 shows the above-mentioned status. A transmission reference electrode 481 is small in size and is not coupled to any of the conductors or the infinity point. The transmission signal electrode 411 forms the capacitance Cte 414 between itself and the communication medium 430, and forms the capacitance Cth 417-2 with respect to the space. The communication medium 430 forms a capacitance Cm 432 with respect to the space. Even if potentials are produced at the transmission signal electrode 411 and the transmission reference electrode 412, large energy is needed to vary these potentials, because the electrostatic capacities Cte 414, Cth 417-2 and Cm 432 associated with the transmission signal electrode 411 are overwhelmingly large. However, since the capacitance of the transmission reference electrode 481 on the opposite side of the signal source 413-1 is small, the potential of the transmission signal electrode 411 hardly varies, and most potential variations in the signal source 413-1 appear at the transmission reference electrode 481.

Contrarily, if the transmission signal electrode 411 is small in size and the transmission reference electrode 481 has a sufficiently large size, the capacitance of the transmission reference electrode 481 relative to the space increases and becomes to produce electrically less variation. Although a sufficient voltage V1 is produced at the transmission signal electrode 411, the capacitive coupling between the transmission signal electrode 411 and the communication medium 430 is decreased so that sufficient electric fields may not be injected.

Accordingly, on the basis of the balance of the entire system, it is necessary to provide a transmission reference electrode capable of giving a sufficient potential while enabling the electric fields necessary for communication to be injected from a transmission signal electrode to a communication medium. Although the above description has referred to only the transmission side, the relationship between the electrodes of the receiver 420 and the communication medium 430 can also be considered in the same manner.

The infinity point need not be at a physically long distance, and may be set in a space neighboring the device in practical terms. More ideally, it is desirable that the infinity point is more stable and does not show large potential variations in the entire system. In actual use environments, there is noise which is generated from AC power lines, illuminators and other electrical appliances, but such noise may be neglected if the noise does not overlap a frequency bandwidth to be used by at least a signal source or is of negligible level.

Figure 9:
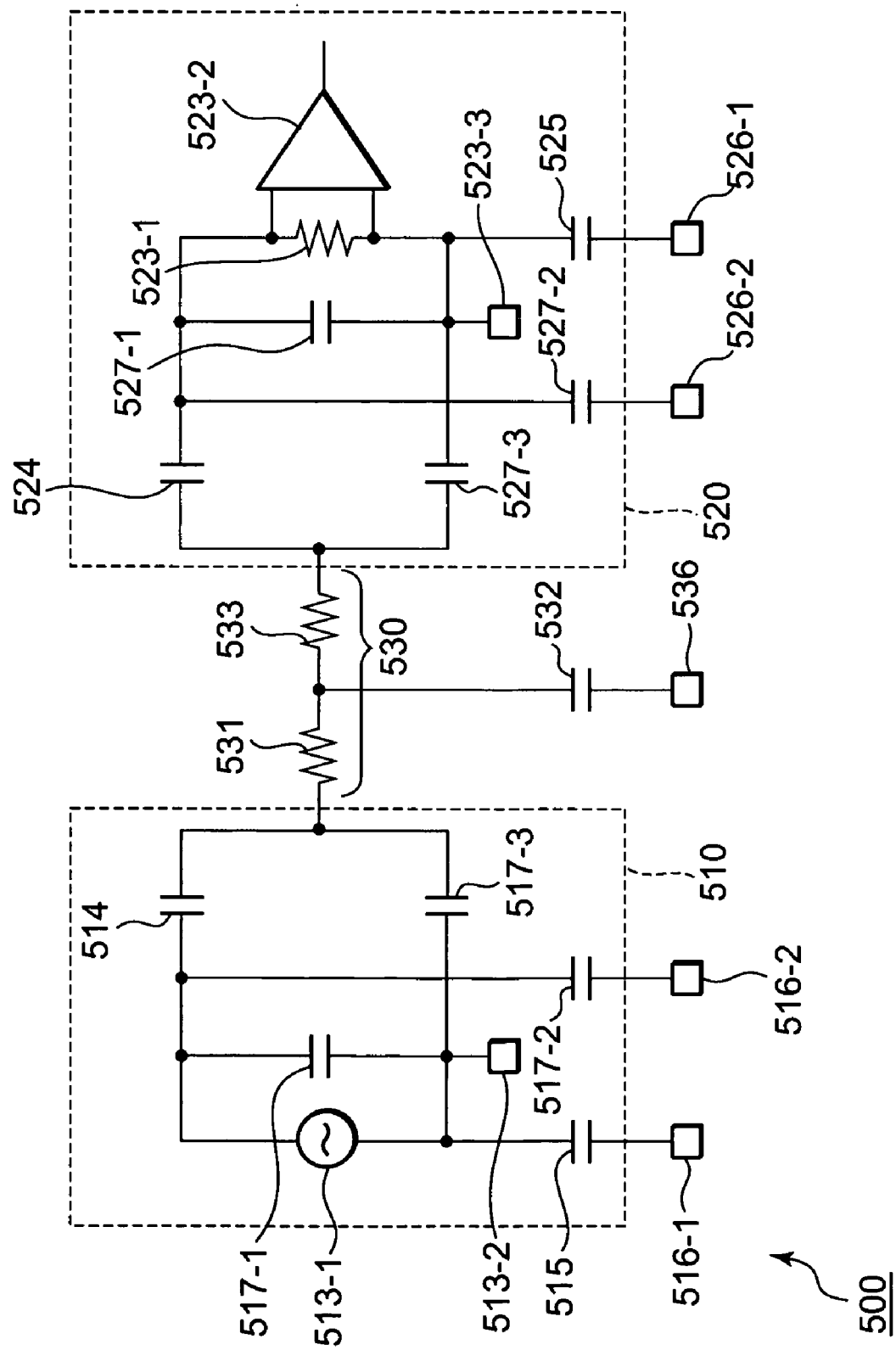
FIG. 9 is a diagram showing an example of an equivalent circuit of the model shown in FIG. 5.

FIG. 9 is a diagram showing an equivalent circuit of the model (the communication system 400) shown in FIG. 5. As in the relationship between FIGS. 2 and 4, a communication system 500 shown in FIG. 9 corresponds to the communication system 400 shown in FIG. 5, a transmitter 510 of the communication system 500 corresponds to the transmitter 410 of the communication system 400, a receiver 520 of the communication system 500 corresponds to the receiver 420 of the communication system 400, and a connection line 530 of the communication system 500 corresponds to the communication medium 430 of the communication system 400.

Similarly, in the transmitter 510 shown in FIG. 9, a signal source 513-1 corresponds to the signal source 413-1. In the transmitter 510 shown in FIG. 9, there is shown a ground point 513-2 which is omitted in FIG. 5, corresponds to the ground point 213-2 in FIG. 2, and indicates ground in the circuit inside the transmitter section 113 shown in FIG. 1.

Cte 514 in FIG. 9 is a capacitance corresponding to Cte 414 in FIG. 5, Ctg 515 is a capacitance corresponding to Ctg 415 in FIG. 5, and ground points 516-1 and 516-2 respectively correspond to the ground points 416-1 and 416-2. In addition, Ctb 517-1, Cth 517-2 and Cti 517-3 are capacitances corresponding to Ctb 417-1, Cth 417-2 and Cti 417-3, respectively.

Similarly, in the receiver 520, Rr 523-1 and a detector 523-2 respectively correspond to Rr 423-1 and the detector 423-2 shown in FIG. 5. In addition, in the receiver 520 shown in FIG. 9, there is shown a ground point 523-3 which is omitted in FIG. 5, corresponds to the ground point 223-2 in FIG. 2, and indicates ground in the circuit inside the receiver section 123 shown in FIG. 1.

Cre 524 in FIG. 9 is a capacitance corresponding to Cre 424 in FIG. 5, Crg 525 is a capacitance corresponding to Crg 425 in FIG. 5, and ground points 526-1 and 526-2 respectively correspond to the ground points 426-1 and 426-2. In addition, Crb 527-1, Crh 527-2 and Cri 527-3 are capacitances corresponding to Crb 427-1, Crh 427-2 and Cri 427-3, respectively.

Similarly, as to elements connected to the connection line 530, Rm 531 and Rm 533 which are resistance components of the connection line 530 correspond to Rm 431 and Rm 433, respectively, Cm 532 corresponds to Cm 432, and a ground point 536 corresponds to the ground point 436.

The communication system 500 has the following characteristics.

For example, the larger the value of Cte 514 (the higher the capacitance), the larger signal the transmitter 510 can apply to the connection line 530 corresponding to the communication medium 430. In addition, the larger the value of Ctg 512 (the higher the capacitance), the larger signal the transmitter 510 can apply to the connection line 530. Furthermore, the smaller the value of Ctb 517-1 (the lower the capacitance), the larger signal the transmitter 510 can apply to the connection line 530. In addition, the smaller the value of Cth 512-2 (the lower the capacitance), the larger signal the transmitter 510 can apply to the connection line 530. Furthermore, the smaller the value of Cti 517-3 (the lower the capacitance), the larger signal the transmitter 510 can apply to the connection line 530.

The larger the value of Cre 524 (the higher the capacitance), the larger signal the receiver 520 can extract from the connection line 530 corresponding to the communication medium 430. In addition, the larger the value of Crg 525 (the higher the capacitance), the larger signal the receiver 520 can extract from the connection line 530. Furthermore, the smaller the value of Crb 527-1 (the lower the capacitance), the larger signal the receiver 520 can extract from the connection line 530. In addition, the smaller the value of Cth 527-2 (the lower the capacitance), the larger signal the transmitter 530 can extract from the connection line 530. Furthermore, the smaller the value of Cri 527-3 (the lower the capacitance), the larger signal the receiver 520 can extract from the connection line 530. In addition, the lower the value of Rr 523 (the lower the resistance), the larger signal the receiver 520 can extract from the connection line 530.

The lower the values of Rm 531 and Rm 533 which are the resistance components of the connection line 530 (the lower the resistances), the larger signal the transmitter 510 can apply to the connection line 530. The smaller the value of Cm 532 which is the capacitance of the connection line 530 with respect to the space (the lower the capacitance), the larger signal the transmitter 510 can apply to the connection line 530.

The capacitance of a capacitor is approximately proportional to the surface area of each of its electrodes, and in general, it is more desirable that each of the electrodes have a larger size. However, if the sizes of the respective electrodes are simply increased, there is a risk that the capacitance between the electrodes also increase. In addition, if the ratio of the sizes of the respective is extreme, there is a risk that the efficiency of the capacitor lowers. Accordingly, the sizes and the arrangement locations of the respective electrodes need be determined on the basis of the balance of the entire system.

In addition, the above-mentioned characteristics of the communication system 500 makes it possible to realize efficient communication in a high frequency bandwidth of the signal source 513-1 by determining the parameters of the present equivalent circuit by an impedance-matching approach. By increasing the frequency, it is possible to ensure reactance even with a small capacitance, so that it is possible to easily miniaturize each of the devices.

In general, the reactance of a capacitor increases with a decrease in frequency. On the other hand, since the communication system 500 operates on the basis of capacitive coupling, the lower limit of the frequency of a signal generated by the signal source 513-1 is determined by the capacitive coupling. In addition, since Rm 531, Rm 532 and Rm 533 form a low-pass filter through their arrangement, the upper limit of the frequency is determined by the characteristic of the low-pass filter.

Figure 10:
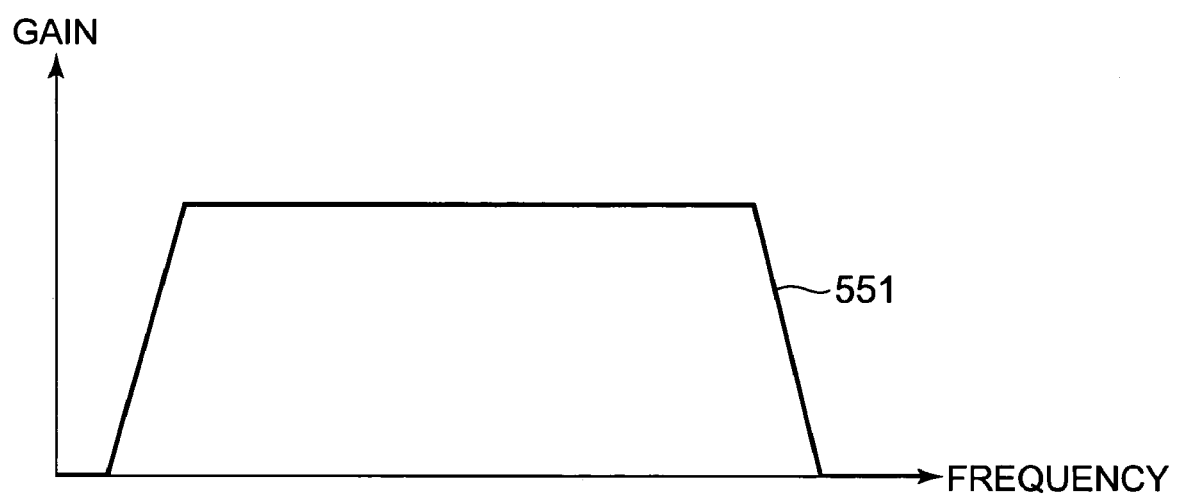
FIG. 10 is a graph showing an example of a frequency characteristic of the communication system shown in FIG. 9.

Specifically, the frequency characteristic of the communication system 500 is as indicated by a curve 551 in the graph shown in FIG. 10. In FIG. 10, the horizontal axis represents frequency, and the vertical axis represents the gain of the entire system.

Specific values of the respective parameters of each of the communication system 400 shown in FIG. 4 and the communication system 500 shown in FIG. 9 will be considered below. In the following description, for convenience of explanation, it is assumed that the communication system 400 (the communication system 500) is placed in the air. Each of the transmission signal electrode 411, the transmission reference electrode 412, the reception signal electrode 421 and the reception reference electrode 422 of the communication system 400 is assumed to be a conductive disk of diameter 5 cm.

In the communication system 400 shown in FIG. 5, if the distance d between the transmission signal electrode 411 and the communication medium 430 is 5 mm, the value of the capacitance Cte 414 formed by the transmission signal electrode 411 and the communication medium 430 can be found by using the above-mentioned formula (9), as shown in the following formula (18):

[Formula 18]

$$Cte = \frac{(8.854 \times 10^{-12}) \times (2 \times 10^{-3})}{5 \times 10^{-3}} \approx 3.5 \ [pF] \quad (18)$$

It is assumed herein that Formula (9) can be adapted to Ctb 417-1 which is the capacitance between the electrodes (Ctg 517-1 in FIG. 9). As mentioned above, formula (9) is to be originally applied to the case where the surface area of the electrodes is sufficiently large compared to the distance therebetween. However, in the case of the communication system 400, the value of Ctb 417-1 is assumed to be able to be found by using formula (9), because the value of the capacitance Ctb 417-1 between the transmission signal electrode 411 and the transmission reference electrode 412, which is found by using formula (9), sufficiently approximates its original correct value so that a problem does not a rise in the explanation of principles. If the distance between the electrodes is assumed to be 5 cm, Ctb 417-1 (Ctb 517-1 in FIG. 9] is as expressed by the following formula (19):

[Formula 19]

$$Ctb = \frac{(8.854 \times 10^{-12}) \times (2 \times 10^{-3})}{5 \times 10^{-2}} \approx 0.35 \ [pF] \quad (19)$$

If it is assumed that the distance between the transmission signal electrode 411 and the communication medium 430 is narrow, the coupling of the transmission signal electrode 411 to the space is weak and the value of Cth 417-2 (Cth 517-2 in FIG. 9) is sufficiently smaller than the value of Cte 414 (Cte 514). Accordingly, the value of Cth 417-2 (Cth 517-2) is set to one-tenth of the value of Cte 414 (Cte 514) as expressed by formula (20):

[Formula 20]

$$Cth = \frac{Cte}{10} = 0.35 \ [pF] \quad (20)$$

Cteg 415 (Ctg 515 in FIG. 9) which denotes a capacitance formed by the transmission reference electrode 412 and the space can be found from the following formula (21), as in the case of FIG. 4 (formula (12)):

[Formula 21]

$$Ctg = 8 \times 8.854 \times 10^{-12} \times 2.5 \times 10^{-2} \approx 1.8 [pF] \quad (21)$$

The value of Cti 417-3 (the value of Cti 517-3 in FIG. 9) is considered equivalent to the value of Ctb 417-1 (Ctb 517-1 in FIG. 9) as follows:

Cti=Ctb=0.35[pF]

If the constructions of the respective electrodes (the sizes and the installation locations of the respective electrodes) are set as in the case of the transmitter 410, the parameters of the receiver 420 (the receiver 520 shown in FIG. 9) can be set similarly to the parameters of the transmitter 410 as follows:

Cre=Cte=3.5[pF]

Crb=Ctb=0.35[pF]

Crh=Cth=0.35[pF]

Crg=Ctg=1.8[pF]

Cri=Cti=0.35[pF]

In the following description, for convenience of explanation, it is assumed that the communication medium 430 (the connection line 530 shown in FIG. 9) is an object having characteristics close to a living body having approximately the same size as a human body. It is assumed that the electrical resistance from the location of the transmission signal electrode 411 of the communication medium 430 to the location of the reception signal electrode 421 (from the location of a transmission signal electrode 511 to the location of a reception signal electrode 521 in FIG. 9) is 1M [Ω], and that the value of each of Rm 431 and the Rm 433 (Rm 531 and Rm 533 in FIG. 9) is 500K [Ω]. In addition, it is assumed that the value of the capacitance Cm 432 (Cm 532 in FIG. 9] formed between the communication medium 430 and the space is 100 [pF].

Furthermore, it is assumed that the signal source 413-1 (the signal source 513-1 in FIG. 9) outputs a sine wave having a maximum value of 1 [V] and a frequency of 10M [Hz].

Figure 11:
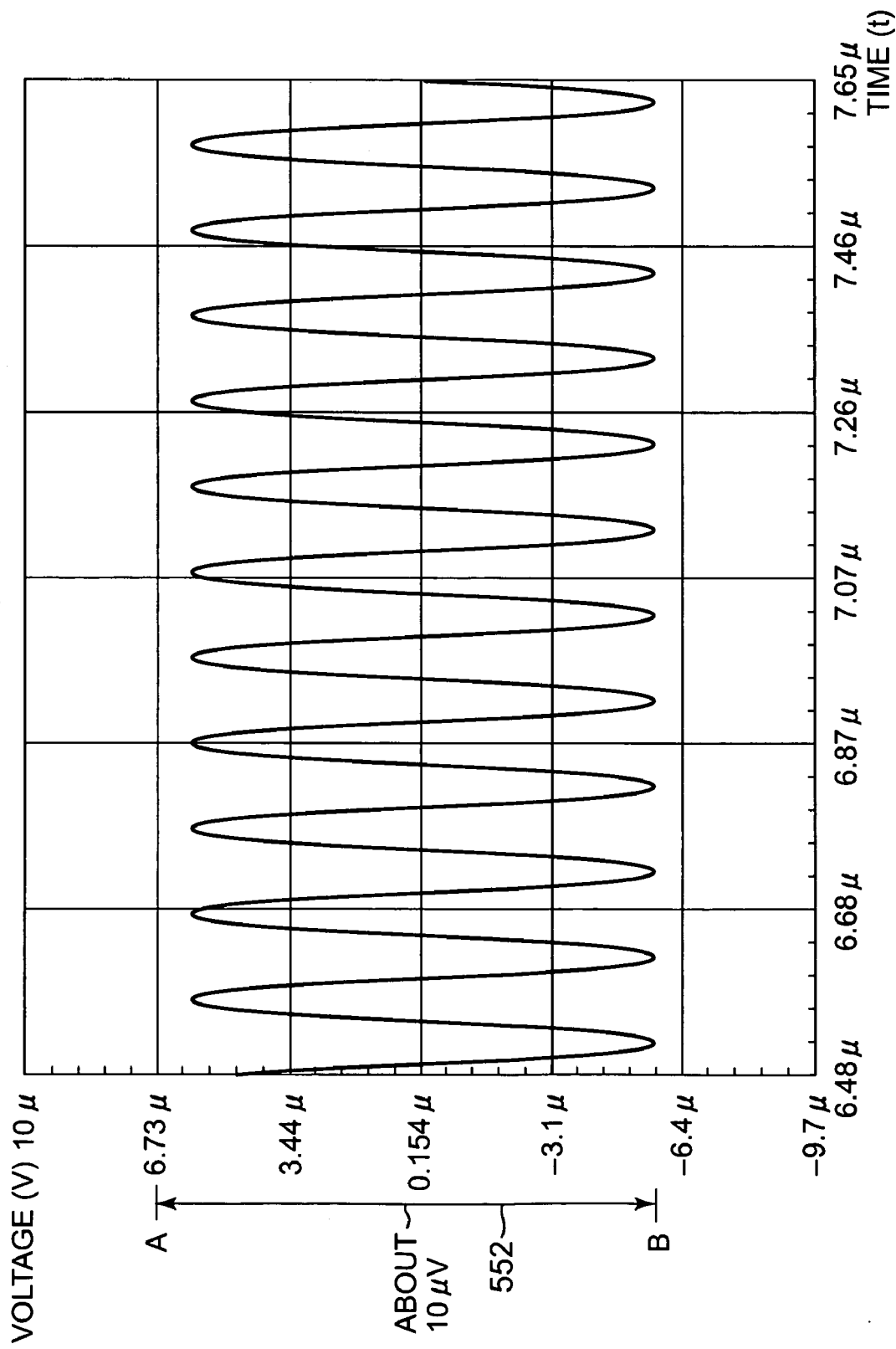
FIG. 11 is a graph showing an example of a signal received by a receiver.

When a simulation is performed by using the above-mentioned parameters, a received signal having the waveform shown in FIG. 11 is obtained as the result of the simulation. In the graph shown in FIG. 11, the vertical axis represents the voltage across Rr 423-1 (Rr 523-1) which is a reception load of the receiver 420 (the receiver 520 shown in FIG. 9), while the horizontal axis represents time. As indicated by an double-headed arrow 525 in FIG. 11, the difference between a maximum value A and a minimum value B (the difference between peak values) of the waveform of the received signal is observed as approximately 10 [μF]. Accordingly, since this difference is amplified by an amplifier having sufficient gain (the detector 423-2), the signal on the transmission side (the signal generated by the signal source 413-1) can be restored on the reception side.

Accordingly, the above-mentioned communication system does not need a physical reference point path and can realize communication based on only a communication signal transmission path, so that it is possible to easily provide communication environments not restricted by use environments.

The arrangement of the electrodes in each of the transmission and receivers will be described below. As mentioned above, the respective electrodes have mutually different functions, and form capacitances with respect to the communication medium, the spaces and the like. Namely, the respective electrodes are capacitively coupled to different objects, and operate by using different capacitive couplings. Accordingly, a method of arranging the electrodes is a very important factor in effectively capacitively coupling the respective electrodes to the desired objects.

For example, in the communication system 400 shown in FIG. 5, if communication is to be efficiently performed between the transmitter 410 and the receiver 420, the individual electrodes need be arranged on the following conditions; that is to say, the devices 410 and 420 need satisfy, for example, the conditions that both the capacitance between the transmission signal electrode 411 and the communication medium 430 and the capacitance between the reception signal electrode 421 and the communication medium 430 are sufficient, that both the capacitance between the transmission reference electrode 412 and the space and the capacitance between the reception reference electrode 422 and the space are sufficient, that the capacitance between the transmission signal electrode 411 and the transmission reference electrode 412 and the capacitance between the reception signal electrode 421 and the reception reference electrode 422 are respectively smaller than the capacitance between the transmission signal electrode 411 and the communication medium 430 and the capacitance between the reception signal electrode 421 and the communication medium 430, and that the capacitance between the transmission signal electrode 411 and the space and the capacitance between the reception signal electrode 421 and the space are respectively smaller than the capacitance between the transmission reference electrode 412 and the space and the capacitance between the reception reference electrode 422 and the space.

Figure 12:
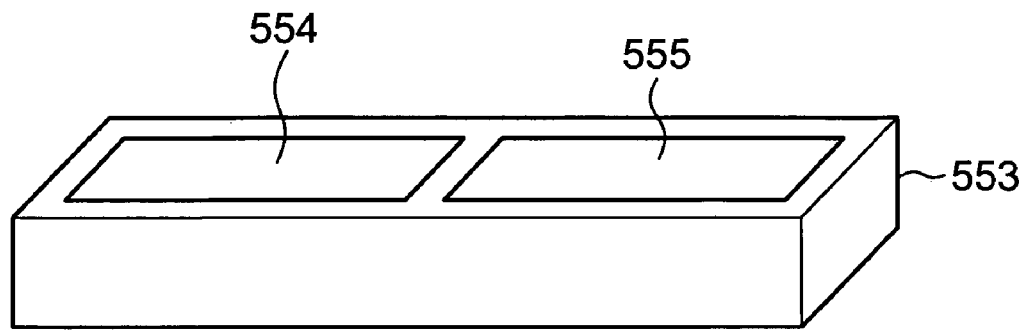
FIG. 12 is a schematic view showing an example of locations at which individual electrodes are disposed.

Arrangement examples of transmission and reception electrodes are shown in FIGS. 12 to 18. In the following description, reference will be made to a transmitter. Referring to FIG. 12, two electrodes, i.e., a transmission signal electrode 554 and a transmission reference electrode 555, are arranged on the same plane of a casing 553. According to this construction, it is possible to decrease the capacitance between the two electrodes (the transmission signal electrode 554 and the transmission reference electrode 555), as compared with the case where the two electrodes are arranged to oppose each other. If the transmitter constructed in this manner is used, only one of the two electrodes is arranged close to a communication medium. For example, a folding mobile telephone has the casing 553 made of two units and a hinge section, and is constructed so that the two units are joined by the hinge section with the relative angle between the two units being variable and so that the casing 553 is foldable on the hinge section in the vicinity of its lengthwise center. If the electrode arrangement shown in FIG. 12 is applied to the folding mobile telephone, one of the electrodes can be arranged on the back side of a section provided with operating buttons, while the other electrode is arranged on the back side of a section provided with a display section. According to this arrangement, the electrode arranged in the section provided with operating buttons is covered with a hand of a user, and the electrode provided on the back side of the display section is arranged to face space; that is to say, it is possible to arrange the two electrode so as to satisfy the above-mentioned conditions.

Figure 13:
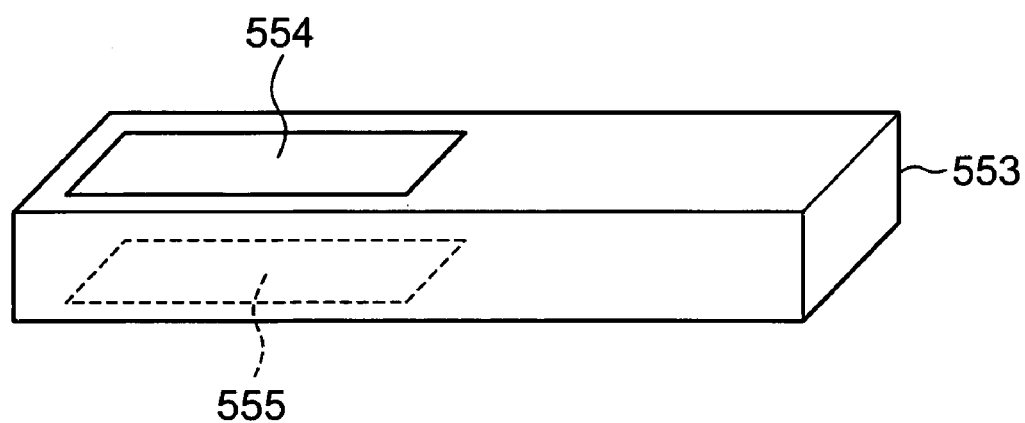
FIG. 13 is a schematic view showing another example of locations at which individual electrodes are disposed.

FIG. 13 is a schematic view showing the casing 553 in which the two electrodes (the transmission signal electrode 554 and the transmission reference electrode 555) are arranged to oppose each other. As compared with the arrangement shown in FIG. 12, the arrangement shown in FIG. 13 is suitable for the case where the casing 553 is comparatively small in size, although the capacitive coupling between the two electrodes is strong. In this case, it is desirable to arrange the respective two electrodes in directions spaced apart from each other by as much distance as possible in the casing 553.

Figure 14:
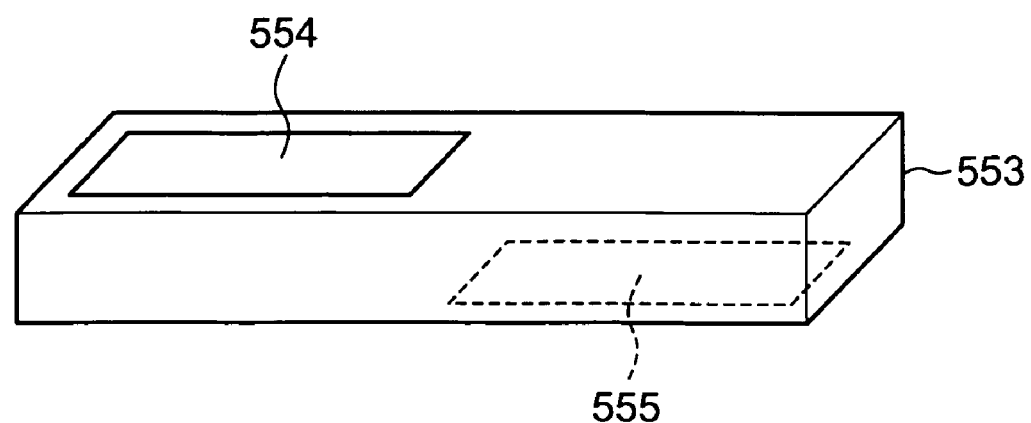
FIG. 14 is a schematic view showing another example of locations at which individual electrodes are disposed.

FIG. 14 is a schematic view showing the casing 553 in which the two electrodes (the transmission signal electrode 554 and the transmission reference electrode 555) are respectively arranged on mutually opposite faces so as not to directly oppose each other. In the case of this arrangement, the capacitive coupling between the two electrodes is smaller than that between the two electrodes shown in FIG. 13.

Figure 15:
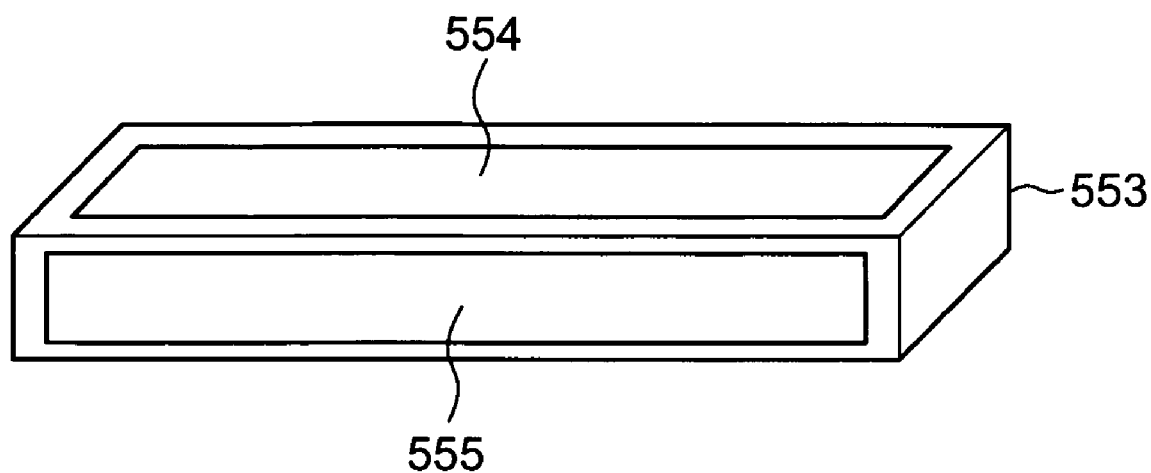
FIG. 15 is a schematic view showing another example of locations at which individual electrodes are disposed.

FIG. 15 is a schematic view showing the casing 553 in which the two electrodes (the transmission signal electrode 554 and the transmission reference electrode 555) are arranged perpendicular to each other. According to this arrangement, in uses where the transmission signal electrode 554 and the side of the casing 553 opposed thereto are placed near a communication medium, a lateral side of the casing 553 (a side on which the transmission reference electrode 555 is arranged) remains capacitively coupled to space, so that communication can be performed.

FIGS. 16A and 16B are schematic views showing that the transmission reference electrode 555 which is either one of the two electrodes in the arrangement shown in FIG. 13 is arranged inside the casing 553. Specifically, as shown in FIG. 16A, only the transmission reference electrode 555 is provided inside the casing 553. FIG. 16B is a schematic view showing an example of an electrode position as viewed from a side 556 of FIG. 16A. As shown in FIG. 16B, the transmission signal electrode 554 is arranged on a surface of the casing 553, and only the transmission reference electrode 555 is arranged inside the casing 553. According to this arrangement, even if the casing 553 is widely covered with a communication medium, communication can be performed, because the space inside the casing 553 exists around either one of the electrodes.

Figure 17B:
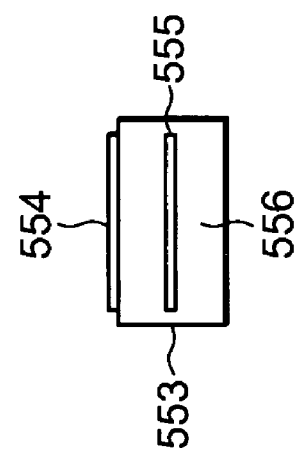
FIG. 17B is a schematic view showing another example of locations at which individual electrodes are disposed.
Figure 17A:
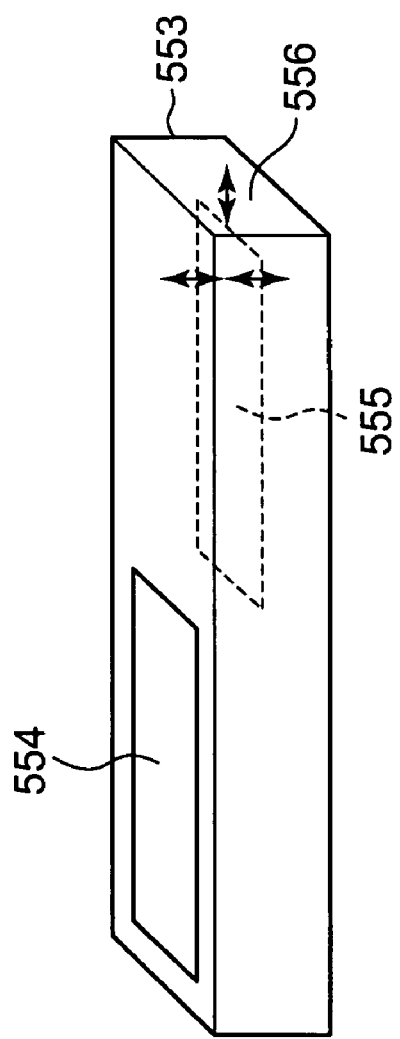
FIG. 17A is a schematic view showing another example of locations at which individual electrodes are disposed.

FIGS. 17A and 17B are schematic views showing that the transmission reference electrode 555 which is either one of the two electrodes in the arrangement shown in each of FIGS. 12 and 14 is arranged inside the casing 553. Specifically, as shown in FIG. 17A, only the transmission reference electrode 555 is provided inside the casing 553. FIG. 17B is a schematic view showing an example of an electrode position as viewed from the side 556 of FIG. 17A. As shown in FIG. 17B, the transmission signal electrode 554 is arranged on a surface of the casing 553, and only the transmission reference electrode 555 is arranged inside the casing 553. According to this arrangement, even if the casing 553 is widely covered with a communication medium, communication can be performed, because a space margin inside the casing 553 exists around either one of the electrodes.

FIGS. 18A and 18B are schematic views showing that either one of the two electrodes in the arrangement shown in FIG. 15 is arranged inside the casing. Specifically, as shown in FIG. 18A, only the transmission reference electrode 555 is provided inside the casing 553. FIG. 18B is a schematic view showing an example of an electrode position as viewed from the side 556 of FIG. 18A. As shown in FIG. 18B, the transmission signal electrode 554 is arranged on a surface of the casing 553, and only the transmission reference electrode 555 is arranged inside the casing 553. According to this arrangement, even if the casing 553 is widely covered with a communication medium, communication can be performed, because a space margin inside the casing 553 exists around either one of the electrodes.

In any of the above-mentioned electrode arrangements, one of the two electrodes is arranged closer to a communication medium than the other is, and the one is arranged to have a stronger capacitive coupling to space. In addition, in each of the electrode arrangements, the two electrodes are desirably arranged so that the capacitive coupling therebetween is weaker than the other capacitive couplings.

Figure 19A:
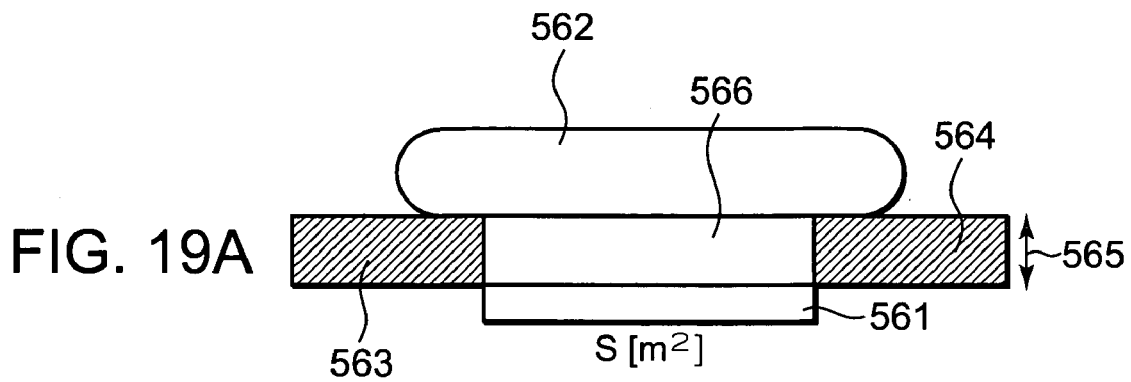
FIG. 19A is a schematic view showing another example of locations at which individual electrodes are disposed.
Figure 19B:
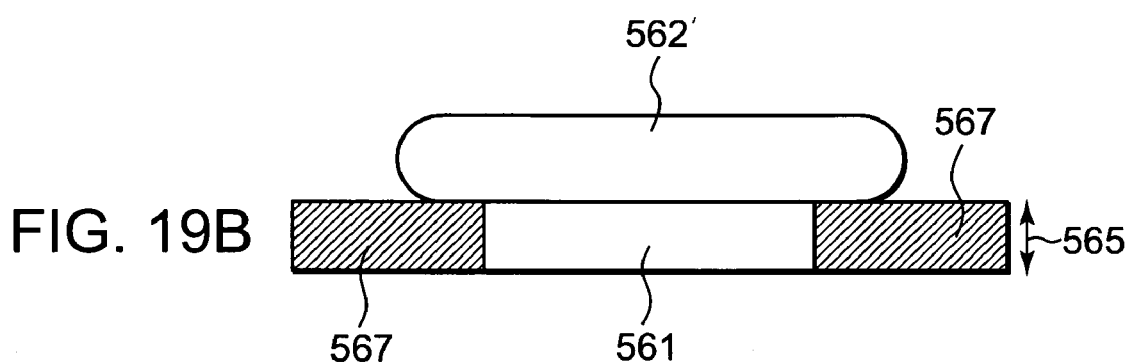
FIG. 19B is a schematic view showing another example of locations at which individual electrodes are disposed.

The transmitter or the receiver may also be incorporated in an arbitrary casing. In each of the devices according to the embodiment of the present invention, there are at least two electrodes which are electrically isolated from each other, so that a casing in which to incorporate the electrodes is also made of an insulator having a certain thickness. FIGS. 19A to 19B are cross-sectional views of a transmission signal electrode and neighboring sections. A transmission reference electrode, a reception signal electrode and a reception reference electrode have a similar construction to the transmission signal electrode, and the above description can be applied to any of those electrodes. Accordingly, the description of those electrodes is omitted herein.

FIG. 19A shows an example in which a transmission signal electrode 561 and a communication medium 562 are constructed so as to maintain a certain distance therebetween. Specifically, a spacer 563 and a spacer 564 are provided around the transmission signal electrode 561. Accordingly, even if a casing including the transmission signal electrode 561 is brought into contact with the communication medium 562, a distance d [m] as indicated by a double-headed arrow 565 is maintained between the transmission signal electrode 561 and the communication medium 562. Namely, a space 566 is formed between the transmission signal electrode 561 and the communication medium 562.

The capacitive coupling C between the transmission signal electrode 561 and the communication medium 562 in this case can be found from formula (9), and can therefore be expressed by the following formula (22). However, as mentioned previously, formula (9) is a mathematical formula to be applied to the case where parallel plates have the same area, but since formula (9) does not provide a seriously impaired result even when applied to the case where parallel plates have different areas, the following formula (22) is derived:

[Formula 22]

$$C = (\varepsilon_r \times \varepsilon_0) \times \frac{S}{d} \ [F] \quad (22)$$

In formula (22), $\varepsilon 0$ denotes a vacuum dielectric constant having a fixed value of $8.854 \times 10^{-12}$ [F/m], $\varepsilon r$ denotes a specific dielectric constant at that location, and S denotes a surface area of the transmission signal electrode 561. If a dielectric having a high specific dielectric constant is arranged in the space 566 formed above the transmission signal electrode 561, the capacitive coupling C can be increased to improve the performance of the device.

In a similar manner, it is possible to increase the capacitance between the transmission signal electrode 561 and the neighboring space. The spacer 563 and the spacer 564 may also be constructed as part of the casing.

FIG. 19B shows an example in which the transmission signal electrode 561 is embedded in a casing 567. In this construction, the communication medium 562 is in contact with the casing 567 as well as the transmission signal electrode 561. In addition, an insulation layer may also be formed on the surface of the transmission signal electrode 561 so that the communication medium 562 and the transmission signal electrode 561 can be held in noncontact with each other.

Figure 19C:
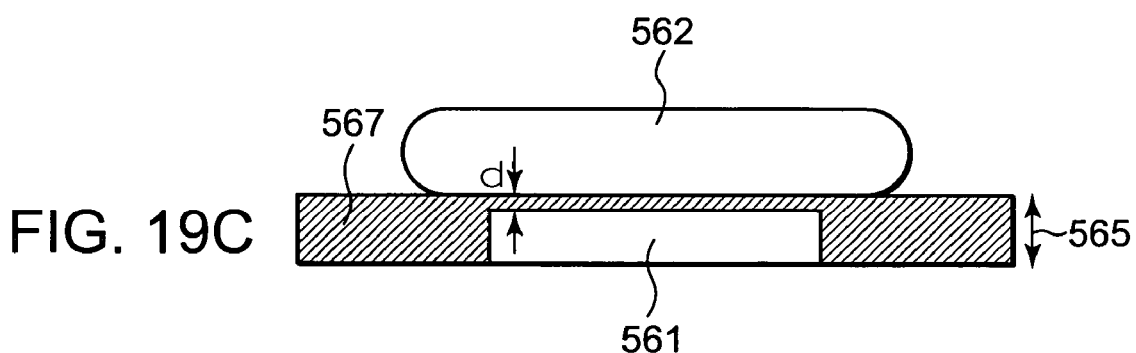
FIG. 19C is a schematic view showing another example of locations at which individual electrodes are disposed.

FIG. 19C is similar to FIG. 19B but shows an example in which a hollow having an opening area equivalent to the surface area of the transmission signal electrode 561 is formed in the casing 567 with a thickness d' being left, and the transmission signal electrode 561 is embedded in the hollow. If the casing 567 is formed by solid casting, manufacturing costs and component costs can be reduced and capacitive coupling can be easily increased by the present method.

The sizes of individual electrodes will be described below. At least a transmission reference electrode and a reception reference electrode need to form a capacitance relative to a sufficient space so that a communication medium can obtained a sufficient potential, but a transmission signal electrode and a reception signal electrode may be designed to have optimum sizes on the basis of a capacitance relative to the communication medium and the property of signals to flow in the communication medium. Accordingly, generally, the transmission reference electrode is made larger in size than the transmission signal electrode, and the reception reference electrode is made larger in size than the reception signal electrode. However, it is of course possible to adopt other relationships as long as sufficient signals for communication can be obtained.

Specifically, if the size of the transmission reference electrode is made coincident with the size of the transmission signal electrode and the size of the reception reference electrode is made coincident with the size of the reception signal electrode, these electrodes appear to have mutually equivalent characteristics, as viewed from a reference point which is an infinite point. Accordingly, there is the advantage that whichever electrode may be used as a reference electrode (or a signal electrode) (even if a reference electrode and a signal electrode are arranged to be able to be switched therebetween), it is possible to obtain equivalent communication performance.

In other words, there is the advantage that if the signal electrode and the reference electrode are designed to have mutually different sizes, communication can be performed only when one of the electrodes (an electrode which is set as a signal electrode) is moved close to the communication medium.

Shields of circuits will be described below. In the above description, a transmitter section and a receiver section other than electrodes have been regarded as transparent in the consideration of the physical construction of a communication system, but it is actually general that the communication system is constructed by using electronic parts and the like. Electronic parts are made of materials having some electrical property such as conductivity or dielectricity, and such electronic parts exist near the electrodes and influence the operation of the electrodes. In the embodiment of the present invention, since capacitive couplings and the like in space have various influences, an electronic circuit itself mounted on a circuit board is exposed to such influences. Accordingly, if a far more stable operation is needed, it is desirable to shield the entire circuit with a conductor.

A shielding conductor is generally considered to be connected to a transmission reference electrode or a reception reference electrode which also serves as a reference potential for a transmission or receiver, but if there is no problem in operation, the shielded conductor may be connected to a transmission signal electrode or a reception signal electrode. Since the shielding conductor itself has a physical size, it is necessary to take account of the fact that the shielding conductor operates in mutual relationships to other electrodes, communication media and spaces in accordance with the above-mentioned principles.

Figure 20:
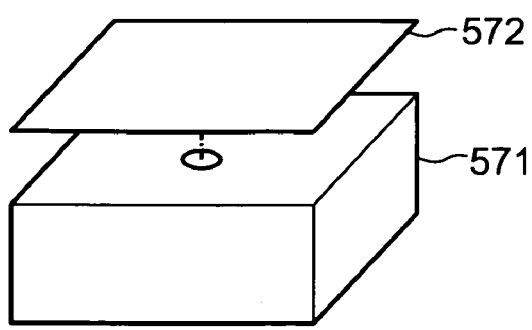
FIG. 20 is a schematic view showing another construction example of an electrode.

FIG. 20 shows an embodiment of a shielding construction. In this embodiment, the device is assumed to operate on a battery, and electronic parts inclusive of the battery are housed in a shield case 571 which also serves as a reference electrode. An electrode 572 is a signal electrode.

Transmission media will be described below. In the above description of the embodiments, reference has been made to conductors as a main example of a communication medium, but a dielectric having no conductivity also enables communication. This is because electric fields injected into the communication medium from a transmission signal electrode are propagated by the polarizing action of the dielectric.

Specifically, a metal such as electric wire is available as a conductor and pure water or the like is available as a dielectric, but a living body, a physiological saline solution or the like having both property also enable communication. In addition, vacuum and air also have dielectricity and are communicable to serve as a communication medium.

Noise will be described below. In space, potential varies due to various factors such as noise from an AC power source, noise from a fluorescent lamp, various consumer electrical appliances and electrical equipment, and the influence of charged corpuscles in the air. In the above description, potential variations have been neglected, but these noises penetrate each section of the transmitter, the communication medium and the receiver.

Figure 21:
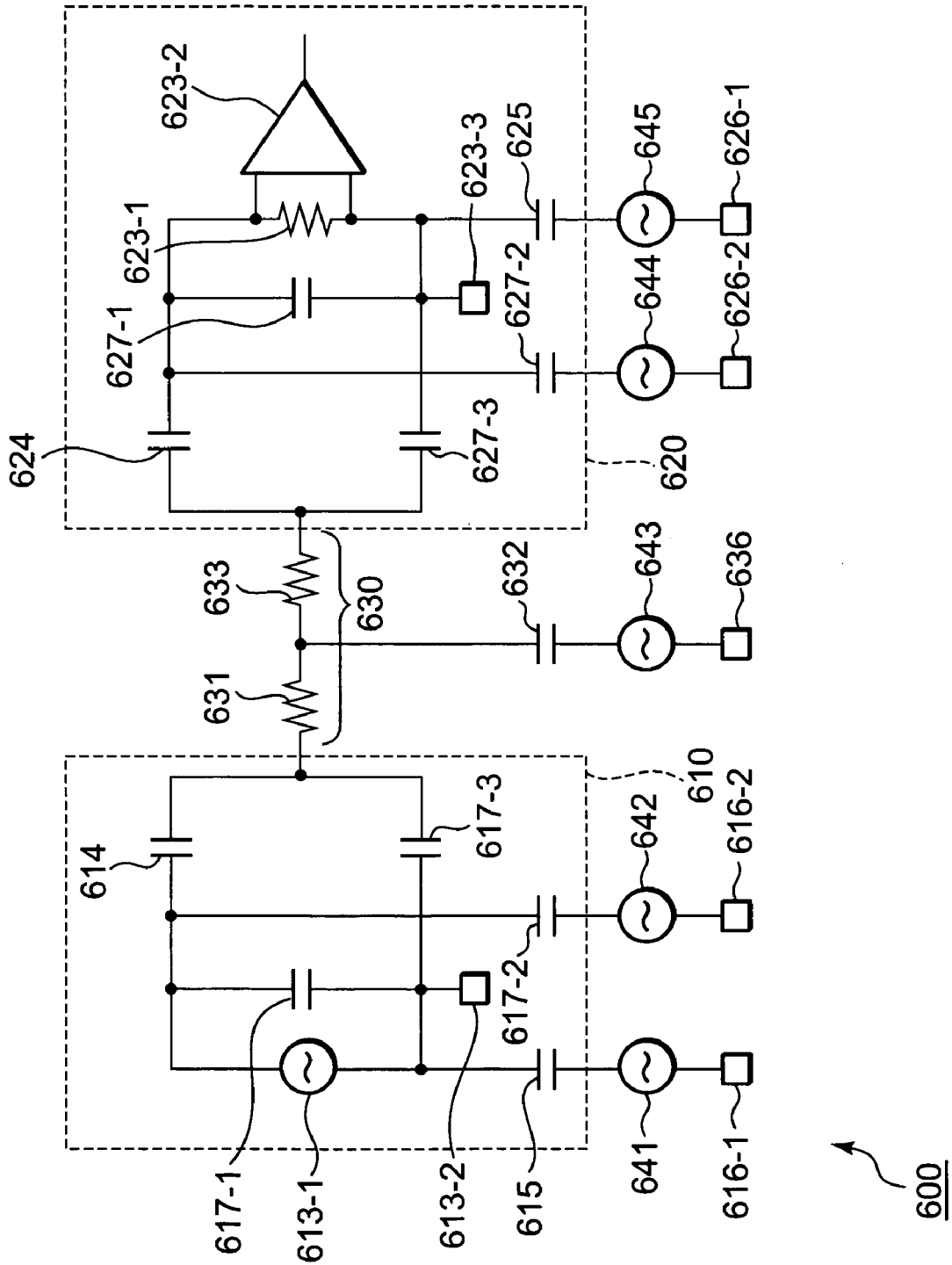
FIG. 21 is a diagram showing another example of an equivalent circuit of the model shown in FIG. 5.

FIG. 21 is a diagram showing an equivalent circuit of the communication system 100 shown in FIG. 1, inclusive of noise components. A communication system 600 shown in FIG. 21 corresponds to the communication system 500 shown in FIG. 9, a transmitter 610 of the communication system 600 corresponds to the transmitter 510 of the communication system 500, a receiver 620 corresponds to the receiver 520, and a connection line 630 corresponds to the connection line 530.

In the transmitter 610, a signal source 613-1, a ground point 613-2, Cte 614, Ctg 615, a ground point 616-1, a ground point 616-2, Ctb 617-1, Cth 617-2 and Cti 617-3 respectively correspond to the signal source 513-1, the ground point 513-2, Cte 514, Ctg 515, the ground point 516-1, the ground point 516-2, Ctb 517-1, Cth 517-2, and Cti 517-3 in the transmitter 510. Unlike the case shown in FIG. 9, in the transmitter 610, two signal sources, i.e., a noise 641 and a noise 642, are respectively provided between Ctg 615 and a ground point 616-1 and between Cth 617-2 and a ground point 616-2.

In the receiver 620, Rr 623-1, a detector 623-2, a ground point 623-3, Cre 624, Crg 625, a ground point 626-1, a ground point 626-2, Crb 627-1, Crh 627-2 and Cri 627-3 respectively correspond to Rr 523-1, the detector 523-2, the ground point 523-3, Cre 524, Crg 525, the ground point 526-1, the ground point 526-2, Crb 527-1, Crh 527-2, and Cri 527-3 in the receiver 520. Unlike the case shown in FIG. 9, in the receiver 620, two signal sources, i.e., a noise 644 and a noise 645, are respectively provided between Crh 627-2 and a ground point 626-2 and between Crg 625 and a ground point 626-1.

Rm 631, Cm 632, Rm 633 and a ground point 636 in the connection line 630 respectively correspond to Rm 531, Cm 532, Rm 533 and the ground point 536 in the connection line 530. Unlike the case shown in FIG. 9, in the connection line 630, a signal source which serves as a noise 643 is provided between Cm 632 and the ground point 636.

Each of the devices operates on the basis of the ground point 613-2 or 623-3 which is the ground potential of itself, so that if noises penetrating the devices have relatively the same components relative to the transmitter, the communication medium and the receiver, such noises have no influence in operation. On the other hand, particularly in a case where the distance between the devices is apart or in an environment where there is an amount of noise, there is a high possibility that a relative difference in noise occurs between the devices; that is to say, the motions of the noises 641 to 645 differ from one another. This difference has no problem if it is not accompanied by a temporal variation, because the relative difference between signal levels to be used need only be transmitted. However, in a case where the variation cycles of the respective noises overlap a frequency band to be used, a frequency and signal levels to be used need be determined to take the characteristics of the noises into account. In other words, if a frequency and signal levels to be used are only determined while taking noise characteristics into account, the communication system 600 can realize communication which is based on only a communication signal transmission path without the need for a physical reference point path. Accordingly, it is possible to provide a communication environment which is not easily restricted by use environments.

The influence of the magnitude of distance between the transmitter and the receiver on communication will be described below. As mentioned previously, according to the principles of the present invention, if a sufficient capacitance is formed in the space between the transmission reference electrode and the reception reference electrode, communication does not need a path due to the ground near the transmission and receivers or other electrical paths, and does not depend on the distance between the transmission signal electrode and the reception signal electrode. Accordingly, for example, in a communication system 700 shown in FIG. 22, if a transmitter 710 and a receiver 720 are spaced a long distance apart from each other, it is possible to perform communication by capacitively coupling a transmission signal electrode 711 and a reception signal electrode 721 by a communication medium 730 having a sufficient conductivity or dielectricity. At this time, a transmission reference electrode 712 is capacitively coupled to a space outside the transmitter 710, and a reception reference electrode 722 is capacitively coupled to a space outside the receiver 720. Accordingly, the transmission reference electrode 712 and the reception reference electrode 722 need not be capacitively coupled to each other. However, as the communication medium 730 becomes longer or larger, the capacitance of the communication medium 730 to space increases, so that it is necessary to take the capacitance into account when each parameter is to be determined.

Figure 22:
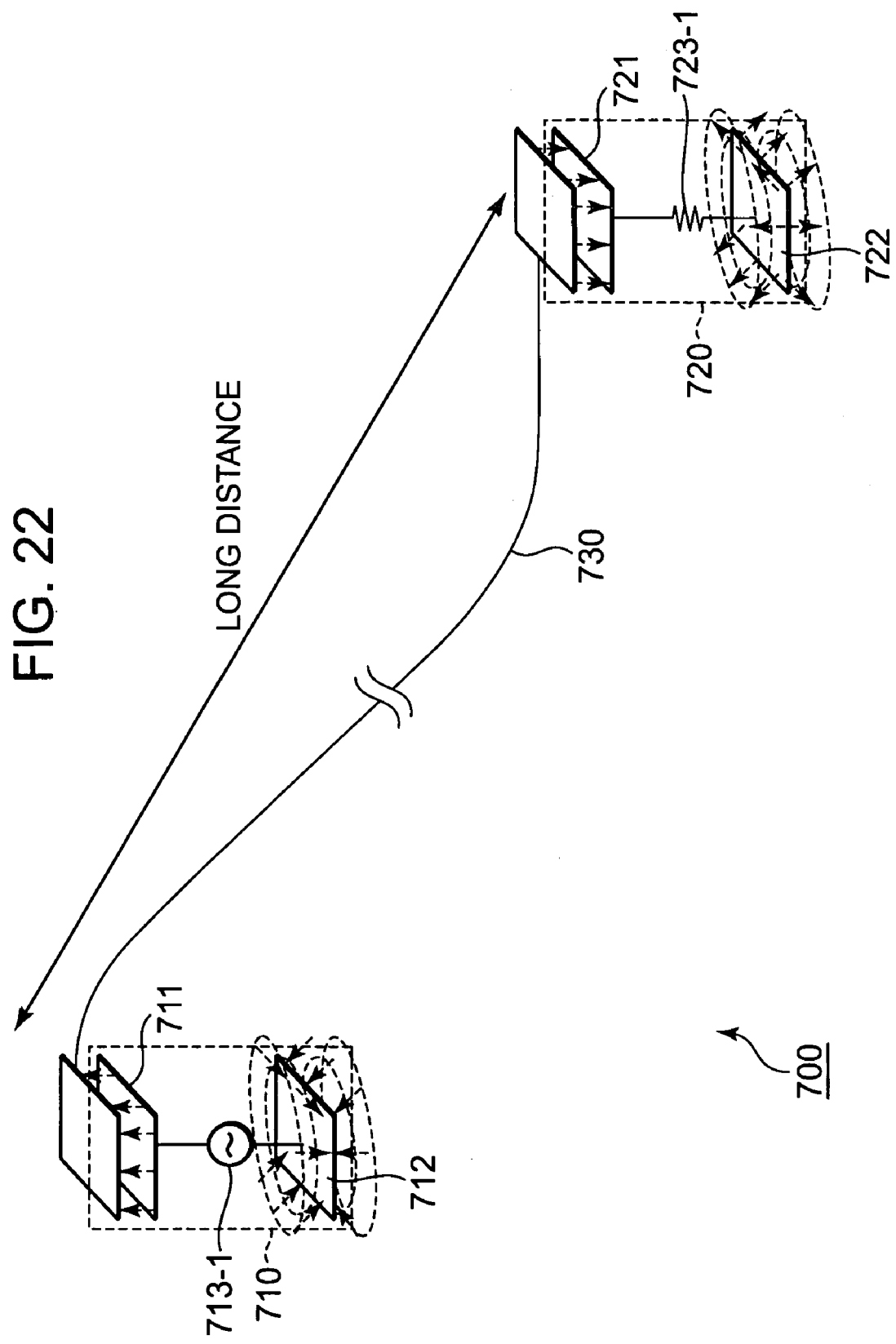
FIG. 22 is a diagram showing an arrangement example of the communication system shown in FIG. 1.

The communication system 700 shown in FIG. 22 is a system corresponding to the communication system 100 shown in FIG. 1, and the transmitter 710 corresponds to the transmitter 110, the receiver 720 corresponds to the receiver 120, and the communication medium 730 corresponds to the communication medium 130.

In the transmitter 710, the transmission signal electrode 711, the transmission reference electrode 712 and a signal source 713-1 respectively correspond to the transmission signal electrode 111, the transmission reference electrode 112 and (part of) the transmitter section 113. Similarly, in the transmission reference electrode 712, the reception signal electrode 721, the reception reference electrode 722 and the Rr 723-1 respectively correspond to the reception signal electrode 121, the reception reference electrode 122 and (part of) the receiver section 123.

The description of each of the above-mentioned sections is, therefore, omitted herein.

As mentioned above, the communication system 700 can realize communication which is based on only a communication signal transmission path without the need for a physical reference point path. Accordingly, it is possible to provide a communication environment not restricted by use environments.

In the above description, the transmission signal electrode and the reception signal electrode have been mentioned as being in noncontact with the communication medium, but this construction is not limitative, and as long as a sufficient capacitance can be obtained between each of the transmission reference electrode and the reception reference electrode and the space neighboring the corresponding one of the transmission and receivers, the transmission signal electrode and the reception signal electrode may also be connected to each other by a communication medium having conductivity.

Figure 23:
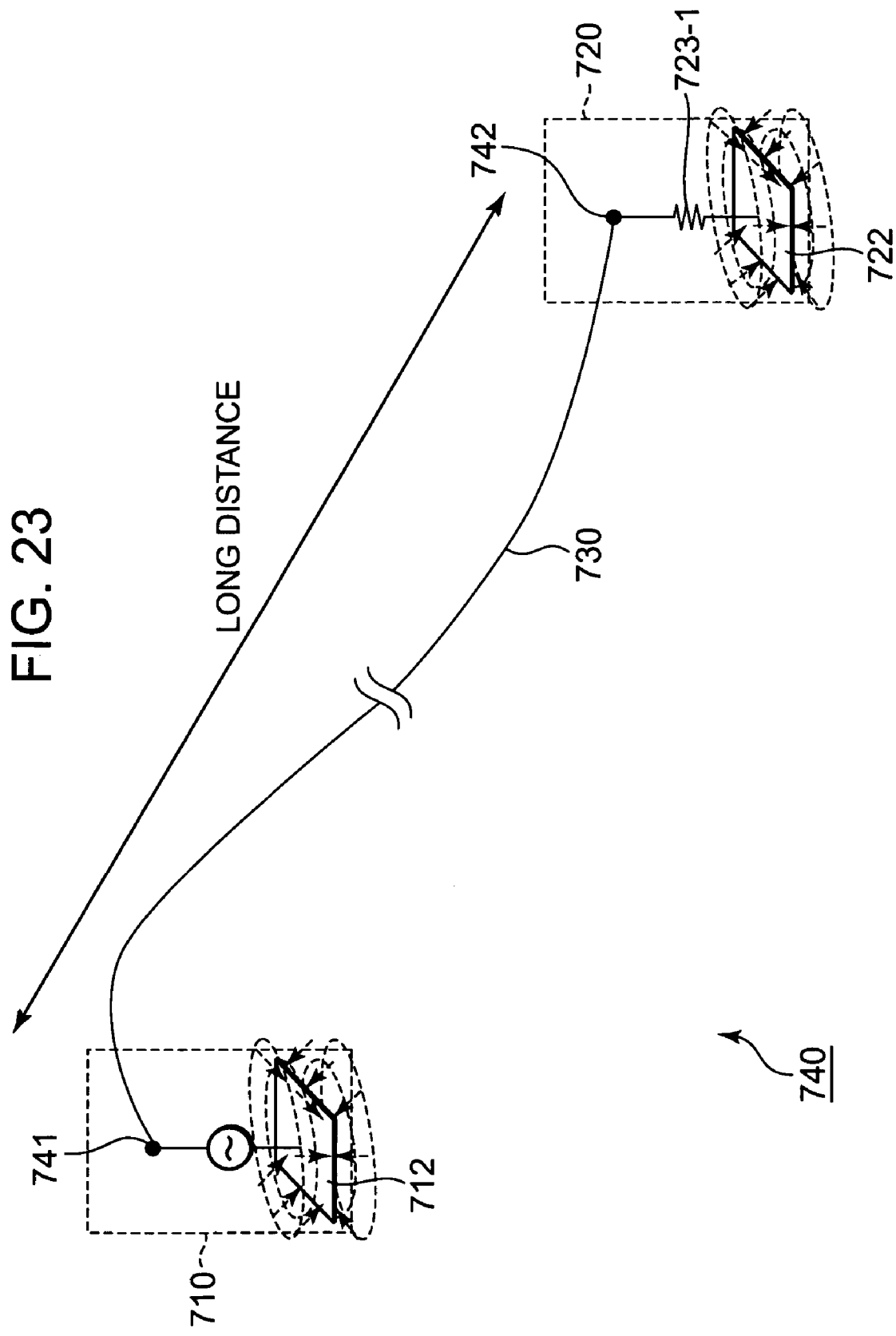
FIG. 23 is a diagram showing another construction example of the communication system which underlies the present invention.

FIG. 23 is a diagram aiding in explaining an example of a communication system in which a transmission reference electrode and a reception reference electrode are connected to each other via a communication medium.

In FIG. 23, a communication system 740 is a system corresponding to the communication system 700 shown in FIG. 22. In the case of the communication system 740, the transmission signal electrode 711 does not exist in the transmitter 710, and the transmitter 710 and the communication medium 730 are connected to each other at a contact 741. Similarly, in the receiver 720 in the communication system 740, the reception signal electrode 721 does not exist, and the receiver 720 and the communication medium 730 are connected to each other at a contact 742.

A general wired communication system includes at least two signal lines and is constructed to perform communication by using the relative difference in level between the signals. On the other hand, in accordance with the present invention, communication can be performed through one signal line.

Namely, the communication system 740 can also realize communication which is based on only a communication signal transmission path without the need for a physical reference point path. Accordingly, it is possible to provide a communication environment which is free from possible limitations of use environments.

Figure 24:
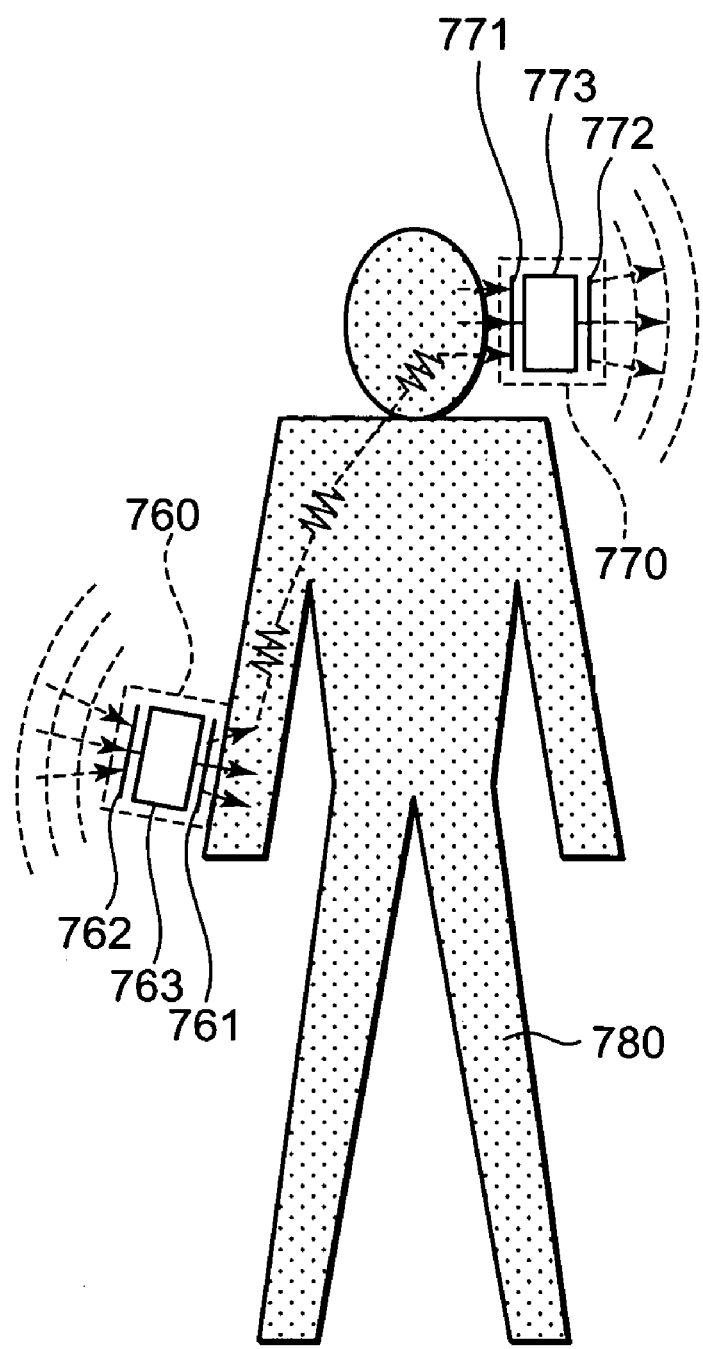
FIG. 24 is a schematic view showing an actual use example of the embodiment of the communication system which underlies the present invention.

Specific applied examples of the above-mentioned communication system will be described below. The communication system can use, for example, a living body as a communication medium. FIG. 24 is a schematic view showing an example of a communication system which performs communication via a living body. In FIG. 24, a communication system 750 is a system in which music data is transmitted from a transmitter 760 fitted to an arm of the body of a user and the music data is received and converted into sound by a receiver 770 fitted to the head of the body, and the sound is outputted so that the user can listen to the sound. The communication system 750 is a system corresponding to any of the above-mentioned communication systems (for example, the communication system 100), and the transmitter 760 and the receiver 770 correspond to the transmitter 110 and the receiver 120, respectively. In the communication system 750, a body 780 is a communication medium corresponding to the communication medium 130 shown in FIG. 1.

Namely, the transmitter 760 has a transmission signal electrode 761, a transmission reference electrode 762, and a transmitter section 763 which respectively correspond to the transmission signal electrode 111, the transmission reference electrode 112 and the transmitter section 113 shown in FIG. 1. The receiver 770 has a reception signal electrode 771, a reception reference electrode 772, and a receiver section 773 which respectively correspond to the reception signal electrode 121, the reception reference electrode 122 and the receiver section 123 shown in FIG. 1.

Accordingly, the transmitter 760 and the receiver 770 are arranged so that the transmission signal electrode 761 and the reception signal electrode 771 are brought into contact with or into close proximity to the body 780 which is a communication medium. Since the transmission reference electrode 762 and the reception reference electrode 772 may be in contact with space, there is no need for coupling to the ground around the devices nor for mutual coupling of the transmission and receivers (or electrodes).

Figure 25:
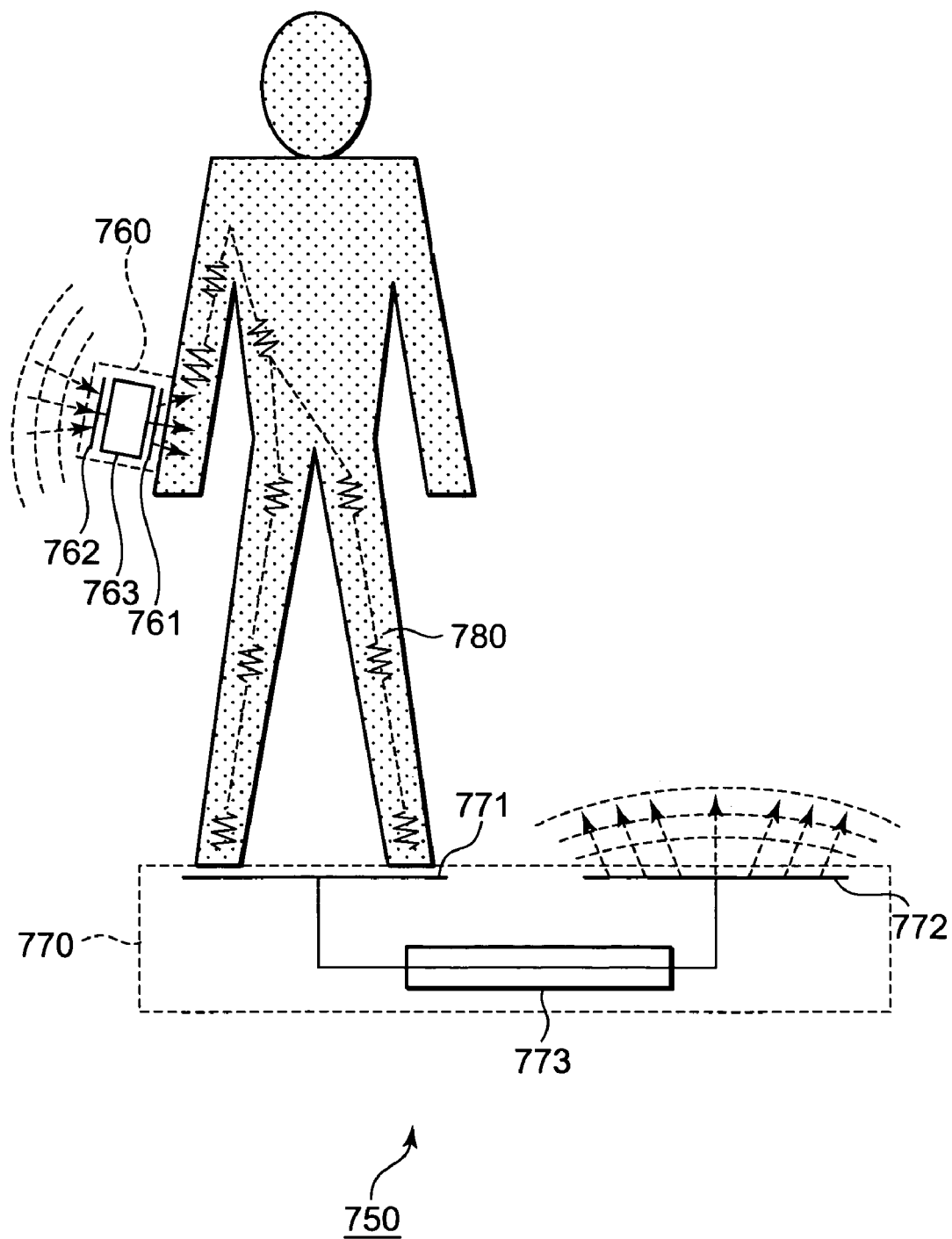
FIG. 25 is a schematic view showing another use example of the embodiment of the communication system which underlies the present invention.

FIG. 25 is a schematic view aiding in explaining another example which realizes the communication system 750. In FIG. 25, the receiver 770 is brought into contact with (or close proximity to) the soles of the body 780 and performs communication with the transmitter 760 fitted to an arm of the body 780. In this case well, the transmission signal electrode 761 and the reception signal electrode 771 are provided so as to be brought into contact with (or into close proximity to) the body 780 which is a communication medium, and the transmission reference electrode 762 and the reception reference electrode 772 are provided to face space. The example shown in FIG. 25 is particularly an applied example which could not have been realized by a prior art using the ground as one of communication media.

Namely, the above-mentioned communication system 750 can realize communication which is based on only a communication signal transmission path without the need for a physical reference point path. Accordingly, it is possible to provide a communication environment which is not restricted by use environments.

In each of the above-mentioned communication systems, the method of modulating signals to be transmitted through the communication medium is not limited to a particular method, and it is possible to select any optimum method on the basis of the characteristics of the entire communication system as long as the method can cope with both the transmitter section and the receiver. Specifically, as a modulation method, it is possible use any one of a baseband analog signal, an amplitude-modulated analog signal, a frequency-modulated analog signal and a baseband digital signal, or any one of an amplitude-modulated digital signal, a frequency-modulated digital sound and a phase-modulated digital signal, or a combination of a plurality of signals selected from among those signals.

In addition, each of the above-mentioned communication systems may be constructed to use one communication medium to establish a plurality of communications so that the communication system can execute communications such as full-duplex communication and communication between a plurality of devices through a single communication medium.

Examples of techniques for realizing such multiplex communications will be described below. The first technique is a technique using spread spectrum communication. In this case, a frequency bandwidth and a particular time series code are decided on between a transmitter and a receiver in advance. The transmitter varies the frequency of an original signal and spreads the original signal within the frequency bandwidth on the basis of the time series code, and transmits spread components. After having received the spread components, the receiver decodes the received signal by integrating the received signal.

Advantages obtainable by frequency spread will be described below. According to the Shannon-Hartley channel capacity theorem, the following formula is established:

[Formula 23]

$$C = B \times \log_2\left(1 + \frac{S}{N}\right) \quad [bps] \qquad (23)$$

In formula (23), C [bps] denotes a channel capacity which indicates a theoretically maximum data rate which can be transmitted in a communication path. B [Hz] denotes a channel bandwidth. S/N denotes a signal-to-noise-power ratio (SN ratio) In addition, if the above formula (23) is Maclaurin-expanded to decrease the S/N ratio, the above formula (23) can be approximated by the following formula (24):

[Formula 24]

$$C \approx \frac{S}{N} \times B \quad [bps] \qquad (24)$$

Accordingly, if S/N is not higher than, for example, a noise floor level, S/N<<1 is obtained, but the channel capacity C can be raised to a desired level by widening the channel bandwidth B.

If different time series codes are prepared for different communication paths so that frequency spreading is performed on the communication paths in different manners, their frequencies are spread without mutual interference, so that mutual interference can be suppressed to effect a plurality of communications at the same time.

Figure 26:
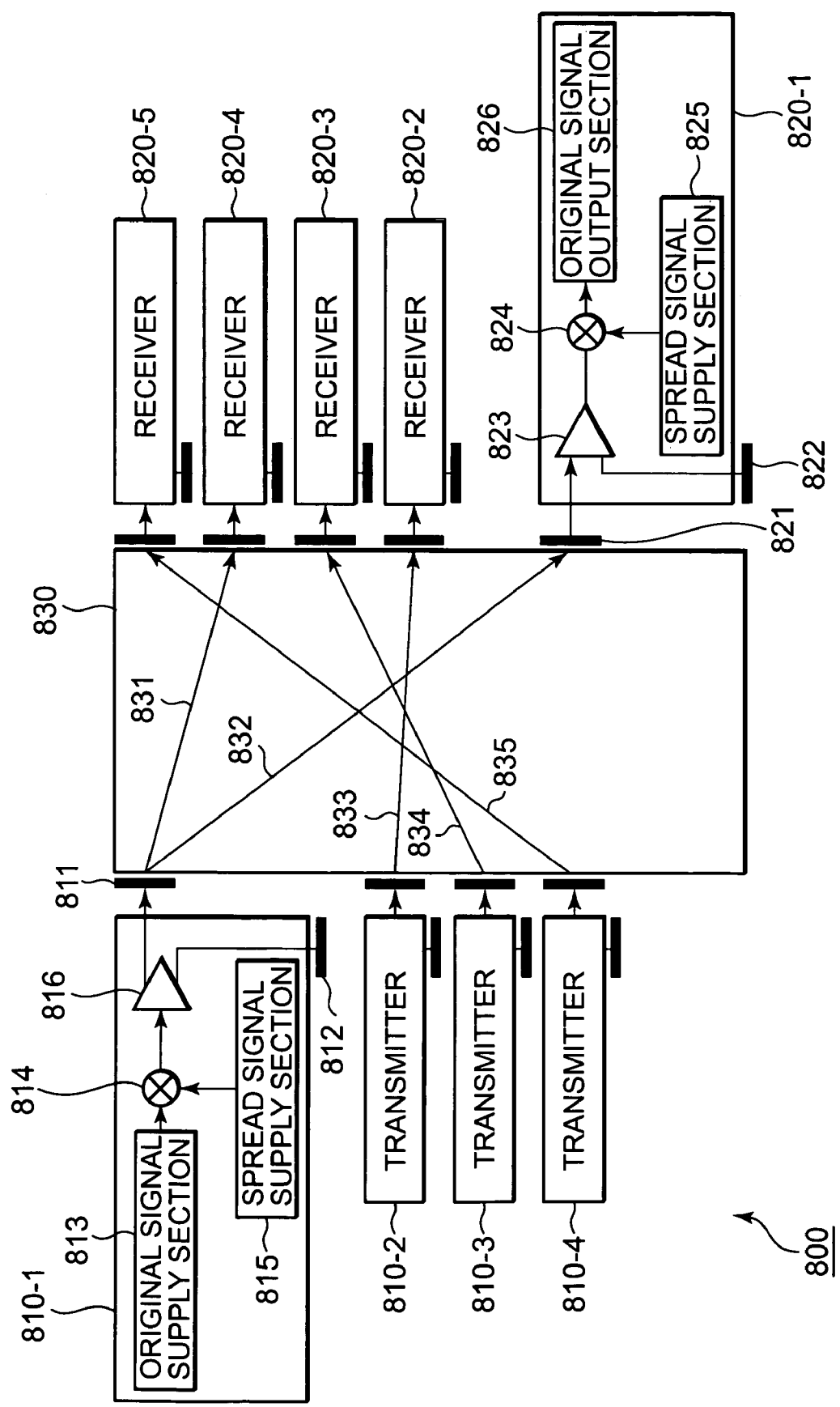
FIG. 26 is a schematic view showing another construction example of the communication system which underlies the present invention.

FIG. 26 is a diagram showing another construction example of the communication system which underlies the present invention. In a communication system 800 shown in FIG. 26, four transmitters 810-1 to 810-4 and five receivers 820-1 to 820-5 perform multiplex communications via a communication medium 830 by using a spread spectrum technique.

The transmitter 810-1 corresponds to the transmitter 110 shown in FIG. 1 and has a transmission signal electrode 811 and a transmission reference electrode 812, and further has, as a construction corresponding to the transmitter section 113, an original signal supply section 813, a multiplier 814, a spread signal supply section 815, and an amplifier 816.

The original signal supply section 813 generates an original signal which is a signal to be transmitted, and supplies the signal to the multiplier 814. The spread signal supply section 815 generates a spread signal which is a carrier for spreading the signal to be transmitted, over a predetermined frequency bandwidth, and supplies the spread signal to the multiplier 814. There are two representative spread techniques using spread signals, a direct sequence technique (hereinafter referred to as the DS technique) and a frequency hopping technique (hereinafter referred to as the FH technique). The DS technique is a technique which causes the multiplier 814 to perform multiplication on the time series code having a frequency component higher than at least the original signal. The result of the multiplication is carried on a predetermined carrier, and is outputted from the amplifier 816 after having been amplified by the same.

The FH technique is a technique which varies the frequency of a carrier by the time series code and generates a spread signal. The spread signal is multiplied by an original signal by the multiplier 814, and the multiplication result is outputted from the amplifier 816 after having been amplified by the same. One of the outputs of the amplifier 816 is connected to the transmission signal electrode 811, while the other is connected to the transmission reference electrode 812.

Each of the transmitters 810-2 to 810-4 is similar in construction to the transmitter 810-1, and since the description of the transmitter 810-1 is applicable, the repetition of the same description will be omitted.

The receiver 820-1 corresponds to the receiver 120 shown in FIG. 1, and has a reception signal electrode 821 and a reception reference electrode 822 and further has, as a construction corresponding to the receiver section 123, an amplifier 823, a multiplier 824, a spread signal supply section 825 and an original signal output section 826.

After the receiver 820-1 has first restored an electrical signal on the basis of the method according to the present invention, the receiver 820-1 restores the original signal (a signal supplied from the original signal supply section 813) by the signal processing opposite to that of the transmitter 810-1.

Figure 27:
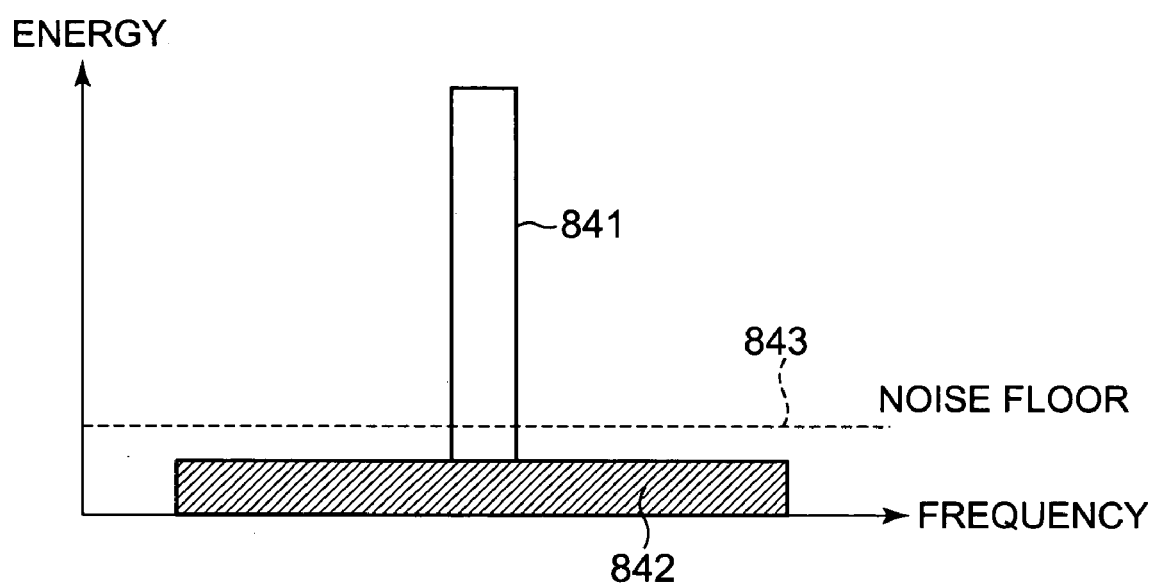
FIG. 27 is a graph showing an example of distribution of a frequency spectrum.

FIG. 27 shows a frequency spectrum due to such technique. The horizontal axis represents frequency, while the vertical axis represents energy. A spectrum 841 is a spectrum due to a technique based on a fixed frequency, and energy is concentrated at a particular frequency. This technique may not restore the signal if energy falls below a noise floor 843. On the other hand, a spectrum 842 is a spectrum based on a spread spectrum technique, and energy is spread over a wide frequency bandwidth. Since the area of the shown rectangle of the spectrum 842 can be regarded as denoting the total energy, the signal of the spectrum 842, although each frequency component thereof is below the noise floor 843, can be restored into the original signal by energy being integrated over the entire frequency bandwidth, so that communication can be performed.

By performing communication using the above-mentioned spread spectrum technique, the communication system 800 can perform simultaneous communications by using the same communication medium 830, as shown in FIG. 26. In FIG. 26, paths 831 to 835 denote communication paths on the communication medium 830. In addition, the communication system 800 can perform multiple-to-one communication as shown by the paths 831 and 832 as well as multiple-to-multiple communication by using the spread spectrum technique.

The second technique is a technique which causes a transmitter and a receiver to mutually decide on a frequency bandwidth and applies a frequency division technique for dividing the frequency bandwidth into a plurality of bands. In this case, the transmitter (or the receiver) performs allocation of a frequency band in accordance with particular rules of frequency allocation, or detects an idle frequency band at the time of start of communication and performs allocation of a frequency band on the basis of the detection result.

Figure 28:
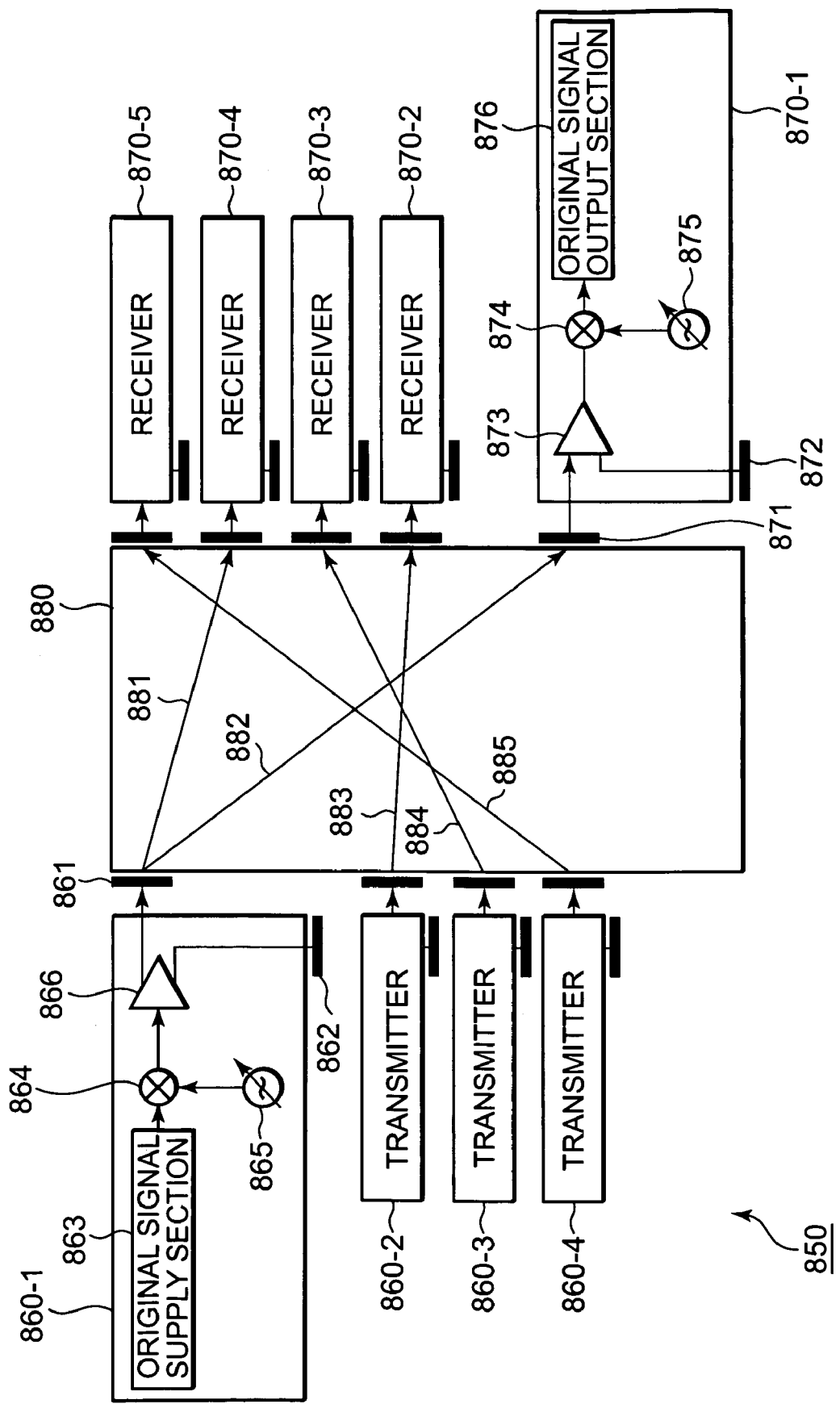
FIG. 28 is a schematic view showing another construction example of the communication system which underlies the present invention.

FIG. 28 is a diagram showing another construction example of the communication system which underlies the present invention. In a communication system 850 shown in FIG. 28, four transmitters 860-1 to 860-4 and five receivers 870-1 to 870-5 perform multiplex communications via a communication medium 880 by using a frequency division technique.

The transmitter 860-1 corresponds to the transmitter 110 shown in FIG. 1 and has a transmission signal electrode 861 and a transmission reference electrode 862, and further has, as a construction corresponding to the transmitter section 113, an original signal supply section 863, a multiplier 864, a frequency variable type oscillation source 865, and an amplifier 866.

An oscillation signal having a particular frequency component generated by the frequency variable type oscillation source 865 is multiplied by an original signal supplied from the original signal supply section 863, in the multiplier 864, and is outputted from the amplifier 866 after having been amplified in the same (it is assumed that filtering is appropriately performed). One of the outputs of the amplifier 866 is connected to the transmission signal electrode 861, while the other is connected to the transmission reference electrode 862.

Each of the transmitters 860-2 to 860-4 is similar in construction to the transmitter 860-1, and since the description of the transmitter 860-1 is applicable, the repetition of the same description will be omitted.

The receiver 870-1 corresponds to the receiver 120 shown in FIG. 1, and has a reception signal electrode 871 and a reception reference electrode 872 and further has, as a construction corresponding to the receiver section 123, an amplifier 873, a multiplier 874, a frequency variable type oscillation source 875 and an original signal output section 876.

After the receiver 870-1 has first restored an electrical signal on the basis of the method according to the present invention, the receiver 870-1 restores the original signal (a signal supplied from the original signal supply section 863) by the signal processing opposite to that of the transmitter 860-1.

Figure 29:
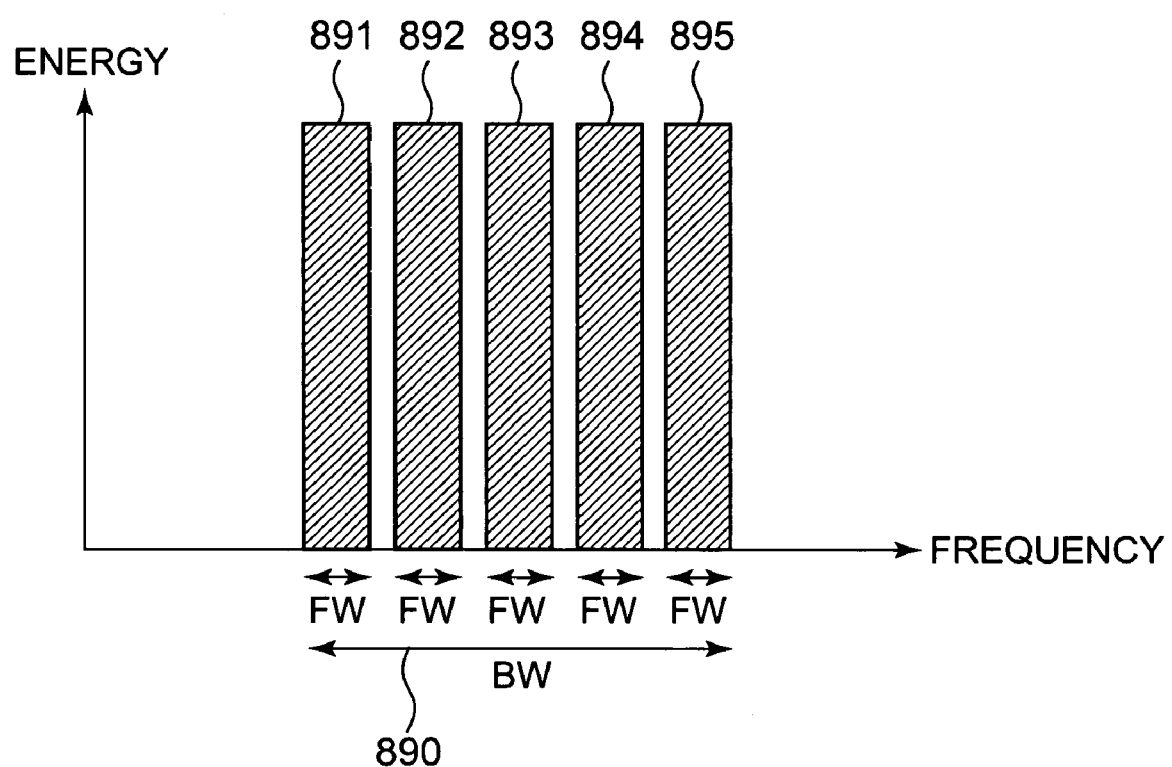
FIG. 29 is a graph showing an example of distribution of a frequency spectrum.

FIG. 29 shows an example of a frequency spectrum due to such technique. The horizontal axis represents frequency, while the vertical axis represents energy. For convenience of explanation, FIG. 29 shows an example in which an entire frequency bandwidth (BW) 890 is divided into five bandwidths (FW) 891 to 895. The divided frequency bandwidths are respectively used for communications on different communication paths. Namely, the transmitters 860-1 to 860-4 (the receivers 870-1 to 870-5) of the communication system 800 can perform a plurality of communications at the same time via the single communication medium 880 as shown in FIG. 28 while suppressing mutual interference by using the different frequency bands on the respective communication paths. In FIG. 28, paths 881 to 885 represent the respective communication paths on the communication medium 880. In addition, the communication system 850 can perform multiple-to-one communication as shown by the paths 881 and 882 as well as multiple-to-multiple communication by using the frequency division technique.

The communication system 850 (the transmitters 860-1 to 860-4 or the receivers 870-1 to 870-5) has been described above as being divided into the five bandwidths 891 to 895, but the number of division may be arbitrary and the sizes of the respective bandwidths may be made different from one another.

The third technique is a technique which applies a time division technique which causes a transmitter and receiver to mutually divide communication time therebetween. In this case, the transmitter (or the receiver) performs division of communication time in accordance with particular rules of time division, or detects an idle time zone at the time of start of communication and performs division of communication time on the basis of the detection result.

Figure 30:
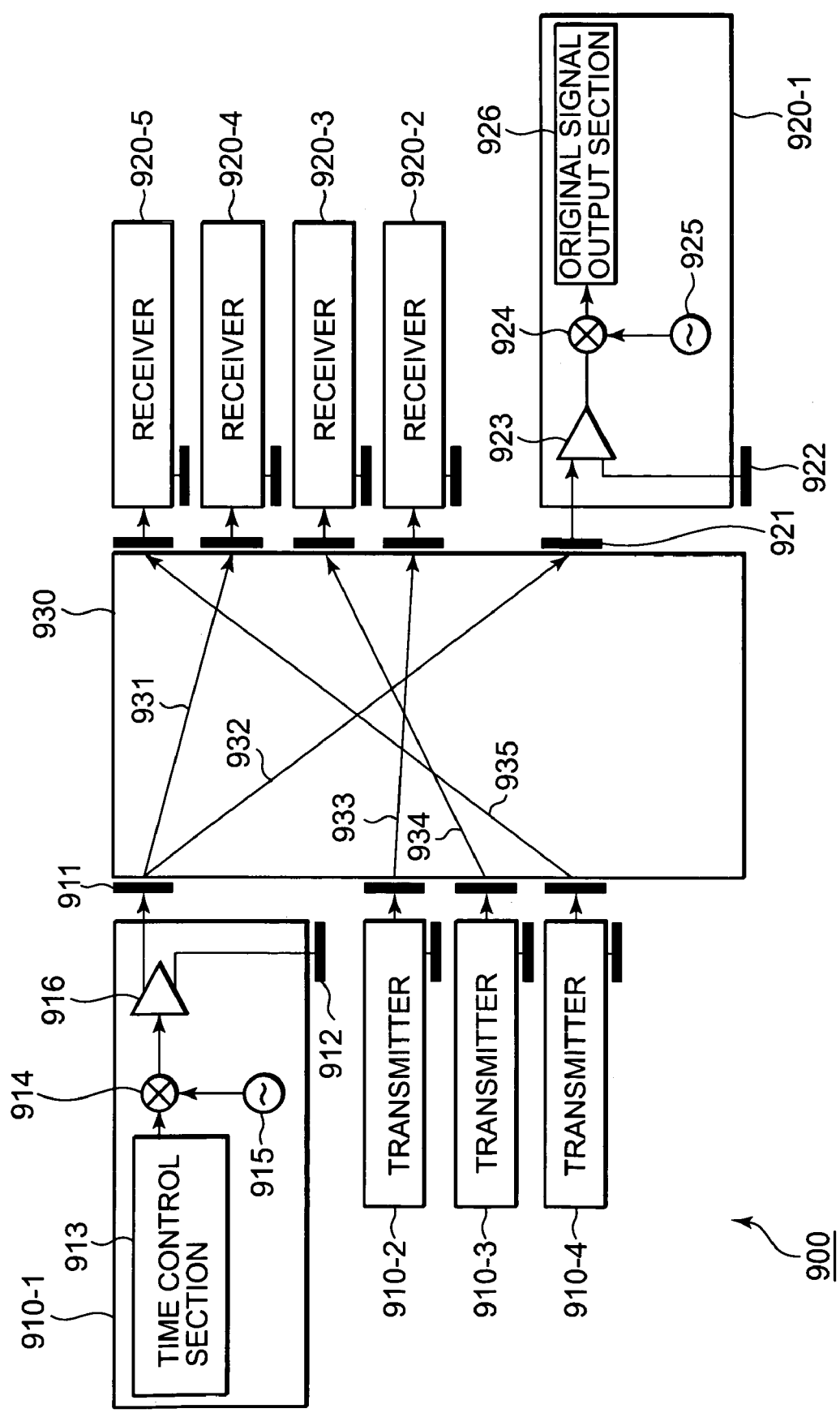
FIG. 30 is a diagram showing another construction example of the communication system which underlies the present invention.

FIG. 30 is a diagram showing another construction example of the communication system which underlies the present invention. In a communication system 900 shown in FIG. 30, four transmitters 910-1 to 910-4 and five receivers 920-1 to 920-5 perform multiplex communications via a communication medium 930 by using a time division technique.

The transmitter 910-1 corresponds to the transmitter 110 shown in FIG. 1 and has a transmission signal electrode 911 and a transmission reference electrode 912, and further has, as a construction corresponding to the transmitter section 113, a time control section 913, a multiplier 914, an oscillation source 915, and an amplifier 916.

An original signal is outputted by the time control section 913 at a predetermined time. The multiplier 914 multiplies the original signal by an oscillation signal supplied from the oscillation source 915, and the multiplication result is outputted from the amplifier 916 after having been amplified by the same (it is assumed that filtering is appropriately performed). One of the outputs of the amplifier 916 is connected to the transmission signal electrode 911, while the other is connected to the transmission reference electrode 912.

Each of the transmitters 910-2 to 910-4 is similar in construction to the transmitter 910-1, and since the description of the transmitter 910-1 is applicable, the repetition of the same description will be omitted.

The receiver 920-1 corresponds to the receiver 120 shown in FIG. 1, and has a reception signal electrode 921 and a reception reference electrode 922 and further has, as a construction corresponding to the receiver section 123, an amplifier 923, a multiplier 924, an oscillation source 925 and an original signal output section 926.

After the receiver 920-1 has first restored an electrical signal on the basis of the method according to the present invention, the receiver 920-1 restores the original signal (a signal supplied from the time control section 913) by the signal processing opposite to that of the transmitter 920-1.

Figure 31:
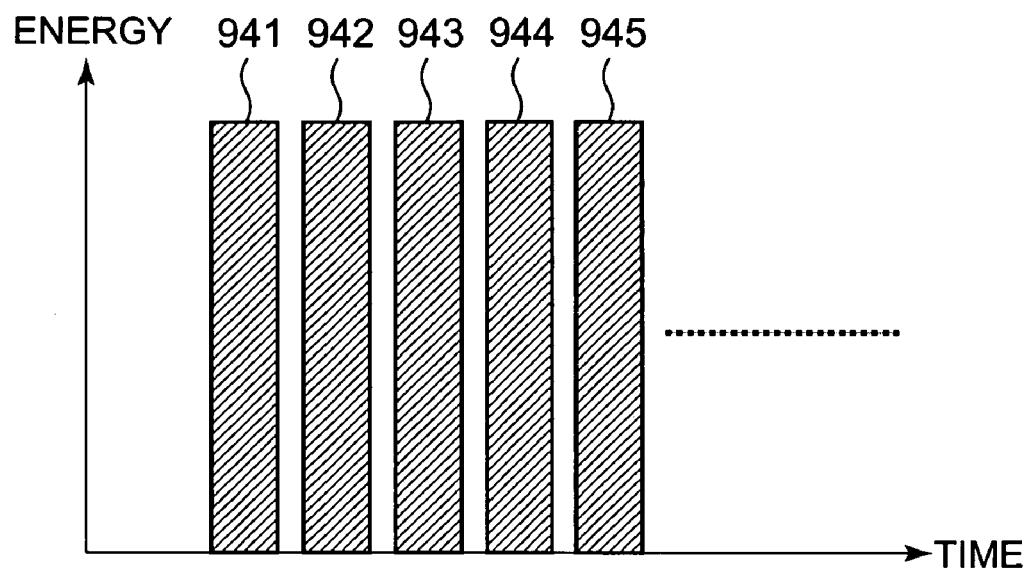
FIG. 31 is a graph showing an example of temporal distribution of a signal.

FIG. 31 shows an example of a frequency spectrum due to such technique, plotted along the time axis. The horizontal axis represents time, while the vertical axis represents energy. For convenience of explanation, FIG. 31 shows five time zones 941 to 945, but actually, time continues after the time zone 945 in a similar manner. The divided time zones are respectively used for communications on different communication paths. Namely, the transmitters 910-1 to 910-4 (the receivers 920-1 to 920-5) of the communication system 900 can perform a plurality of communications at the same time via the single communication medium 900 as shown in FIG. 30 while suppressing mutual interference by performing communications on the respective communication paths during different time zones. In FIG. 30, paths 931 to 935 represent the respective communication paths on the communication medium 930. In addition, the communication system 900 can perform multiple-to-one communication as shown by the paths 931 and 932 as well as multiple-to-multiple communication by using the time division technique.

In addition, the communication system 900 (the transmitter 910 or the receiver 920) may also be constructed so as to make the time widths of the respective time zones different from one another.

Furthermore, in addition to the above-mentioned methods, at least two of the first to third communication techniques may also be combined.

It is particularly important in particular applications that a transmitter and a receiver can perform a plurality of other devices at the same time. For example, on the assumption that this construction is applied to transportation tickets, it is possible to use the construction in useful applications in which when a user who possesses both a device A having information on a commutation ticket and a device B having an electronic money function passes through an automatic ticket gate, if, for example, a section through which the user has passed contains a section not covered by the commutation ticket, a deficiency is subtracted from the electronic money of the device B by the automatic ticket gate communicating with the device A and the device B at the same time by using any of the above-mentioned techniques.

Figure 32:
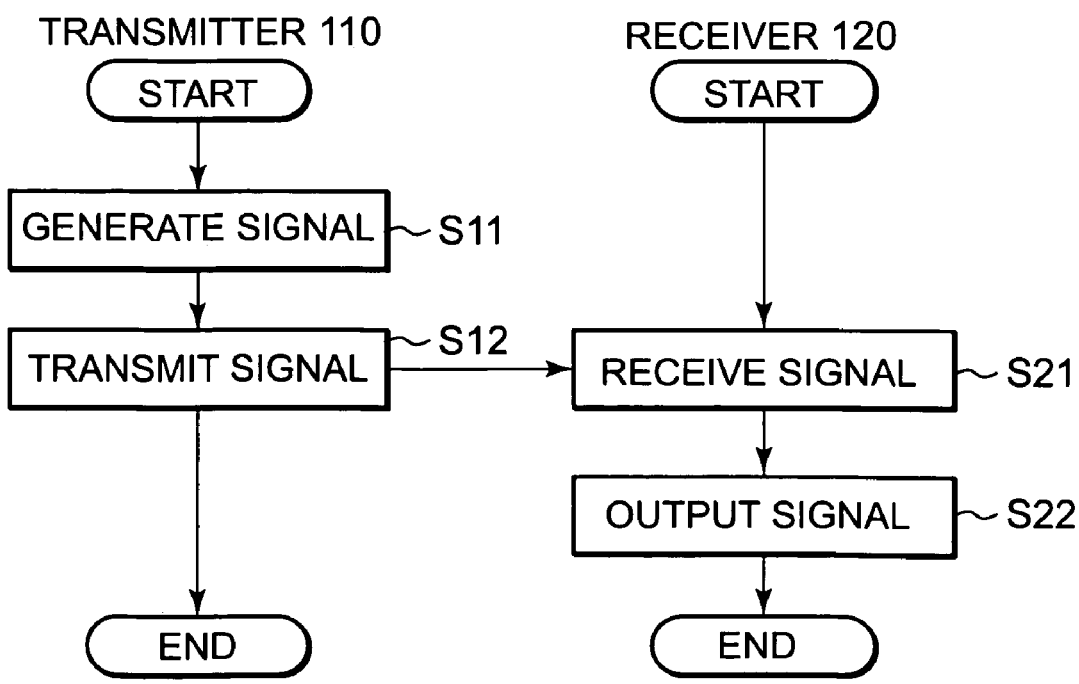
FIG. 32 is a flowchart showing an example of a flow of communication processing.

The flow of communication processing executed during the communication between the transmitter and the receiver will be described below on the basis of the flowchart shown in FIG. 32 with illustrative reference to the case of communication between the transmitter 110 and the receiver 120 of the communication system 100 shown in FIG. 1.

In step S11, the transmitter section 113 of the transmitter 110 generates a signal to be transmitted, in step S11, and in step S12, the transmitter 110 transmits the generated signal to the communication medium 130 via the transmission signal electrode 111. When the signal is transmitted, the transmitter section 113 of the transmitter 110 completes communication processing. The signal transmitted from the transmitter 110 is supplied to the receiver 120 via the communication medium 130. In step S21, the receiver section 123 of the receiver 120 receives the signal via the reception signal electrode 121, and in step S22 outputs the received signal. The receiver section 123 which has outputted the received signal completes communication processing.

As mentioned above, the transmitter 110 and the receiver 120 can perform basic communication via the communication medium 130 through simple processing without the need for complex processing. Namely, the transmitter 110 and the receiver 120 do not need a closed circuit using reference electrodes and can easily perform stable communication processing without being influenced by environments, merely by performing transmission and reception via the signal electrodes. Accordingly, the transmitter 110 and the receiver 120 (the communication system 100) can reduce loads on communication processing for performing stable communication without being influenced by environments, and can also reduce manufacturing costs. In addition, since the structure of communication processing is simplified, the communication system 100 can use various communication techniques such as modulation, encoding, encryption and multiplexing at the same time.

In the description of each of the communication systems, the transmitter and the receiver have been described as being constructed as separated devices, but the present invention is not limited to this construction and a communication system may be constructed by using a transmitter/receiver having the functions of both the transmitter and the receiver.

Figure 33:
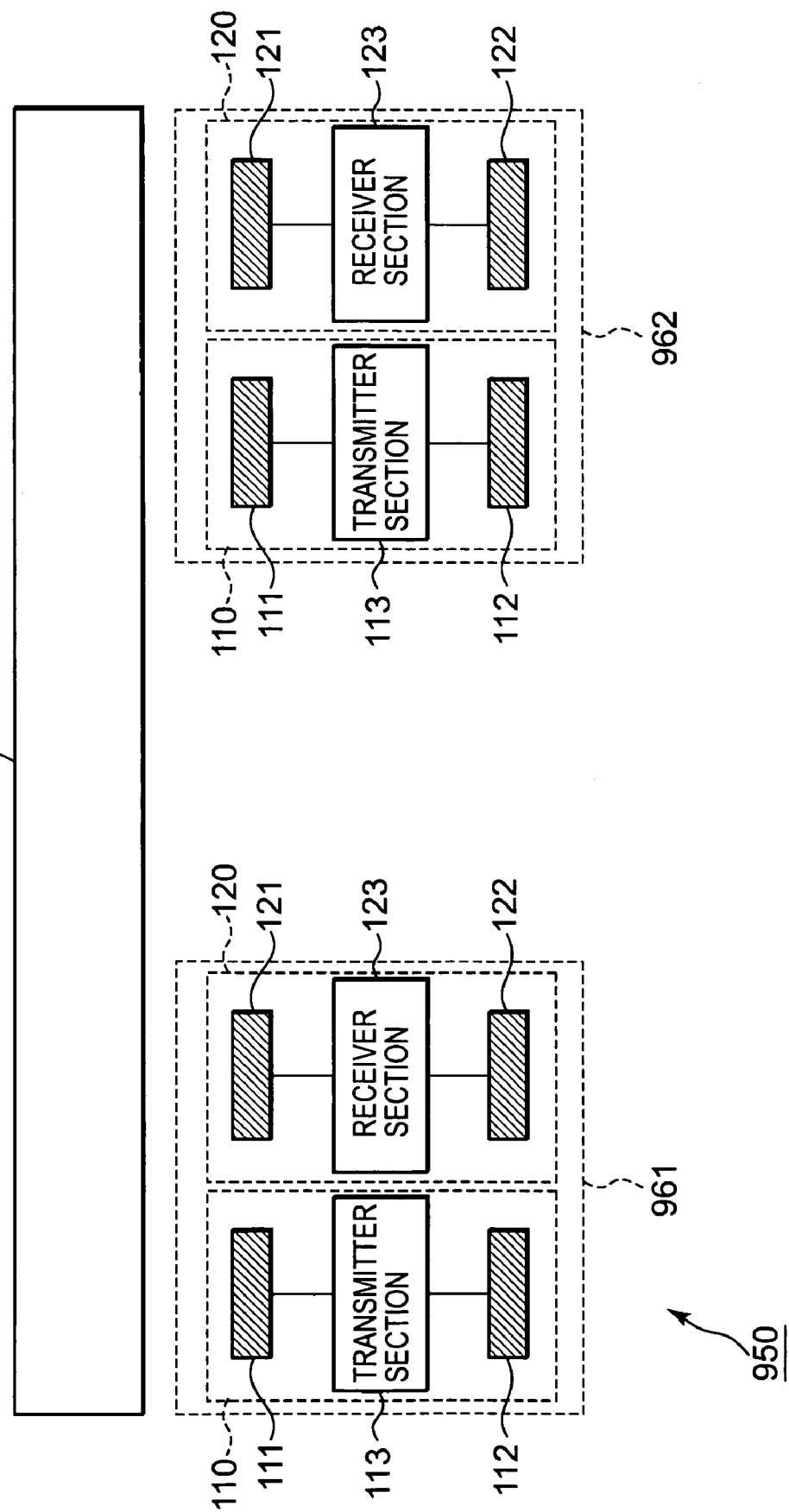
FIG. 33 is a diagram showing another construction example of the communication system which underlies the present invention.

FIG. 33 is a diagram showing another construction example of the communication system which underlies the present invention.

In FIG. 33, a communication system 950 has a transmitter/receiver 961, a transmitter/receiver 962, and the communication medium 130. The communication system 950 is a system which the transmitter/receiver 961 and the transmitter/receiver 962 perform bi-directional transmission and reception of signals via the communication medium 130.

The transmitter/receiver 961 has a transmitter section 110 having a construction similar to the transmitter 110 shown in FIG. 1, and a receiver section 120 having a construction similar to the receiver 120 shown in FIG. 1. Namely, the transmitter/receiver 961 has the transmission signal electrode 111, the transmission reference electrode 112, the transmitter section 113, the reception signal electrode 121, the reception reference electrode 122 and the receiver section 123.

Namely, the transmitter/receiver 961 transmits a signal via the communication medium 130 by using the transmitter section 110, and receives a signal supplied via the communication medium 130, by using the receiver section 120. The transmitter/receiver 961 is constructed so that the communication by the transmitter section 110 and the communication by the receiver section 120 are prevented from interfering with each other at this time.

Since the transmitter/receiver 962 has a construction similar to the transmitter/receiver 961 and operates in a similar manner, the description of the transmitter/receiver 962 will be omitted. The transmitter/receiver 961 and the transmitter/receiver 962 perform bi-directional communications via the communication medium 130 by the same method.

In this manner, the communication system 950 (the transmitter/receiver 961 and the transmitter/receiver 962) can easily realize bi-directional communications not restricted by use environments.

In the above-mentioned construction example, although different electrodes are used for transmission and reception, one set of signal and reference electrodes is provided in each device so that the device can be switched between transmission and reception.

Figure 34:
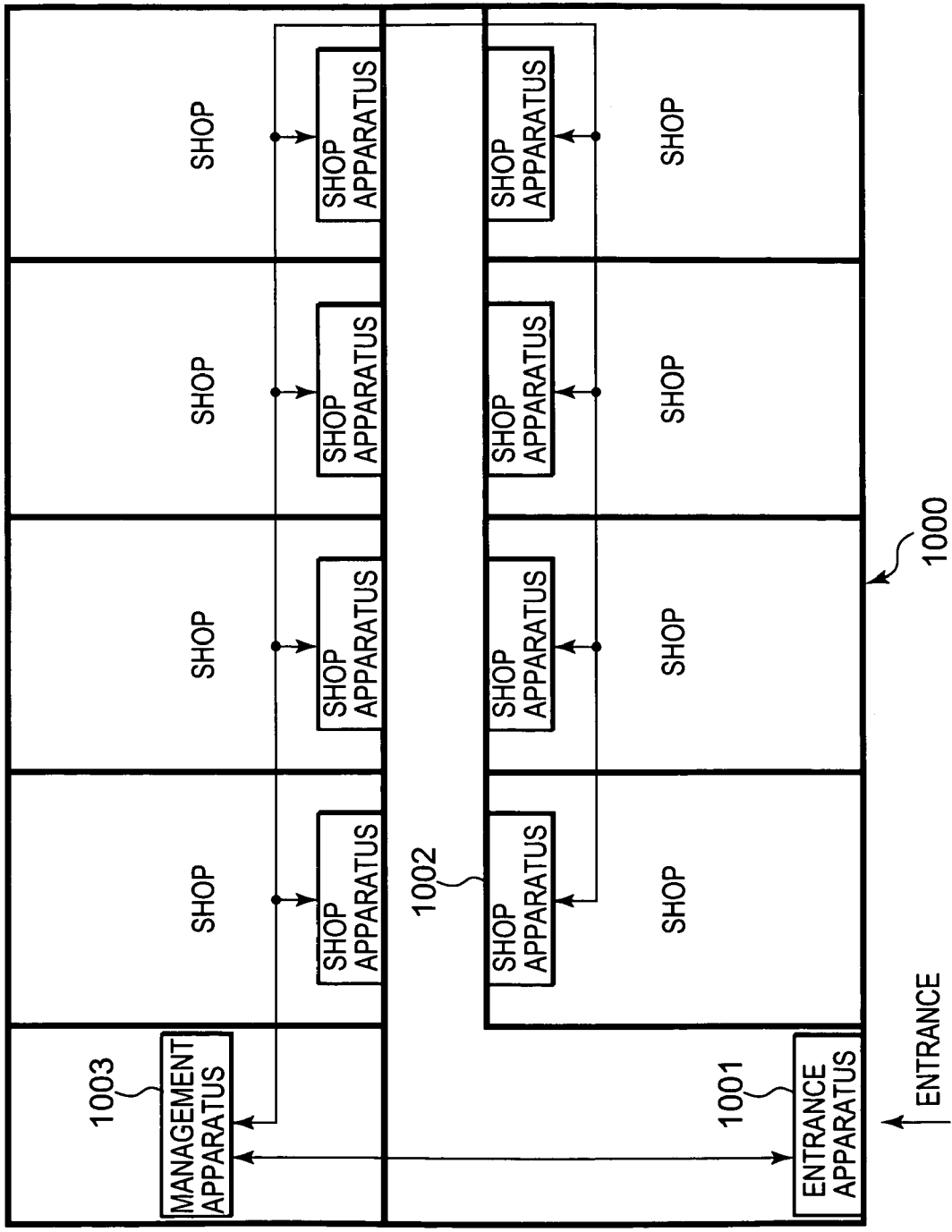
FIG. 34 is a diagram showing a construction example of a point addition system to which the present invention is applied.

A point addition system which is based on the above-mentioned communication system and to which the present invention is applied will be described below with reference to FIG. 34. A point addition system 1000 is provided in a department store, a shopping mall or the like which has a plurality of shops or salesrooms, and adds points (which can be used in place of cash or exchanged with prizes) corresponding to purchase amounts to individual customers who have purchased merchandises, and also adds points to visitors (irrespective of whether they have purchased merchandises) in consideration of the fact that they have visited to the department store or the like. In the following description, a customer who passes through an entrance of the department store or the like will be referred to as the visiting customer, a customer who entered a shop will be referred to as the entering customer, and a customer who has purchased a merchandise at a shop will be referred to as the purchasing customer. Addition of points to the visiting customer (or the purchasing customer) is performed by updating the points recorded on the user device 1100 (corresponding to the transmission/receiver 962 in FIG. 33) worn on the visiting customer or the purchasing customer.

The point addition system 1000 supplies the visiting customer, the entering customer or the purchasing customer with sales information that the communication system 100 generates on the basis of his/her past purchase history (information on new merchandises, information on related merchandises, information on merchandises offered at a bargain, discount coupons and the like).

Namely, the point addition system 1000 can be expected to have the effect of increasing the visiting customer's willingness to spend, and can effectively supply customers who have not yet visited shops with sales information without waste as compared with a conventional method of executing sales promotion activities for customers who have not yet visited shops (for example, advertisements of newspapers, direct mail using mail or e-mail and salesmanship over telephone).

The point addition system 1000 includes the entrance apparatus 1001 arranged at an entrance of the department store or the like, the shop apparatuses 1002 respectively arranged at the entrances of a plurality of shops which constitute the department store or the like, and the management apparatus 1003 which manages points earned to the visiting customer, the entering customer and the purchasing customer, on the basis of notifications from the entrance apparatus 1001 and the shop apparatuses 1002.

The entrance/exit unit 1001, when the customer visits or leaves the department store or the like, adds to the visiting customer points (visitation points) for his/her visit, and supplies sales information generated on the basis of the purchase history of the visiting customer to the user device 1100 (FIG. 35) of the visiting customer. In addition, as such sales information, the entrance apparatus 1001 may also supply information generated for unspecified persons irrespective of the purchase history of the visiting customer (for example, the URL (Uniform Resource Locator) of the home page of the department store or the URLs of the respective shops. In addition, a plurality of entrance/exit units 1001 may also be provided to exit according to the number of entrances. Each of the shop apparatuses 1002 supplies the entering customer with sales information generated on the basis of his/her purchase history to the user device 1100 of the entering customer. As such sales information, each of the shop apparatuses 1002 may also supply the entering customer with information generated irrespective of his/her purchase history (for example, the URL of the home page of the corresponding one of the plurality of shops).

Figure 35:
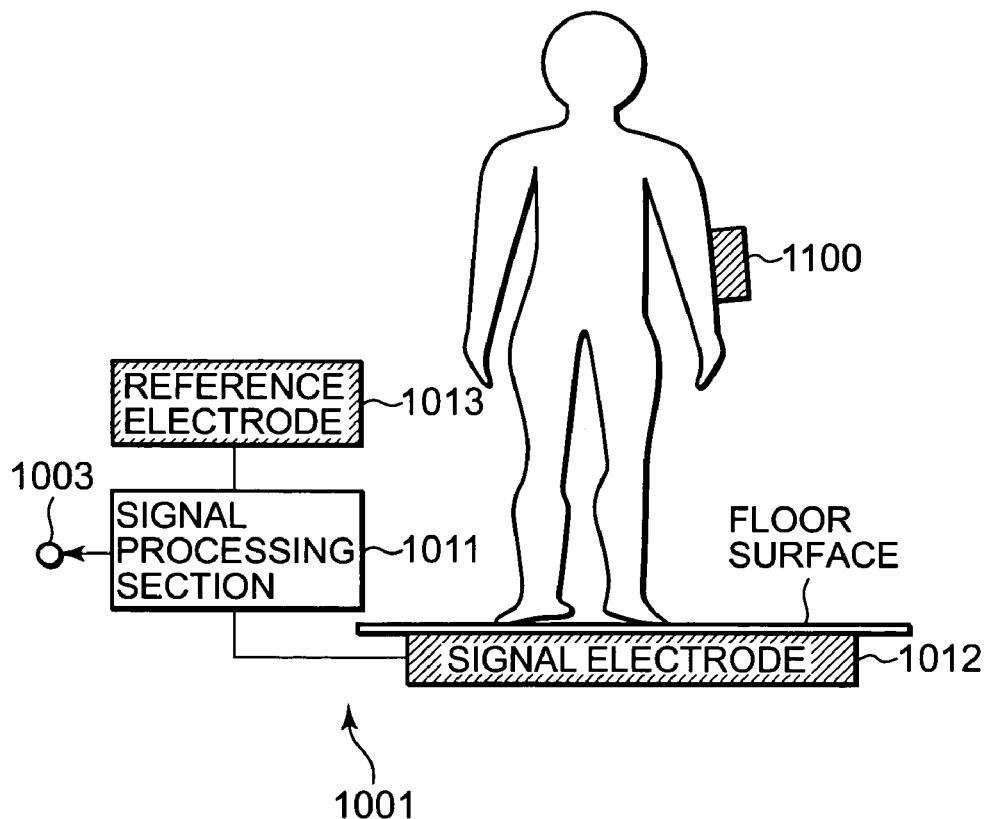
FIG. 35 is a block diagram showing a construction example of the entrance apparatus shown in FIG. 34.

FIG. 35 is a schematic view showing a construction example of the entrance apparatus 1001. The entrance apparatus 1001 includes a signal processing section 1011, a signal electrode 1012 and a reference electrode 1013.

The signal processing section 1011 has a construction in which, for example, the transmission section 113 and the reception section 123 shown in FIG. 33 are integrated, and the signal electrode 1012 and the reference electrode 1013 are connected to the signal processing section 1011. The signal electrode 1012 has a construction in which, for example, the transmit signal electrode 111 and the receive signal electrode 121 shown in FIG. 33 are integrated, and is arranged on the floor surface of the department store or the like. In addition, the signal electrode 1012 may be arranged on the floor surface in an uncovered state or in the state of being covered with an insulator or the like. The signal electrode 1012 may be arranged not only at the entrance of the department store or the like but also everywhere in the department store or the like, for example, on the floor surfaces of other places.

The reference electrode 1013 has a construction in which, for example, the transmission reference electrode 112 and the reception reference electrode 122 shown in FIG. 33 are integrated, and the arrangement position of the reference electrode 1013 is arbitrary. Accordingly, the signal processing section 1011 can bidirectionally communicate signals to the user device 1100 (corresponding to the transmission/receiver 962 shown in FIG. 33) of the worn on a customer who is located at the entrance of the department store or the like (i.e., a customer who is in contact with or in close proximity to the signal electrode 1012), via the body (corresponding to the communication medium 130 shown in FIG. 33) of the customer.

Figure 36:
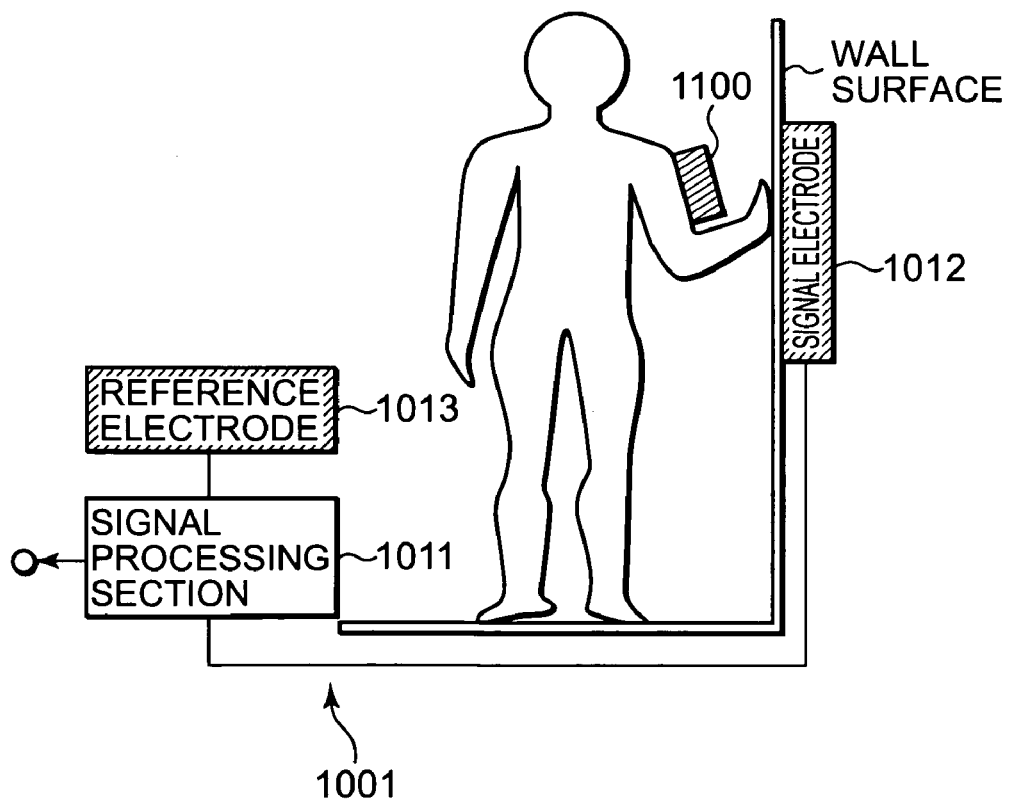
FIG. 36 is a block diagram showing another construction example of the entrance apparatus shown in FIG. 34.

In addition, the signal electrode 1012 of the entrance apparatus 1001 may also be arranged on a wall surface near the entrance, as shown in FIG. 36 by way of example. However, in this case, the customer is required to intentionally come into contact with (or into close proximity to) the wall surface on which the signal electrode 1012 is arranged.

Figure 37:
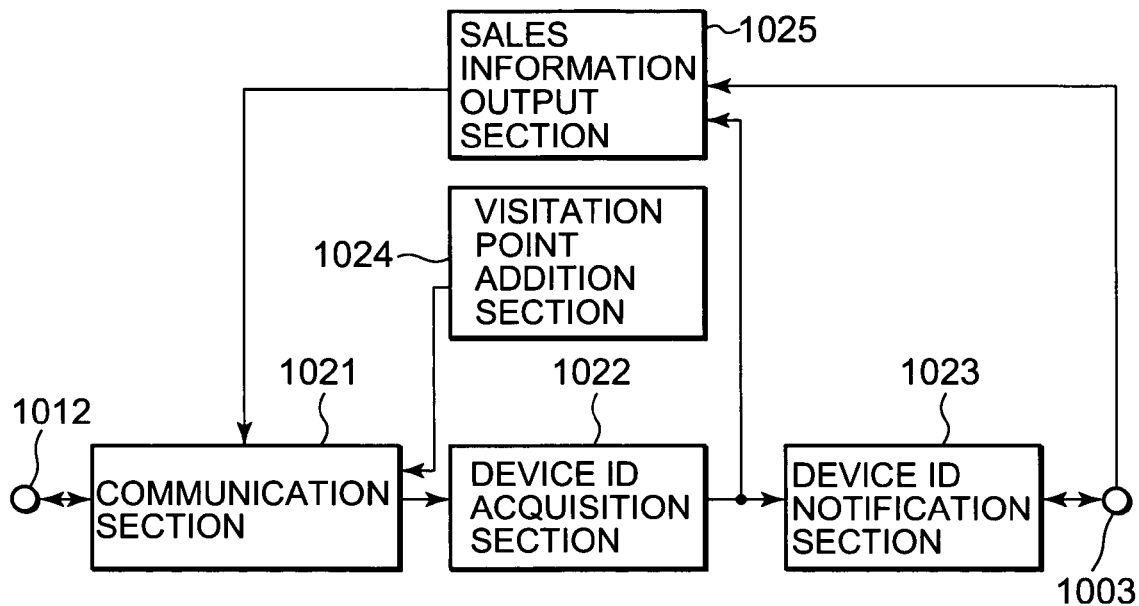
FIG. 37 is a block diagram showing a construction example of the signal processing section shown in FIG. 35.

FIG. 37 is a block diagram showing a construction example of the signal processing section 1011 of the entrance apparatus 1001. The signal processing section 1011 includes a communication section 1021, the device ID acquisition section 1022, the device ID notification section 1023, the visitation point addition section 1024, and the sales information output section 1025.

The communication section 1021 communicates with the user device 1100 of the visiting customer via the signal electrode 1012. The device ID acquisition section 1022 acquires the device ID (a unique identification information recorded on a memory 1104 of the user device 1100 which will be mentioned later with reference to FIG. 42) of the user device 1100 which is in communication with the communication section 1021 via the communication section 1021, and outputs the device ID to the device ID notification section 1023 and the sales information output section 1025. The device ID notification section 1023 transmits the device ID inputted from the device ID acquisition section 1022 to the management apparatus 1003 as visitation information. The visitation point addition section 1024 supplies visitation points via the communication section 1021 to the user device 1100 which is in communication with the communication section 1021.

The sales information output section 1025 stores sales information (which is assigned the corresponding device ID) supplied from the management apparatus 1003, and reads the sales information corresponding to the device ID notified from the device ID notification section 1023 and supplies the read sales information to the user device 1100 via the communication section 1021.

Figure 38:
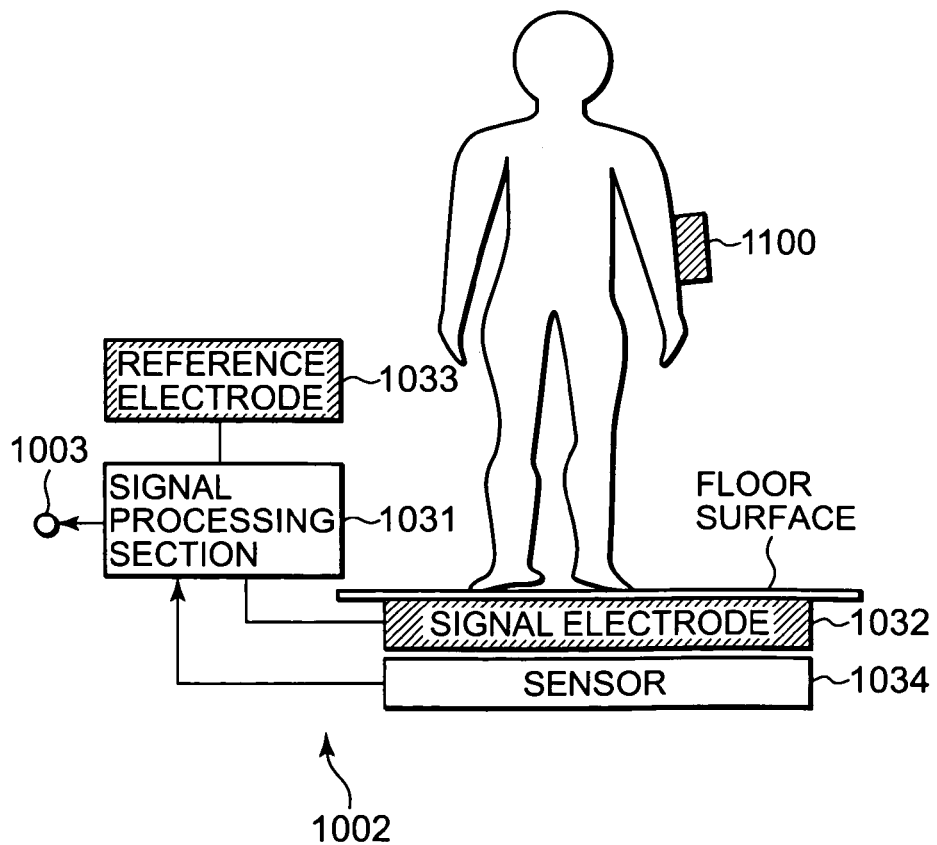
FIG. 38 is a block diagram showing a construction example of one of the shop apparatuses shown in FIG. 34.

FIG. 38 is a schematic view showing a construction example of one of the shop apparatuses 1002. The shown shop apparatus 1002 includes a signal processing section 1031, a signal electrode 1032, a reference electrode 1033, and a sensor 1034.

The signal processing section 1031 has a construction in which, for example, the transmission section 113 and the reception section 123 shown in FIG. 33 are integrated, and the signal electrode 1032 and the reference electrode 1033 are connected to the signal processing section 1031. The signal electrode 1032 has a construction in which, for example, the transmit signal electrode 111 and the receive signal electrode 121 shown in FIG. 33 are integrated, and is arranged on the floor surface of a shop entrance or the like. The reference electrode 1033 has a construction in which, for example, the transmission reference electrode 112 and the reception reference electrode 122 shown in FIG. 33 are integrated, and the arrangement position of the reference electrode 1033 is arbitrary. The sensor 1034 is also connected to the signal processing section 1031. The sensor 1034 is made of a pressure sensor, an optical sensor or the like, and outputs a sensor output which varies in correspondence with the entrance of a customer into the shop, to the signal processing section 1031.

Accordingly, the signal processing section 1031 can detect the entering customer on the basis of the sensor output from the sensor 1034 and bidirectionally communicate signals with the user device 1100 (corresponding to the transmission/receiver 962 in FIG. 33) worn on the entering customer, via the body of the entering customer corresponding to the communication medium 130 shown in FIG. 33.

In addition, the signal electrode 1032 may be arranged not only at the entrance of the shop but also in every place such as a corridor inside or outside the shop.

FIG. 39 is a block diagram showing a construction example in which, for example, the shop apparatuses 1002 and the signal processing section 1031 shown in FIG. 39 are integrated. The signal processing section 1031 has the person detection section 1051, a communication section 1052, the device ID acquisition section 1053, the notification section 1054, the sales information output section 1055, and a purchase information input section 1056.

The person detection section 1051 detects the entering customer on the basis of the sensor output from the sensor 1034 and notifies the detected result to the communication section 1052. The communication section 1052 communicates with the user device 1100 of the entering customer via the signal electrode 1032. The device ID acquisition section 1053 acquires via the communication section 1052 the device ID of the user device 1100 which is in communication with the communication section 1052, and outputs the device ID to the notification section 1054 and the sales information output section 1055.

The notification section 1054, when the customer enters the shop, transmits the device ID inputted from the device ID acquisition section 1053 and a shop ID which is identification information on the shop, to the management apparatus 1003 as entrance information. In addition, the notification section 1054, when the entering customer purchases a merchandise, transmits to the management apparatus 1003 as entrance information the device ID of the user device 1100 worn on the entering customer, the shop ID, and purchase points earned according to the purchase of the merchandise and production information (including a price and a payment method) which specifies the purchased merchandise, the purchase points and the production information being inputted from the purchase information input section 1056.

The purchase information input section 1056 stores the sales information (assigned the corresponding device ID) supplied from the management apparatus 1003, and reads the sales information corresponding to the device ID notified from the device ID acquisition section 1053 and supplies the read sales information to the user device 1100 via the communication section 1052. The purchase information input section 1056 is connected to, for example, a register provided in the shop, and inputs merchandise information indicative of the purchased merchandise and purchase points corresponding to the purchase amount.

FIG. 40 is a block diagram showing a construction example of the management apparatus 1003. The management apparatus 1003 includes the visitation information acquisition section 1061, the entrance information acquisition section 1062, the customer information store section 1063, the point addition judgment section 1065, a purchase trend analyze section 1066, the sales information generation section 1067, and the sales information supply section 1068.

The visitation information acquisition section 1061 receives visitation information transmitted from the entrance apparatus 1001, and outputs the received visitation information to the customer information store section 1063 and the sales information supply section 1068. The entrance information acquisition section 1062 receives entrance information transmitted from the shop apparatuses 1002 and outputs the received entrance information to the customer information store section 1063 and the sales information supply section 1068. The customer information store section 1063 stores customer information 1064 on customers (visiting customers, entering customers and purchasing customers).

Figure 41:
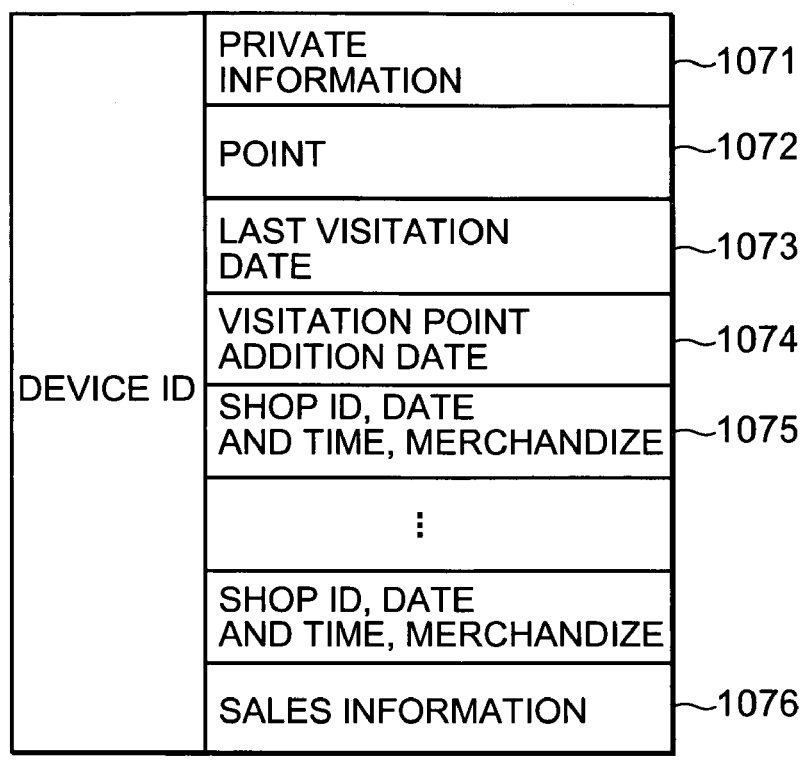
FIG. 41 is a flowchart aiding in explaining one example of the customer information shown in FIG. 40.

FIG. 41 is a schematic view showing one example of the customer information 1064 for one person. Private information 1071 such as his/her name, address, telephone number and mail address, information 1072 indicative of points presently earned to the person, information 1073 indicative of the last visitation date, information 1074 indicative of the last date that visitation points were earned to the person, information 1075 indicative of the shop ID of a shop that the person has entered, the date and time when the person has entered the shop, and a merchandise purchased by the person, are recorded in the customer information 1064 on each customer in association with the device ID. The information 1075 indicative of the shop ID of the shop that the person has entered, and the date and time of the person's entrance, and the purchased merchandise can store a plurality of pieces of information corresponding to a predetermined time period. Furthermore, sales information 1076 generated on the basis of the information 1075 is recorded in the customer information 1064 in association with the device ID.

Returning to FIG. 40, the customer information store section 1063 updates the information 1073 indicative of the last visitation date in the customer information 1064 on the basis of the visitation information inputted from the visitation information acquisition section 1061. In addition, the customer information store section 1063 updates the information 1072 indicative of points by adding purchase points to the information 1072 on the basis of the entrance information inputted from the visitation information acquisition section 1061, and adds the information 1075 indicative of the shop ID of the shop that the person has entered and the date and time when the person has entered the shop. Furthermore, the customer information store section 1063 adds or updates the sales information 1076 on the basis of the sales information inputted from the sales information generation section 1067.

The point addition judgment section 1065 refers to the customer information 1064 stored in the customer information store section 1063, at intervals of a predetermined period (for example, once per day after the closure of the department store), and detects the customer information 1064 which contains the information 1073 indicating today as the last visitation date and the information 1074 indicating a date other than today as the last visitation point addition date, and updates the information 1072 indicative of points by adding visitation points thereto and updates the information 1074 indicative of the visitation point addition date into today.

The purchase trend analyze section 1066 monitors the customer information 1064 stored in the customer information store section 1063, and when merchandise information is earned, analyzes the purchase history (i.e., the information 1075) of a customer who has purchased the merchandise, and outputs the analyzed information to the sales information generation section 1067. In addition, the analysis of purchase history by the purchase trend analyze section 1066 and the generation of sales information by the sales information generation section 1067 may also be performed at intervals of a predetermined period (for example, once per day)

For example, if the purchase trend analyze section 1066 analyses a customer as, for example, "a customer who tends to frequently buy brand-name merchandises and purchase brand-name merchandises even at high prices", the sales information generation section 1067 generates sales information on new merchandises of the brands purchased by the customer in the past. If the purchase trend analyze section 1066 analyses a customer as, for example, "a customer whose almost all purchased merchandises are foodstuffs and whose use of the department store is restricted to the purchase of commodities, the sales information generation section 1067 generates sales information associated with recommended commodities or sales information associated with merchandises other than commodities in order to let the customer buy merchandises other than commodities. If the purchase trend analyze section 1066 analyses a customer as, for example, "a customer who does not purchase anything but bargain-priced items listed in advertisements, the sales information generation section 1067 generates sales information associated with bargain-priced items sold for a limited time only.

Otherwise, the sales information generation section 1067 may also be adapted to generate sales information associated with merchandises related to a certain merchandise for a customer who has purchased the merchandise. For example, the sales information generation section 1067 may generate sales information associated with merchandises related to suits, such as shirts, neckties and socks, for a customer who has purchased a suit, or sales information associated with video recorders for a customer who has purchased a television set, or sales information associated with outdoor equipment for a customer who has purchased a sports type of bicycle, or sales information associated with gifts other than a certain gift for a customer who has purchased the gift. In addition, such sales information may be constructed to contain not only information on merchandises and the prices thereof but also discount coupons and bonus points for merchandise purchase.

When the visitation information is inputted from the visitation information acquisition section 1061 or when the entrance information is inputted from the entrance information acquisition section 1062, the sales information supply section 1068 reads the sales information 1076 recorded in the customer information 1064 of the customer information store section 1063, which corresponds to the device ID contained in the visitation information or the entrance information, and assigns the device ID to the read sales information and transmits the sales information to all the entrance apparatuses 1001 and all the shop apparatuses 1002.

In this manner, the sales information is transmitted to all the entrance apparatuses 1001 and all the shop apparatuses 1002, so that even if the entering customer or the visiting customer moves from shop to shop, sales information can be supplied to the customer from the shop apparatus 1002 of a shop to which the customer has moved, as long as the customer is in the department store.

Figure 42:
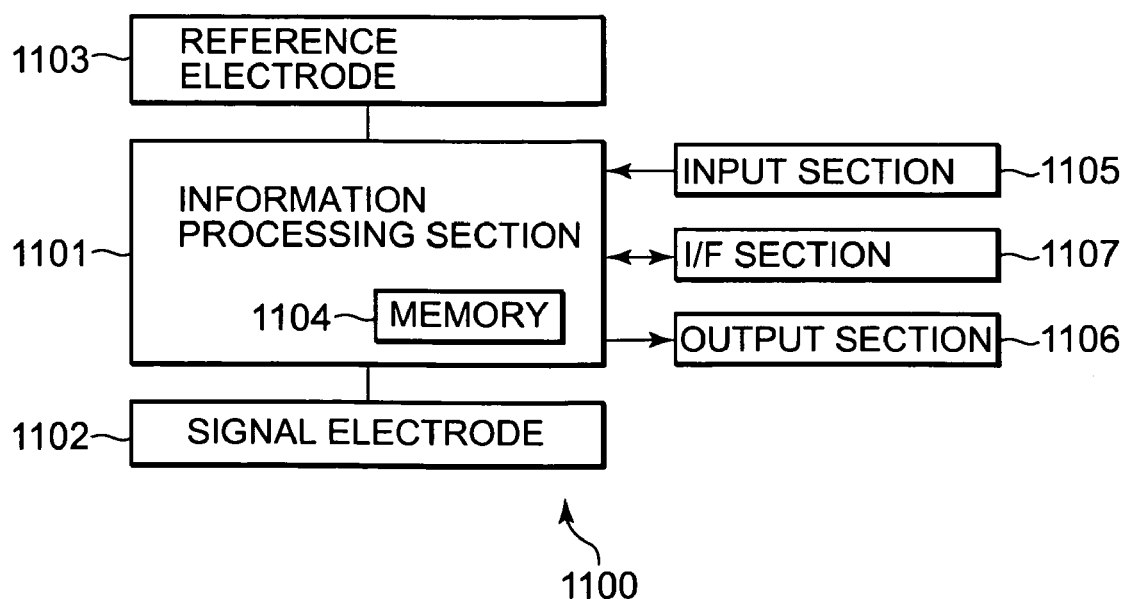
FIG. 42 is a block diagram showing a construction example of the user device shown in FIG. 35.

FIG. 42 is a block diagram showing a construction example of the user device 1100 worn on the entering customer or the like. The shown user device 1100 corresponds to the 962 shown in FIG. 33.

The user device 1100 includes a signal processing section 1101, a signal electrode 1102, a reference electrode 1103, an input section 1105, an output section 1106, and an interface (I/F) section 1107.

The signal processing section 1101 has a construction in which, for example, the transmission section 113 and the reception section 123 shown in FIG. 33 are integrated, and the signal electrode 1102 and the reference electrode 1103 are connected to the signal processing section 1101. The signal electrode 1102 has a construction in which, for example, the transmit signal electrode 111 and the receive signal electrode 121 shown in FIG. 33 are integrated. The reference electrode 1103 has a construction in which, for example, the transmission reference electrode 112 and the reception reference electrode 122 shown in FIG. 33 are integrated. A wearer such as a visiting customer wears the user device 1100 so that the side of the casing on which the signal electrode 1102 is arranged is located to face the body of the wearer. In this manner, the signal processing section 1101 can bidirectionally communicate signals with the entrance apparatus 1001 or the shop apparatus 1002 via the body of the wearer (such as a visiting customer) corresponding to the communication medium 130 shown in FIG. 33.

Figure 43:
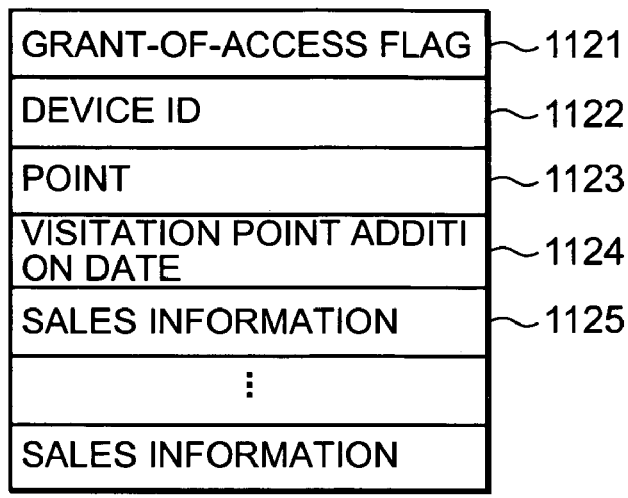
FIG. 43 is a schematic view showing one example of information recorded on the memory shown in FIG. 40.

A memory 1104 is contained in the signal processing section 1101. FIG. 43 is a schematic view showing an example of information recorded on the memory 1104. An grant-of-access flag 1121 indicative of the grant or refusal of access from the entrance apparatus 1001 or the shop apparatuses 1002 which is set by a user, a device ID 1122 which is identification information on the user device 1100, information 1123 indicative of presently earned points, information 1124 indicative of the last date that visitation points were earned to the wearer, sales information 1125 supplied from the entrance apparatus 1001 or the shop apparatuses 1002, and the like, are recorded on the memory 1104. In addition, information such as a credit card number for settlement of accounts and information such as the balance of a prepaid-type electronic money may also be recorded on the memory 1104.

The input section 1105 accepts a setting indicative of the grant or refusal of access from the entrance apparatus 1001 or the shop apparatuses 1002, from the user (such as a visiting customer), and notifies the setting to the signal processing section 1101. In accordance with the setting, the signal processing section 1101 modifies the grant-of-access flag 1121 of the memory 1104.

If access from the entrance apparatus 1001 or the shop apparatuses 1002 is granted, the visiting customer or the entering customer can gain visitation points and acquire sales information. The management apparatus 1003 is able to collect information on the movement of the customer, such as information indicating which of the shops the customer has visited, but there are visiting customers who do not desire information indicative of their movement to be collected. For such visiting customers, the signal processing section 1101 is constructed to be able to refuse access to the user device 1100.

In addition, the user device 1100 may also be constructed so that the I/F section 1107 is omitted and information is transmitted to a dedicated device of each shop via the body of the customer by using the signal electrode 1102 and the reference electrode 1103.

The output section 1106 includes a display for displaying images, a speaker for outputting sound, a vibrator for vibrating the user device 1100, and the like, and operates on the basis of the information recorded on the memory 1104 so as to display presently earned points or sales information, to add points, to add an alarm indicating the fact that sales information has been supplied, or to produce a vibration in place of the alarm.

The interface section 1107 is connected to a personal computer (not shown) and the like, and is able to transmit sales information 1125 and the like stored on the memory 1104 to the personal computer and the like. The user is able to access an URL contained in the sales information 1125 by using the personal computer and acquire information on a bargain sale and the like. In addition, the interface section 1107 is also connected to a dedicated device (not shown) for adding purchase points, which is provided in each shop. Purchase points transmitted from the dedicated device are received by the interface section 1107 and outputted to the signal processing section 1101, in which the purchase points are earned to the information 1123 indicative of points, recorded on the memory 1104. In addition, the connection between the interface section 1107 and the personal computer or the dedicated device may be a wired connection or a wireless connection using infrared rays or radio waves.

The operation of the point addition system 1000 will be described below.

Figure 44:
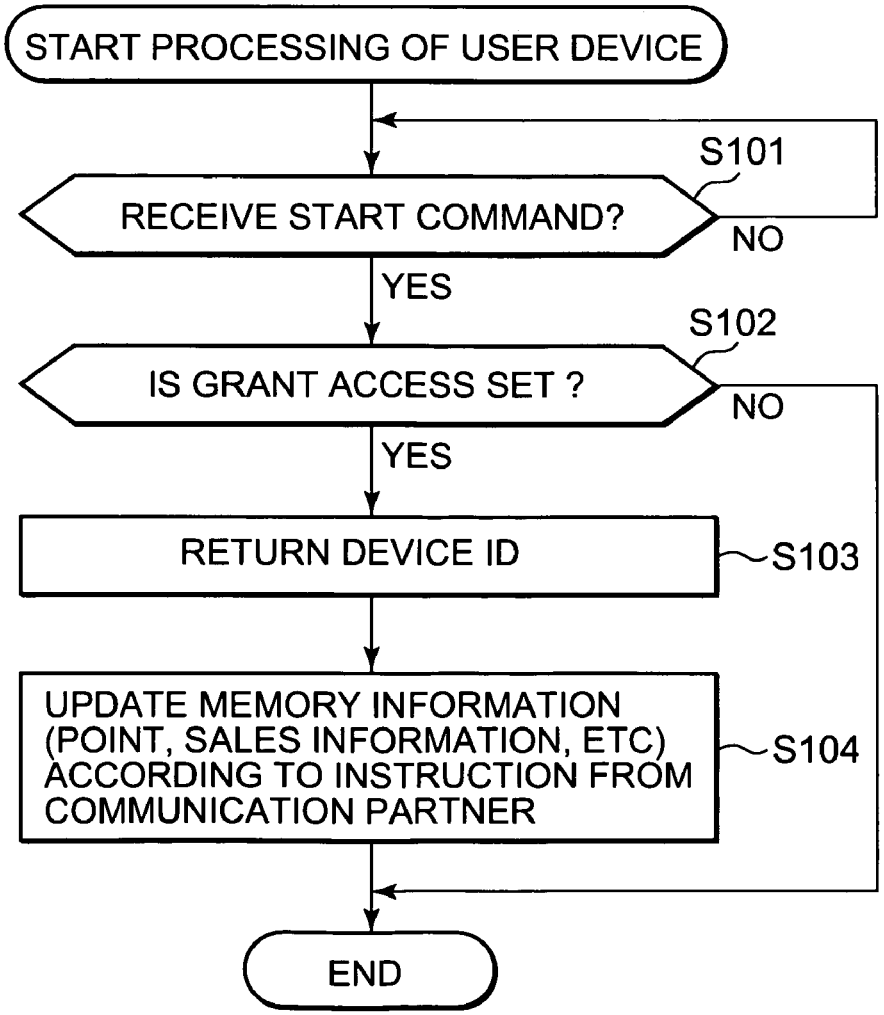
FIG. 44 is a flowchart for explaining the operation of the user device shown in FIG. 35.

First of all, the basic operation of the user device 1100 will be described below with reference to the flowchart shown in FIG. 44.

In step S101, the signal processing section 1101 of the user device 1100 waits until the signal electrode 1102 receives a start command transmitted from the entrance apparatus 1001 (or the shop apparatus 1002). If the signal electrode 1102 receives the start command, the process proceeds to step S102, in which the signal processing section 1101 confirms the grant-of-access flag 1121 recorded on the memory 1104 and determines whether access from the entrance apparatus 1001 and the like is granted by the user. If the signal processing section 1101 determines that the access is granted, the process proceeds to step S103. Contrarily, if the signal processing section 1101 determines that the access is not granted, the process comes to an end at this point in time.

In step S103, the signal processing section 1101 supplies the device ID read from the memory 1104 to the signal electrode 1102, and requests the signal electrode 1102 to reply.

In step S104, the signal processing section 1101 supplies or updates the information recorded on the memory 1104, in accordance with an instruction from the entrance apparatus 1001 (or the shop apparatus 1002) which is in communication with the signal processing section 1101. For example, the signal processing section 1101 supplies the information 1124 indicative of the last visitation point addition date in accordance with a request from the signal processing section 1101. In addition, if, for example, addition of visitation points is requested from the signal processing section 1101, the signal processing section 1101 adds the visitation points to the information 1123 indicative of the points recorded on the memory 1104. In addition, if, for example, sales information is supplied and recording and display of the sales information are requested from the signal processing section 1101, the signal processing section 1101 additionally records the supplied sales information on the memory 1104. Then, the signal processing section 1101 causes the output section 1106 to display an image corresponding to the sales information, and notifies the user of the supply of the sales information by means of sound or vibration. The basic operation of the signal processing section 1101 is as mentioned above.

Although not mentioned above, the processing of recording purchase points on the user device 1100 is executed with a dedicated device provided in each shop being connected to the interface section 1107. The basic operation of the signal processing section 1101 is as mentioned above.

Figure 45:
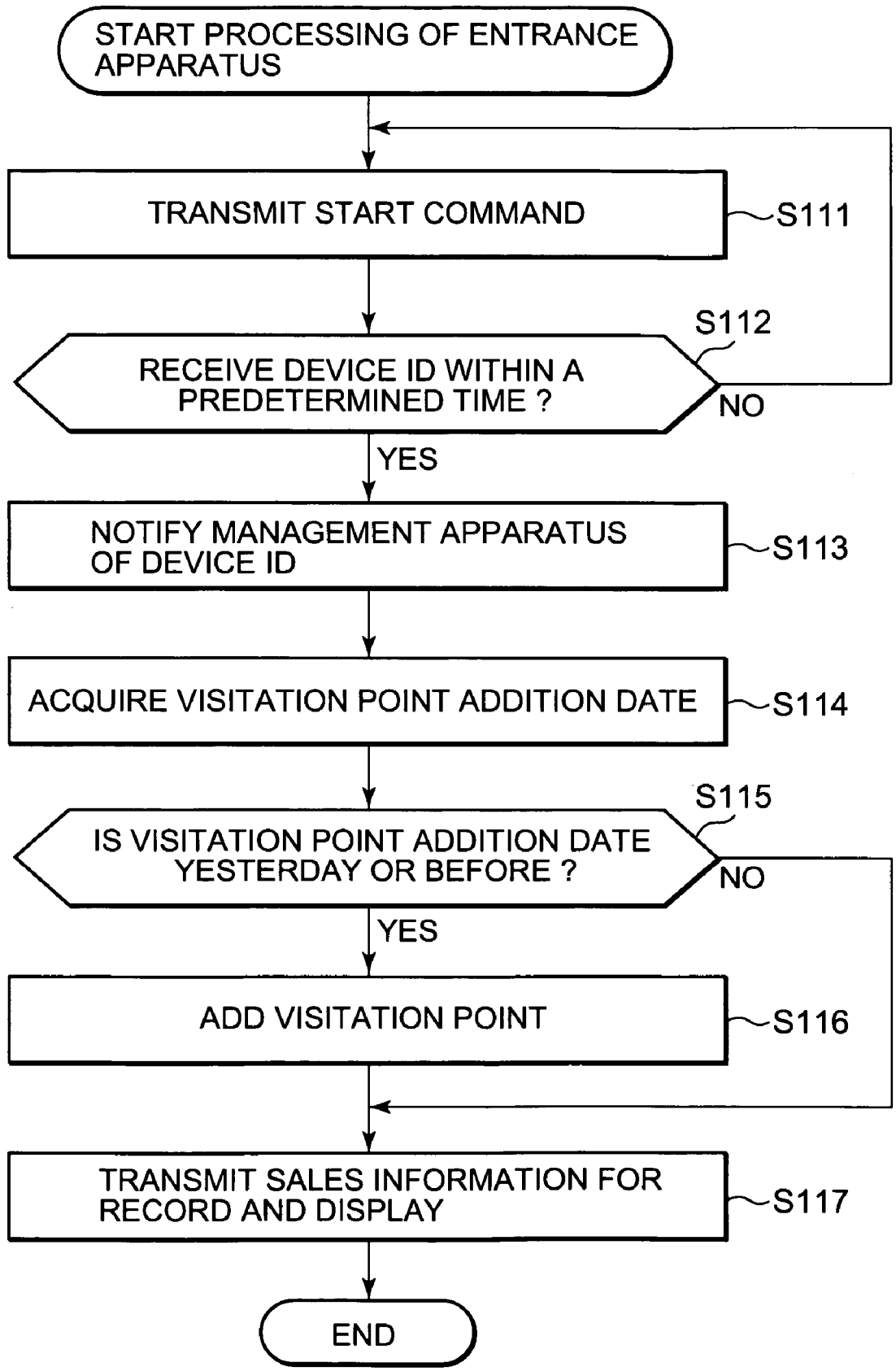
FIG. 45 is a flowchart for explaining the operation of the entrance apparatus.

The operation of the entrance apparatus 1001 will be described below with reference to the flowchart shown in FIG. 45. In step S111, a communication section 1021 of the entrance apparatus 1001 generates a start command and outputs the start command to the signal electrode 1012. At this time, if a visiting customer exists on the signal electrode 1012, the start command is transmitted from the signal electrode 1012 via the body of the visiting customer. In addition, if the user device 1100 is worn on the visiting customer, the user device 1100 replies the device ID in response to the start command.

In step S112, the communication section 1021 determines whether it has received the device ID within a predetermined time. If the communication section 1021 determines that it has received the device ID within the predetermined time, this indicates that the communication section 1021 has succeeded in communicating with the user device 1100 of the visiting customer. Accordingly, the process proceeds to step S113. Contrarily, if the communication section 1021 determines that it has not received the device ID within the predetermined time, this indicates that the communication section 1021 has not succeeded in communicating with the user device 110 of the visiting customer (the visiting customer does not wear the user device 1100, or the user device 1100 is broken, or the user device 1100 is set so as not to grant access). Accordingly, the process returns to step S111, and executes step S111 and the following steps.

In step S113, the device ID acquisition section 1022 acquires the device ID receivied by the communication section 1021 and outputs the acquired device ID to the device ID notification section 1023 and the sales information output section 1025. The device ID notification section 1023 notifies the management apparatus 1003 of the device ID inputted from the device ID acquisition section 1022, as visitation information. In response to the visitation information, sales information corresponding to the device ID contained in the visitation information is supplied from the management apparatus 1003 to the entrance apparatus 1001 and all of the shop apparatuses 1002.

In step S114, the visitation point addition section 1024 acquires the information 1124 indicative of the last visitation point addition date from the user device 1100 which is in communication with the signal processing section 1031 via the communication section 1021. In step S115, the visitation point addition section 1024 determines whether the information 1124 indicative of the last visitation point addition date, acquired from the user device 1100, indicates a date before yesterday. If the visitation point addition section 1024 determines that the information 1124 indicates a date before yesterday, the process proceeds to step S116, in which the visitation point addition section 1024 instructs the user device 1100 to add visitation points, via the communication section 1021. In response to this instruction, in the user device 1100, the signal processing section 1101 updates the information 1123 indicative of visitation points, recorded on the memory 1104, into a value obtained by adding the visitation points to the recorded points. Then, the signal processing section 1101 updates the information 1124 indicative of the visitation point addition date, recorded on the memory 1104, into today.

In addition, if the visitation point addition section 1024 determines in step S115 that the information 1124 indicative of the last visitation point addition date, acquired from the user device 1100, does not indicate a date before yesterday, that is to say, the information 1124 indicative of the last visitation point addition date, acquired from the user device 1100, indicates today, this indicates that visitation points for today have already been earned to the user device 1100. Accordingly, the process skips step S116.

In step S117, if sales information corresponding to the device ID inputted by the processing of step S113 is contained in the sales information supplied from the entrance apparatus 1001 and stored in the sales information output section 1025, the sales information output section 1025 supplies the sales information corresponding to the device ID to the user device 1100 via the communication section 1021. Then, the user device 1100 records the supplied sales information on the memory 110 and displays an image corresponding to the sales information, and in addition, notifies the user of the supply of the sales information by means of sound or vibration. The operation of the entrance apparatus 1001 is as mentioned above.

According to the operation of the above-mentioned entrance apparatus 1001, it is possible to add visitation points to a visiting customer without the need for manual labor. In addition, since the addition of visitation points is performed only once per day, it is possible to deter the behavior of a visiting customer who tries to gain only points by repeatedly passing through an entrance of a department store. In addition, since sales information generated in advance on the basis of the purchase history of a visiting customer can be supplied to the visiting customer, sales promotion activities the visiting customer can be effectively performed. In addition, sales information can be prevented from being supplied to a customer who has moved out of the department store. For example, if direct mail is transmitted to a customer by electronic mail, the direct mail may reach the customer after the customer has moved out of the department store. In this case, since the direct mail merely conveys meaningless information to the customer, the direct mail could become an unwanted e-mail. For this reason, the feature of preventing sales information from being supplied to a customer who has moved out of the department store leads to the advantage of preventing a nuisance to customers.

Figure 46:
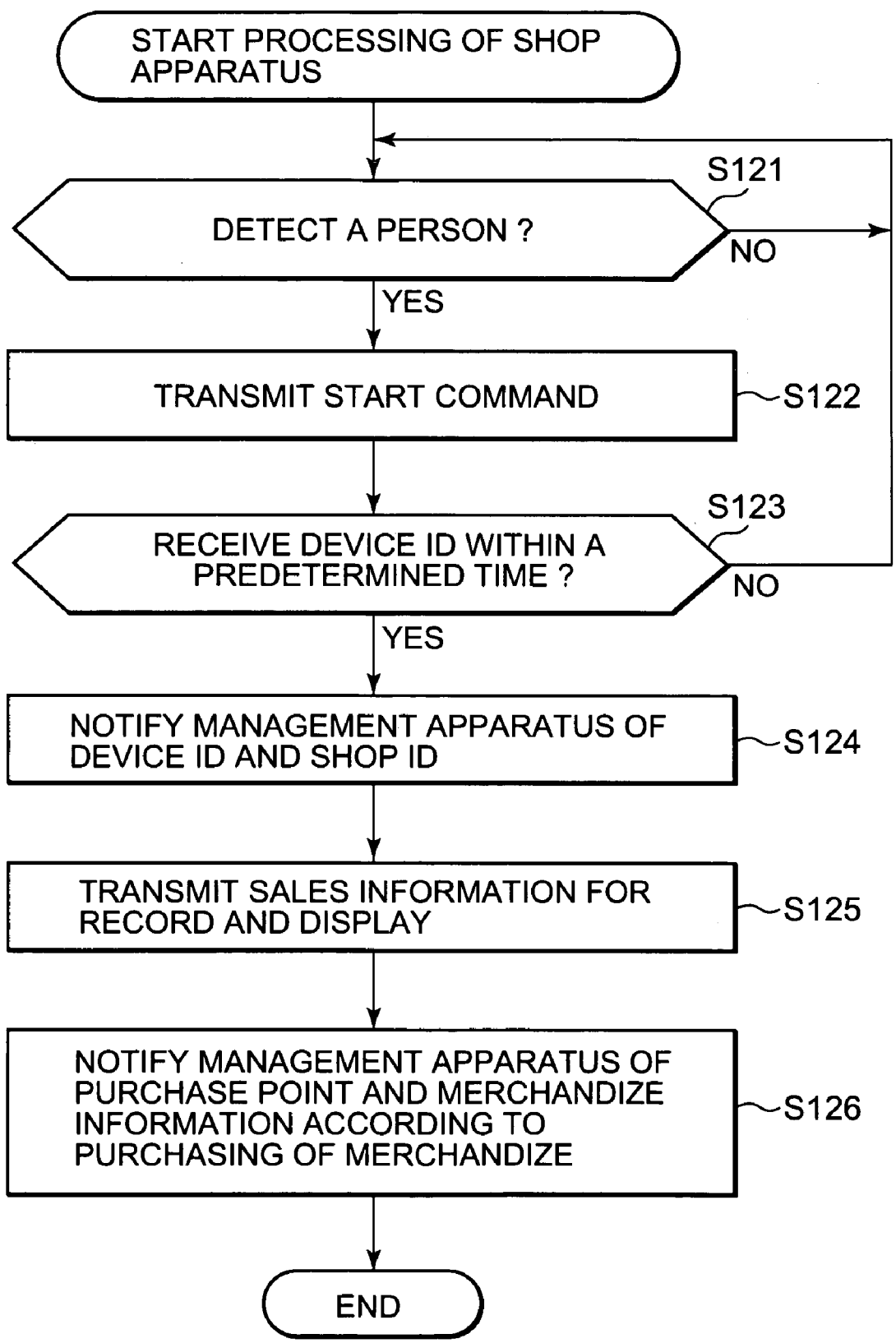
FIG. 46 is a flowchart for explaining the operation of the shop apparatuses.

The operation of one of the shop apparatuses 1002 will be described below with reference to the flowchart shown in FIG. 46. In step S121, the person detection section 1051 of the shop apparatus 1002 monitors the presence or absence of an entering customer on the basis of the sensor output from the sensor 1034, and waits until detecting an entering customer. If the person detection section 1051 detects an entering customer, the process proceeds to step S122. In step S122, the person detection section 1051 notifies the communication section 1052 that the entering customer has been detected. The communication section 1052 generates a start command and outputs the start command to the signal electrode 1032. The signal electrode 1032 transmits the start command via the body of the entering customer. Then, if the entering customer wears the user device 1100, the user device 1100 replies the device ID in correspondence with the start command.

In step S123, the communication section 1052 determines whether it has received the device ID within a predetermined time. If the communication section 1052 determines that it has received the device ID within the predetermined time, this indicates that the communication section 1052 has succeeded in communicating with the user device 1100 of the entering customer. Accordingly, the process proceeds to step S124. Contrarily, if the communication section 1052 determines that it has not received the device ID within the predetermined time, this indicates that the communication section 1052 has not succeeded in communicating with the user device 1100 of the entering customer (the entering customer does not wear the user device 1100, or the user device 1100 is broken, or the user device 1100 is set so as not to grant access) Accordingly, the process returns to step S121, and executes step S121 and the following steps.

In step S124, the device ID acquisition section 1053 acquires the device ID received by the communication section 1052 and outputs the received device ID to the notification section 1054 and the sales information output section 1055. The notification section 1054 notifies the management apparatus 1003 of the device ID inputted from the device ID acquisition section 1053 and the shop ID of the shop as entrance information. In response to the entrance information, sales information corresponding to the device ID contained in the entrance information is supplied from the management apparatus 1003 to the entrance apparatus 1001 and all of the shop apparatuses 1002. However, if the sales information corresponding to the device ID is already supplied to the entrance apparatus 1001 and all the shop apparatuses 1002, the processing maybe omitted. In addition, the sales information may be supplied not to the entrance apparatus 1001 and all the shop apparatuses 1002 but to only the shop apparatus 1002 corresponding to the shop ID notified together with the device ID or to only the entrance apparatus 1001.

In step S125, if sales information corresponding to the device ID inputted by the processing of step S124 is contained in the sales information supplied from the entrance apparatus 1001 and stored in the sales information output section 1055, the sales information output section 1055 supplies the sales information corresponding to the device ID to the user device 1100 via the communication section 1052. Then, the user device 1100 records the supplied sales information on the memory 110 and displays an image corresponding to the sales information, and in addition, notifies the user of the supply of the sales information by means of sound or vibration. Accordingly, the entering customer can view the sales information generated for him/her in the shop that the customer has entered.

After that, when the entering customer purchases a merchandise, purchase points are earned to the points recorded on the user device 1100 of the entering customer. Then, in step S126, the purchase information input section 1056 inputs purchase points corresponding to the purchase amount and merchandise information into the notification section 1054, and the notification section 1054 notifies the purchase points and the merchandise information to the management apparatus 1003. The merchandise information notified in this step becomes the purchase history of the purchasing customer which is to be used for generating sales information for the purchasing customer at a later time. The operation of the shop apparatus 1002 is as mentioned above.

According to the operation of the above-mentioned management apparatus 1003, the entering customer can be supplied with sales information generated on the basis of his/her purchase history, without the need for manual labor.

The operation of the management apparatus 1003 will be described below with reference to the flowchart shown in FIG. 47. This operation is started in correspondence with the opening of the department store. In step S131, the visitation information acquisition section 1061 determines whether it has received visitation information containing the device ID from the entrance apparatus 1001. If the visitation information acquisition section 1061 determines that it has received visitation information containing the device ID, the process proceeds to step S132.

In step S132, the visitation information acquisition section 1061 outputs the device ID contained in the received visitation information to the customer information store section 1063 and the sales information supply section 1068. The sales information supply section 1068 reads sales information corresponding to the device ID contained in the visitation information from the customer information store section 1063, and assigns the device ID to the read sales information and supplies the obtained sales information to the entrance apparatus 1001 and all the shop apparatuses 1002.

In step S133, the customer information store section 1063 updates the information 1073 indicative of the last visitation date corresponding to the inputted device ID into today, which information 1073 is contained in the customer information 1064 stored in the customer information store section 1063. In addition, if the visitation information acquisition section 1061 determines in step S13 that it has not received the visitation information from the entrance apparatus 1001, the processing of steps S132 and S133 is skipped.

In step S134, the entrance information acquisition section 1062 determines whether it has received entrance information containing the device ID from the shop apparatus 1002. If the entrance information acquisition section 1062 determines that it has received entrance information containing the device ID, the process proceeds to step S135. In step S135, the entrance information acquisition section 1062 outputs the device ID and the shop ID contained in the received entrance information to each of the customer information store section 1063 and the sales information supply section 1068. The sales information supply section 1068 reads sales information corresponding to the device ID contained in the entrance information from the customer information store section 1063, and assigns the device ID to the read sales information and supplies the obtained sales information to the entrance apparatus 1001 and all the shop apparatuses 1002. In addition, if sales information to be supplied in step S135 is the same as that supplied in step S132, the processing of step S135 may be omitted.

In step S136, the customer information store section 1063 adds the information 1075 indicative of the shop ID and the date and time that the customer has entered the shop, in association with the inputted device ID, and updates the customer information 1064. In addition, if the entrance information acquisition section 1062 determines in step S134 whether it has received the entrance information from the shop apparatus 1002, the processing of steps S135 and S136 is skipped.

In step S137, the entrance information acquisition section 1062 determines whether it has received entrance information containing purchase points and production information from the shop apparatus 1002. If the entrance information acquisition section 1062 determines in step S137 that it has received entrance information containing purchase points and production information, the process proceeds to step S138. In step S138, the entrance information acquisition section 1062 outputs the received entrance information to the customer information store section 1063. The customer information store section 1063 adds the purchase points to the information 1072 indicative of points in association with the device ID contained in the inputted entrance information, thereby updating the customer information 1064. In addition, the customer information 1064 adds the information 1075 on the basis of the production information contained in the entrance information. In step S139, the purchase trend analyze section 1066 analyses the purchase history (i.e., the information 1075) of the customer corresponding to the device ID contained in the inputted entrance information, and outputs the analyzed result to the sales information generation section 1067. On the basis of the analyzed result based on the purchase history of the customer, the sales information generation section 1067 generates sales information for individual customers and outputs the sales information to the customer information store section 1063.

In addition, if the entrance information acquisition section 1062 determines in step S137 that it has not received the entrance information from the shop apparatus 1002, the processing of steps S138 and S139 is skipped.

In step S140, the point addition judgment section 1065 determines whether it is the closing time of the shop. If the point addition judgment section 1065 determines that it is before the closing time, the process returns to step S131 and repeats step S131 and the following steps. If the point addition judgment section 1065 determines in step S140 that it is the closing time, the process proceeds to step S141.

In step S141, the point addition judgment section 1065 detects the customer information 1064 detects the customer information 1064 which contains the information 1073 indicating today as the last visitation date and the information 1074 indicating a date before yesterday as the last visitation point addition date, from among the customer information 1064 stored in the customer information store section 1063, and updates the information 1072 indicative of points by adding visitation points thereto and updates the information 1074 indicative of the last visitation point addition date into today.

According to the operation of the above-mentioned management apparatus 1003, it is possible to make the points recorded on the user device 1100 coincident with the points of the customer recorded on the customer information 1064. In addition, each time the entering customer purchases a merchandise, the purchased merchandise is reflected to the purchase history of the customer, so that the resultant purchase history can be analyzed to generate new sales information.

In addition, the collected customer information 1064 can be used in various applications other than the analysis and generation of sales information.

In addition, the present invention is not limited to department stores or shopping malls, and can be applied to shopping districts and complex stores.

In the present specification, the above-mentioned steps which describe a program recorded on a recording medium include not only processes to be executed in a time-series manner in the described order, but also processes which are not processed in a time-series manner but are executed in parallel or individually.

In the present specification, the term "system" denotes the entire apparatus made of a plurality of units (devices). In addition, a construction mentioned as one unit hereinabove may be divided and constructed as a plurality of units. Conversely, constructions respectively mentioned above as a plurality of units hereinabove may also be integrated and constructed as one unit. In addition, as a matter of course, constructions other than the above-mentioned ones may be earned to the constructions of the respective units. Furthermore, part of the construction of an arbitrary one of the units maybe incorporated into the construction of another as long as the construction and the operation of the entire system are substantially the same.

The present invention contains subject matter related to Japanese Patent Applications JP 2005-144205 and JP 2005-241534 filed in the Japanese Patent Office on May 17 and Aug. 23, 2005, respectively, the entire contents of which being incorporated herein by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system comprising:
a first information processing apparatus disposed in correspondence with an entrance of a space including a plurality of areas;
a plurality of second information processing apparatuses respectively disposed in correspondence with the plurality of areas; and
a third information processing apparatus which manages points, the point being earned by a person who entered the space or the area;
wherein the first information processing apparatus includes:
first acquisition means for communicating with a communication terminal worn on a person who visited the space and operative to perform communication by using as a communication medium a dielectric including a human body, and acquiring identification information recorded on the communication terminal;
first notification means for notifying the third information processing apparatus of the identification information; and
addition means for reading the last point addition date recorded on the communication terminal and, if the last point addition date is not today, adding to the communication terminal visitation points earned in correspondence with the fact that the person visited the space;
wherein each of the plurality of second information processing apparatuses includes:
detection means for detecting a person who visited the area;
second acquisition means for acquiring identification information recorded on the communication terminal worn on the person detected by the detection means;

wherein the third information processing apparatus includes:

first receiver means for receiving the identification information notified from the first information processing apparatus;

storing means for storing at least earned points, the last visitation date, and a date on which the visitation points were earned, in association with the identification information on the communication terminal, and modifying the stored last visitation date in correspondence with the identification information inputted from the first receiver means; and update means for, if the last visitation date stored in the storing means and the date on which the visitation points were earned differ from each other, adding visitation points to the earned points stored in the storing means, and updating the date on which the visitation points were earned into the last visitation date.

2. An information processing system according to claim 1, wherein:

the first information processing apparatus further includes first supply means for supplying information on the space to the communication terminal; and each of the second information processing apparatuses further includes second supply means for supplying information on the area to the communication terminal.

3. An information processing system according to claim 1, wherein:

each of the second information processing apparatuses further includes second notification means for notifying the third information processing apparatus of the identification information together with area information for specifying the area; and the third information processing apparatus further includes second receiver means for receiving the identification information and area information notified from each of the second information processing apparatuses, the storing means storing the area information received by each of the second information processing apparatuses and a reception date of the area information.

4. An information processing method for an information processing system including:

a first information processing apparatus disposed in correspondence with an entrance of a space including a plurality of areas;

a plurality of second information processing apparatuses respectively disposed in correspondence with the plurality of areas; and a third information processing apparatus which manages points, the point being earned by a person who entered the space or the area, the information processing method comprising:

a first acquisition step of communicating with a communication terminal worn on a person who visited the space and operative to perform communication by using as a communication medium a dielectric including a human body, and acquiring identification information recorded on the communication terminal;

a first notification step of notifying the third information processing apparatus of the identification information; and an addition step of reading the last point addition date recorded on the communication terminal and, if the last point addition date is not today, adding to the communication terminal visitation points earned in correspondence with the fact that the person visited the space;

wherein the first acquisition step, the first notification step and the addition step are executed by the first information processing apparatus;

the information processing method further comprising:

a detection step of detecting a person who visited the area; and a second acquisition step of acquiring identification information recorded on the communication terminal worn on the person detected by processing of the detection step;

wherein the detection step and the second acquisition step are executed by each of the plurality of second information processing apparatuses;

the information processing method further comprising:

a first reception step of receiving the identification information notified from the first information processing apparatus;

a storing step of storing at least earned points, the last visitation date, and a date on which the visitation points were earned, in association with the identification information on the communication terminal, and modifying the stored last visitation date in correspondence with the identification information inputted from the first-receiver means; and an update step of, if the last visitation date stored by processing of the storing step and the date on which the visitation points were earned differ from each other, adding visitation points to the earned points stored in the storing means, and updating the date on which the visitation points were earned into the last visitation date;

wherein the first reception step, the storing step and the update step are executed by the third information processing apparatus.

5. An information processing system comprising:

a first information processing apparatus disposed in correspondence with an entrance of a space including a plurality of areas;

a plurality of second information processing apparatuses respectively disposed in correspondence with the plurality of areas; and a third information processing apparatus which manages points, the point being earned by a person who entered the space or the area, wherein the first information processing apparatus includes:

first acquisition means for communicating with a communication terminal worn on a person who visited the space and operative to perform communication by using as a communication medium a dielectric including a human body, and acquiring identification information recorded on the communication terminal;

first notification means for notifying the third information processing apparatus of the identification information acquired by the first acquisition means; and first supply means for supplying to the communication terminal notification information corresponding to the acquired identification information from among notification information distributed from the third information processing apparatus;

wherein each of the plurality of second information processing apparatuses includes:

detection means for detecting a person who visited the area; second acquisition means for acquiring the identification information recorded on the communication terminal worn on the person detected by the detection means;

second notification means for notifying the third information processing apparatus of the identification information acquired by the second acquisition means and behavior information indicative of the behavior in the area of the person who visited the area; and second supply means for supplying to the communication terminal notification information corresponding to the acquired identification information, from among notification information distributed from the third information processing apparatus;

wherein the third information processing apparatus includes:

storing means for storing the behavior information notified from the second information processing apparatus, in association with the identification information;

generation means for generating the notification information for individuals on the basis of the behavior information stored in the storing means; and distribution means for distributing to all or part of the first and second information processing apparatuses, notification information corresponding to the identification information notified from either one of the first and second information processing apparatuses, from among the notification information generated by the generation means.

6. An information processing system according to claim 5, wherein:

the behavior information is information indicative of a merchandise purchased in the area by the person who visited the area; and the notification information is an advertisement of merchandises sold in the space or the area.

7. An information processing method for an information processing system including:

a first information processing apparatus disposed in correspondence with an entrance of a space including a plurality of areas;

a plurality of second information processing apparatuses respectively disposed in correspondence with the plurality of areas; and a third information processing apparatus which manages points, the point being earned by a person who entered the space or the area, the information processing method comprising:

a first acquisition step of communicating with a communication terminal worn on a person who visited the space and operative to perform communication by using as a communication medium a dielectric including a human body, and acquiring identification information recorded on the communication terminal;

a first notification step of notifying the third information processing apparatus of the identification information acquired by processing of the first acquisition step; and a first supply step of supplying to the communication terminal notification information corresponding to the acquired identification information from among notification information distributed from the third information processing apparatus;

wherein the first acquisition step, the first notification step and the first supply step are executed by the first information processing apparatus;

the information processing method further comprising:

a detection step of detecting a person who visited the area;

a second acquisition step of acquiring the identification information recorded on the communication terminal worn on the person detected by processing of the detection step;

a second notification step of notifying the third information processing apparatus of the identification information acquired by processing of the second acquisition step and behavior information indicative of the behavior in the area of the person who visited the area; and a second supply step of supplying to the communication terminal notification information corresponding to the acquired identification information from among notification information distributed from the third information processing apparatus;

wherein the detection step, the second acquisition step, the second notification step and the second supply step are executed by each of the plurality of second information processing apparatuses;

the information processing method further comprising:

a storing step of storing the behavior information notified from the second information processing apparatus, in association with the identification information;

a generation step of generating the notification information for individuals on the basis of the behavior information stored in the storing means; and a distribution step of distributing to all or part of the first and second information processing apparatuses, notification information corresponding to the identification information notified from either one of the first and second information processing apparatuses, from among the notification information generated by processing of the generation step;

wherein the storing step, the generation step and the distribution step are executed by the third information processing apparatus.

8. An information processing system comprising:

a first information processing apparatus disposed in correspondence with an entrance of a space including a plurality of areas;

a plurality of second information processing apparatuses respectively disposed in correspondence with the plurality of areas; and a third information processing apparatus which manages points, the point being earned by a person who entered the space or the area;

wherein the first information processing apparatus includes:

a first acquisition section adapted to communicate with a communication terminal worn on a person who visited the space and operative to perform communication by using as a communication medium a dielectric including a human body, and acquire identification information recorded on the communication terminal;

a first notification section adapted to notify the third information processing apparatus of the identification information; and an addition section adapted to read the last point addition date recorded on the communication terminal and, if the last point addition date is not today, add to the communication terminal visitation points earned in correspondence with the fact that the person visited the space;

wherein each of the plurality of second information processing apparatuses includes:

a detection section adapted to detect a person who visited the area;

a second acquisition section adapted to acquire identification information recorded on the communication terminal worn on the person detected by the detection section;

wherein the third information processing apparatus includes:

a first receiver section adapted to receive the identification information notified from the first information processing apparatus;

a storing section adapted to store at least earned points, the last visitation date, and a date on which the visitation points were earned, in association with the identification information on the communication terminal, and modify the stored last visitation date in correspondence with the identification information inputted from the first receiver section; and a update section adapted to, if the last visitation date stored in the storing section and the date on which the visitation points were earned differ from each other, add visitation points to the earned points stored in the storing section, and update the date on which the visitation points were earned into the last visitation date.

* * * * *